United States Patent
Biswas et al.

(10) Patent No.: US 12,512,100 B2
(45) Date of Patent: Dec. 30, 2025

(54) AUTOMATED SEGMENTATION AND TRANSCRIPTION OF UNLABELED AUDIO SPEECH CORPUS

(71) Applicant: Oracle International Corporation, Redwood Shores, CA (US)

(72) Inventors: Astik Biswas, Siliguri (IN); Abdelmoumene Boumadane, Levallois-Perret (FR); Stephane Peillon, Lannion (FR); Gildas Bleas, Cesson-Sevigne (FR)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 217 days.

(21) Appl. No.: 18/390,934

(22) Filed: Dec. 20, 2023

(65) Prior Publication Data
US 2025/0069600 A1    Feb. 27, 2025

(30) Foreign Application Priority Data
Aug. 22, 2023 (FR) ...................................... 2308851

(51) Int. Cl.
*G10L 15/26* (2006.01)
*G10L 15/16* (2006.01)

(52) U.S. Cl.
CPC .............. *G10L 15/26* (2013.01); *G10L 15/16* (2013.01)

(58) Field of Classification Search
CPC ............... G10L 15/16; G10L 2015/088; G10L 15/1822; G10L 15/26; G10L 15/32
(Continued)

(56) References Cited

U.S. PATENT DOCUMENTS 9,710,819 B2 *   7/2017   Cloran ................. G06Q 10/103
10,650,803 B2 *  5/2020   Fukuda .................. G10L 15/26
(Continued)

FOREIGN PATENT DOCUMENTS

CN         114694657 A  *  7/2022  ......... H04N 21/8547

OTHER PUBLICATIONS

Saito, Takashi. "A framework of human-based speech transcription with a speech chunking front-end." 2015 Asia-Pacific Signal and Information Processing Association Annual Summit and Conference (APSIPA). IEEE, Dec. 2015, pp. 125-128. (Year: 2015).*

(Continued)

*Primary Examiner* — James S Wozniak
(74) *Attorney, Agent, or Firm* — Kilpatrick Townsend & Stockton LLP

(57) ABSTRACT

A method includes obtaining initial transcription for input natural speech; performing segmentation of initial transcription into text portions, based on punctuation marks in initial transcription; determining segment-level timestamps for text portions based on the input natural speech; performing audio segmentation on input natural speech, by cutting input natural speech based on segment-level timestamps, to obtain audio chunks; generating transcription portions for each of the audio chunks; merging transcription portions to form re-transcription; determining word-level timestamps for re-transcription, by aligning input natural speech against re-transcription; calculating silence time periods, each corresponding to silence between each two adjacent words of input natural speech, based on word-level timestamps; performing a final segmentation on input natural speech and re-transcription, based on silence time periods, to generate final audio segments and corresponding final transcription portions. The final audio segments and corresponding final (Continued)

transcription portions may be included in training dataset for training a model.

20 Claims, 17 Drawing Sheets

(58) Field of Classification Search
USPC .......................................... 704/235, 251, 253
See application file for complete search history.

(56) References Cited

U.S. PATENT DOCUMENTS

| | | | | |
|---|---|---|---|---|
| 11,138,970 | B1* | 10/2021 | Han | G06F 21/6245 |
| 11,594,221 | B2* | 2/2023 | Thomson | G10L 15/187 |
| 2007/0174258 | A1* | 7/2007 | Jones | G06Q 30/02 |
| 2010/0094628 | A1* | 4/2010 | Bacchiani | G10L 15/32 |
| | | | | 704/235 |
| 2011/0022387 | A1* | 1/2011 | Hager | G06Q 10/107 |
| | | | | 715/752 |
| 2012/0016671 | A1* | 1/2012 | Jaggi | G10L 15/22 |
| | | | | 704/235 |
| 2012/0059651 | A1* | 3/2012 | Delgado | H04W 4/80 |
| | | | | 704/E15.044 |
| 2013/0030810 | A1* | 1/2013 | Kopparapu | G06F 16/954 |
| | | | | 704/E13.011 |
| 2014/0337032 | A1* | 11/2014 | Aleksic | G10L 15/26 |
| | | | | 704/257 |
| 2019/0079918 | A1* | 3/2019 | Thörn | G10L 15/05 |
| 2019/0130913 | A1* | 5/2019 | Li | G10L 15/26 |
| 2020/0135204 | A1* | 4/2020 | Robichaud | G10L 25/78 |
| 2021/0407515 | A1* | 12/2021 | Hermanns | G10L 15/26 |
| 2022/0115020 | A1* | 4/2022 | Bradley | G06F 3/0334 |
| 2023/0223016 | A1* | 7/2023 | Konam | G06F 40/284 |
| | | | | 704/231 |
| 2023/0352009 | A1* | 11/2023 | Behre | G10L 15/19 |
| 2023/0352042 | A1* | 11/2023 | Agarwal | G10L 21/10 |
| 2023/0385323 | A1* | 11/2023 | Agarwal | G06F 16/34 |
| 2024/0087557 | A1* | 3/2024 | Levine | G10L 13/086 |
| 2024/0135973 | A1* | 4/2024 | Bai | G11B 27/031 |
| 2024/0169981 | A1* | 5/2024 | Huang | G10L 15/16 |
| 2024/0304205 | A1* | 9/2024 | Subramanian | G10L 15/26 |
| 2024/0371370 | A1* | 11/2024 | Zheng | G10L 15/16 |

OTHER PUBLICATIONS

Behre, Piyush, et al. "Streaming punctuation for long-form dictation with transformers." arXiv preprint arXiv:2210.05756, Oct. 2022, pp. 187-197. (Year: 2022).*

Huang, W. Ronny, et al. "Semantic segmentation with bidirectional language models improves long-form asr." arXiv preprint arXiv:2305.18419. May 2023, pp. 1-5. (Year: 2023).*

Inaguma, et al. "VAD-free streaming hybrid CTC/attention ASR for unsegmented recording." arXiv preprint arXiv:2107.07509. Jun. 2021, pp. 1-5. (Year: 2021).*

Kim, Hanbyul, et al. "Improved training for end-to-end streaming automatic speech recognition model with punctuation." arXiv preprint arXiv:2306.01296. Jun. 2023, pp. 1-5. (Year: 2023).*

Narayanan, Arun, et al. "Recognizing long-form speech using streaming end-to-end models." 2019 IEEE automatic speech recognition and understanding workshop (ASRU). IEEE, Oct. 2019, pp. 1-8. (Year: 2019).*

"Deep Multilingual Punctuation Prediction", Available online at: https://github.com/oliverguhr/deepmultilingualpunctuation, Accessed from internet on Nov. 1, 2023, pp. 1-5.

"Facebook/wav2vec2-large-960h-lv60", Hugging Face, Available online at: https://huggingface.co/facebook/wav2vec2-large-960h-lv60, Accessed from Internet on Dec. 12, 2023, 5 pages.

"Forced Alignment", Available online at: https://eleanorchodroff.com/tutorial/kaldi/forced-alignment.html, Accessed from Internet on Dec. 12, 2023, 5 pages.

"Wav2vec2-large-robust", Available online at: https://huggingface.co/facebook/wav2vec2-large-robust, Accessed from internet on Nov. 1, 2023, pp. 1-3.

"Citrinet", Available online at: https://huggingface.co/nvidia/stt_en_citrinet_1024_gamma_0_25, Accessed from internet on Nov. 1, 2023, pp. 1-6.

"Conformer_ctc_large", Available online at: https://huggingface.co/nvidia/stt_en_conformer_ctc_large, Accessed from internet on Nov. 1, 2023, pp. 1-7.

"Conformer_transducer_xlarge", Available online at: https://huggingface.co/nvidia/stt_en_conformer_transducer_xlarge, Accessed from internet on Nov. 1, 2023, pp. 1-7.

Ardila et al., "Common Voice: A Massively-Multilingual Speech Corpus", Proceedings of the 12th Conference on Language Resources and Evaluation (LREC 2020), Available online at: https://arxiv.org/abs/1912.06670, May 11-16, 2020, pp. 4218-4222.

Baevski et al., "wav2vec 2.0: A Framework for Self-Supervised Learning of Speech Representations", Available Online at: https://arxiv.org/pdf/2006.11477.pdf, Oct. 22, 2020, pp. 1-19.

Biswas et al., "An Efficient Approach for the Automated Segmentation and Transcription of the People's Speech Corpus", Available online at: https://www.isca-speech.org/archive/pdfs/interspeech_2023/biswas23_interspeech.pdf, Aug. 20-24, 2023, pp. 3939-3943.

Chen et al., "GigaSpeech: An Evolving, Multi-domain ASR Corpus with 10,000 Hours of Transcribed Audio", Available online at: https://arxiv.org/pdf/2106.06909.pdf, Jun. 13, 2021, 5 pages.

Cheng et al., "Output-Gate Projected Gated Recurrent Unit for Speech Recognition", Available online at: https://www.danielpovey.com/files/2018_interspeech_opgru.pdf, Sep. 2018, 5 pages.

Galvez et al., "The People's Speech: A Large-Scale Diverse English Speech Recognition Dataset for Commercial Usage", 35th Conference on Neural Information Processing Systems (NeurIPS 2021), Available online at: https://arxiv.org/abs/2111.09344, Nov. 17, 2021, pp. 1-12.

Graves et al., "Connectionist Temporal Classification: Labelling Unsegmented Sequence Data with Recurrent Neural Networks", Proceedings of the 23rd international conference on Machine Learning, Jun. 25, 2006, 8 pages.

Kim et al., "Self-Guided Contrastive Learning for BERT Sentence Representations", Proceedings of the 59th Annual Meeting of the Association for Computational Linguistics and the 11th International Joint Conference on Natural Language Processing, Available online at: https://arxiv.org/abs/2106.07345, Aug. 1-6, 2021, pp. 2528-2540.

Korfiatis et al., "PriMock57: A Dataset of Primary Care Mock Consultations", Proceedings of the 60th Annual Meeting of the Association for Computational Linguistics, vol. 2, May 22-27, 2022, pp. 588-598.

Kuchaiev et al., "NeMo: A Toolkit for Building AI Applications using Neural Modules", Available online at: https://arXiv:1909.09577v1, Sep. 14, 2019, pp. 1-8.

Kurzinger et al., "CTC-Segmentation of Large Corpora for German End-to-end Speech Recognition", Available online at: https://arxiv.org/abs/2007.09127, Oct. 5, 2020, pp. 1-12.

Majumdar et al., "Citrinet: Closing the Gap between Non-Autoregressive and Autoregressive End-to-End Models for Automatic Speech Recognition", Available online at: https://arxiv.org/abs/2104.01721, Apr. 5, 2021, 5 pages.

Panayotov et al., "Librispeech: An ASR Corpus Based on Public Domain Audio Books", Center for Language and Speech Processing and Human Language Technology Center of Excellence, Apr. 2015, 5 pages.

Parcollet et al., "SpeechBrain: A General-Purpose Speech Toolkit", Available online at: https://arxiv.org/pdf/2106.04624.pdf, Jun. 8, 2021, pp. 1-34.

Pratap et al., "MLS: A Large-scale Multilingual Dataset for Speech Research", Available online at: https://arxiv.org/abs/2012.03411, Dec. 19, 2020, pp. 1-10.

Radford et al., "Robust Speech Recognition via Large-Scale Weak Supervision", Available online at: https://arXiv:2212.04356v1, Dec. 6, 2022, pp. 1-28.

(56) References Cited

OTHER PUBLICATIONS

Rio et al., "Earnings-21: A Practical Benchmark for ASR in the Wild", InterSpeech 2021, Available online at: https://arxiv.org/abs/2104.11348, Aug. 30-Sep. 3, 2021, pp. 3465-3469.
Yi et al., "Applying Wav2vec2.0 to Speech Recognition in Various Low-Resource Languages", Available online at: https://arxiv.org/abs/2012.12121, Jan. 17, 2021, 5 pages.

\* cited by examiner

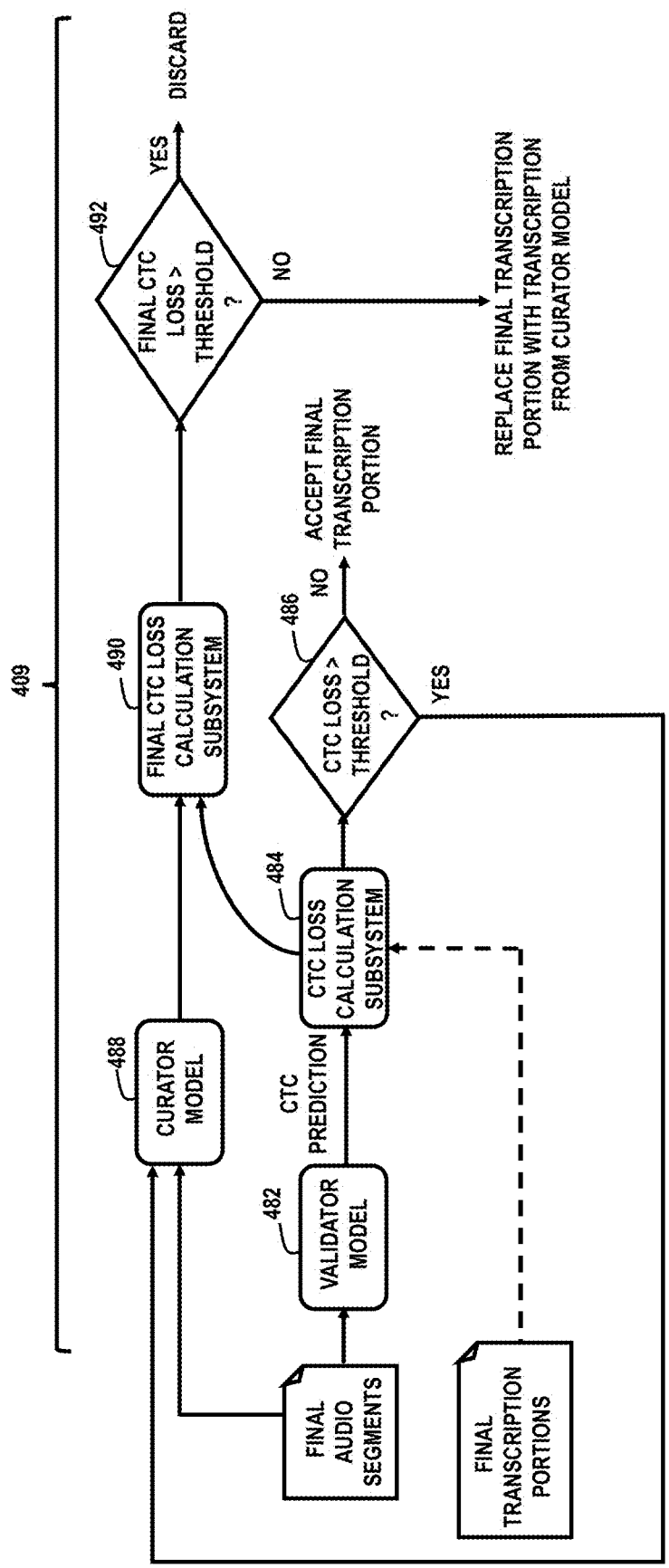

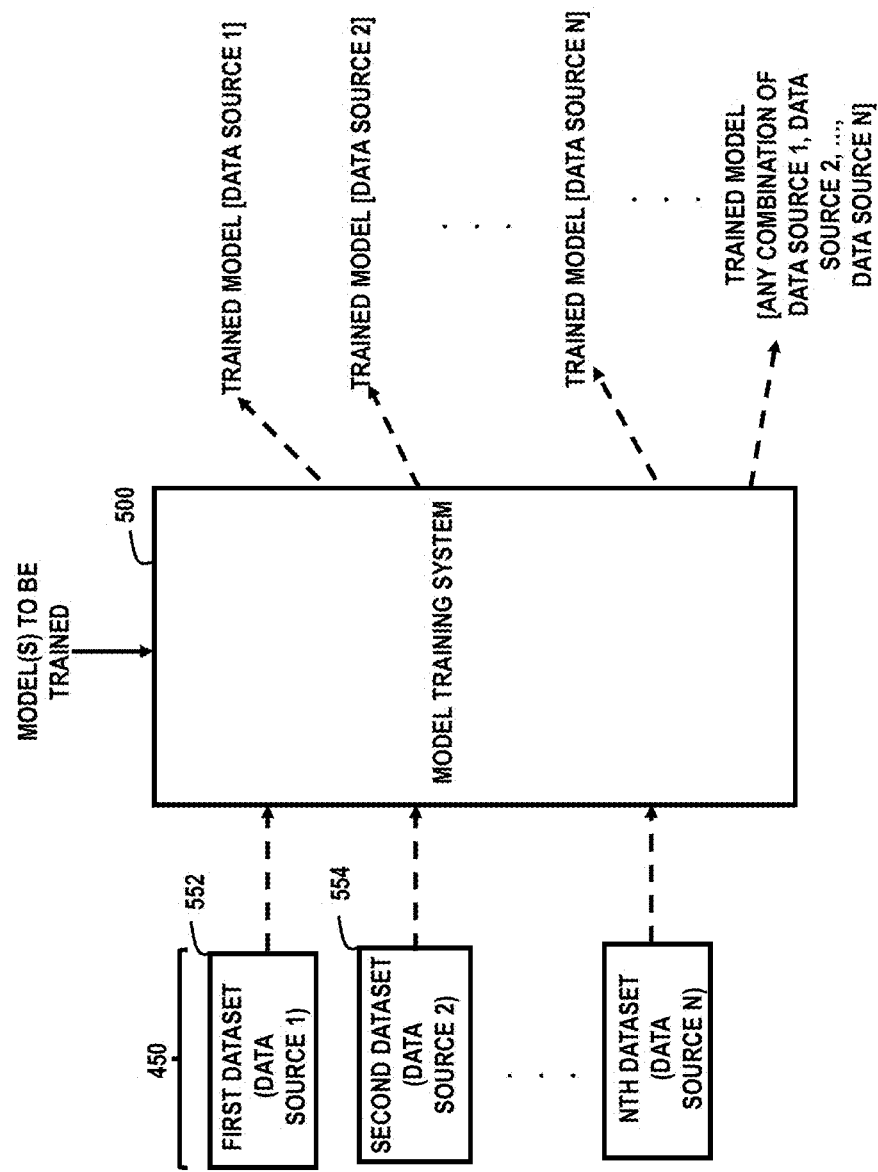

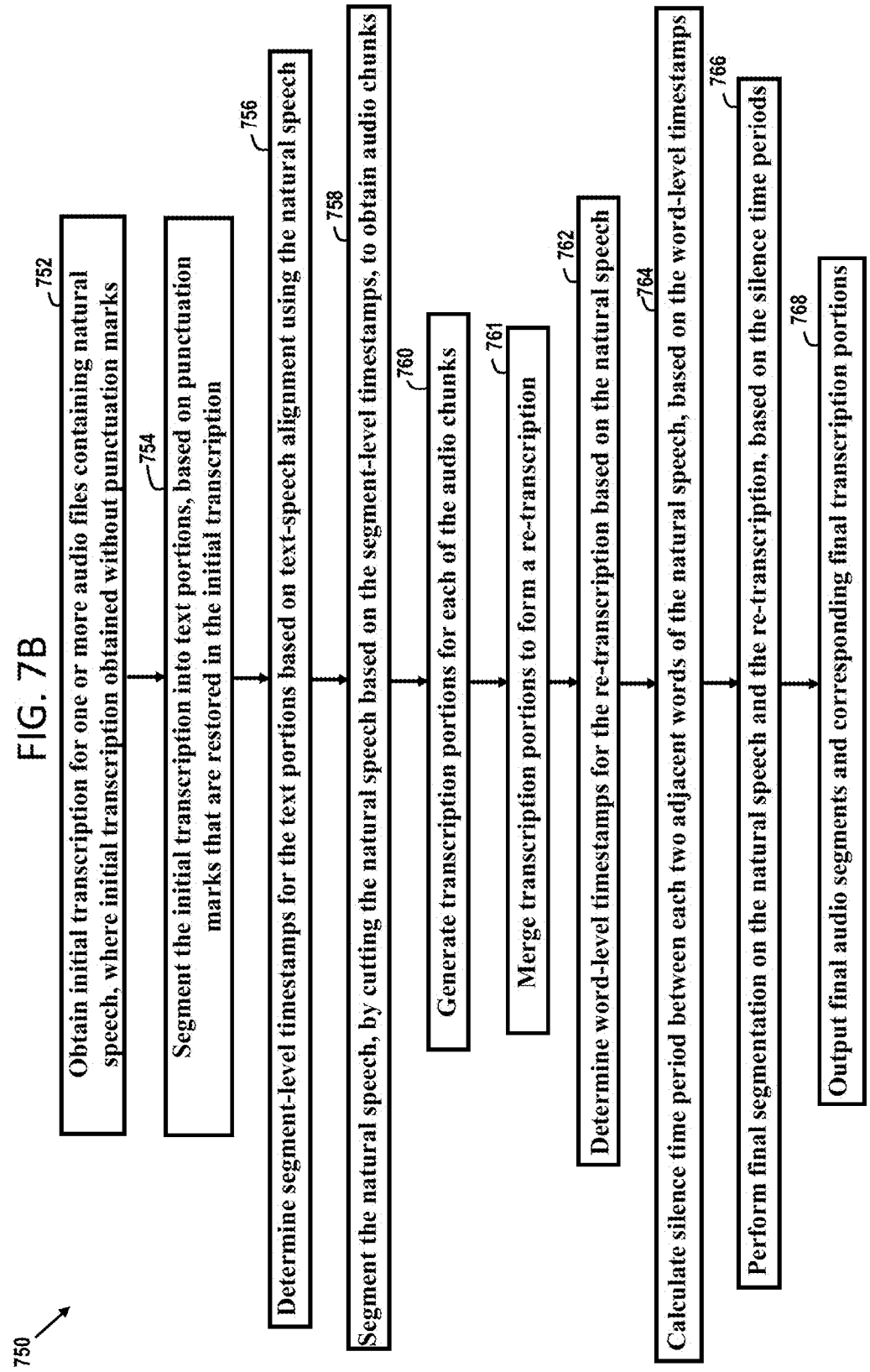

AUTOMATED SEGMENTATION AND TRANSCRIPTION OF UNLABELED AUDIO SPEECH CORPUS

CROSS-REFERENCE TO RELATED APPLICATION(S)

The present application is a non-provisional application of and claims the benefit and priority under 35 U.S.C. 119(a) of French Provisional Application FR2308851, filed Aug. 22, 2023, which is incorporated by reference herein in its entirety.

FIELD

The present disclosure relates generally to artificial intelligence (AI) techniques, and, more particularly, to automatically segmenting and transcribing audio data from a large unlabeled audio corpus, to obtain collections of superior quality audio-text utterances usable for training automated speech recognition (ASR) models.

BACKGROUND

Advancements in deep learning technology have enabled a development of ASR systems that can recognize speech across various domains, accents, speakers, and environments. ASR systems can be integrated into various applications such as chatbots, medical dictation, video transcription, etc. In generation of the ASR models, the training data including conversational and spontaneous speech is typically used. Conversational ASR training can involve speech that captures acoustic cues of spontaneous speech.

The accuracy of machine learning (ML) models (e.g., ASR systems) is directly proportional to the quantity and quality of training data. Collecting a large amount of conversational training data and making sure that it satisfies the quality and task-specific requirements is a challenging, cost- and time-consuming process. In the related art, the automatically collected data and utterances typically contain mixed languages, incorrectly identified languages, sounds rather than natural speech (e.g., music), etc. That is, the related art systems and methods lack control over the collected data quality and accuracy and require human curation to improve accuracy. Further, the related art systems and methods cannot provide scalability across multiple publicly available data collections.

As a result, accurate and suitable training data that is typically available for training ASR models is limited, leading to deficient training of the ML models, which in turn leads to degraded performance (e.g., accuracy) of the models.

While efforts are being made to increase both the volume and quality of such training data using automated techniques, these efforts are still quite deficient, very time and resource intensive, and not scalable. These limitations present a big hurdle in generating accurate and reliable models for transcribing natural language audio utterances to text.

SUMMARY

Techniques disclosed herein relate generally to artificial intelligence techniques, and more particularly, to automatically segmenting and transcribing audio data from a large unlabeled audio corpus, to obtain collections of superior quality audio-text utterances usable for training ASR models. Disclosed techniques are for end-to-end automatic re-segmentation, re-transcription, and curation that can create conversional corpora with variable audio segment lengths paired with text segments of superior transcription quality.

In various embodiments, a computer-implemented method is provided that includes obtaining, using a first transcription model configured to convert natural speech of longer audio files into text, an initial transcription for at least one input audio file containing an input natural speech; performing a segmentation of the initial transcription into text portions, based on punctuation marks in the initial transcription; determining, using a first machine learning (ML) model, segment-level timestamps for the text portions based on the input natural speech, the segment-level timestamps designate a starting time point of a first word and an ending time point of a last word for each of the text portions; performing an audio segmentation on the input natural speech, by cutting the input natural speech based on the segment-level timestamps, to obtain audio chunks; generating, using a second transcription model configured to convert natural speech of shorter audio files into text, transcription portions for each of the audio chunks; merging the transcription portions to form a re-transcription; determining, using a second ML model, word-level timestamps for the re-transcription, by aligning the input natural speech against the re-transcription, the word-level timestamps designating a starting time point and an ending time point of each word of the re-transcription; calculating silence time periods, each of the silence time periods corresponding to a silence between each two adjacent words of the input natural speech, based on the word-level timestamps determined for the re-transcription; performing a final segmentation on the input natural speech and the re-transcription, based at least on the silence time periods, to generate final audio segments and corresponding final transcription portions; and outputting the final audio segments and the corresponding final transcription portions.

In some embodiments, the obtaining the initial transcription further includes: obtaining the initial transcription without the punctuation marks; and restoring the punctuation marks in the initial transcription by using a third ML, model configured to predict the punctuation marks in a given text.

In some embodiments, the determining the segment-level timestamps further includes: aligning the text portions against the input natural speech using the segment-level timestamps; and calculating an alignment confidence score between the text portions and audio portions of the input natural speech that correspond to the text portions, where each of the audio chunks is included in a corresponding audio portion of the input natural speech and has an associated alignment confidence score of the corresponding audio portion, and where the re-transcription is generated based on the audio chunks having the associated alignment confidence score greater than an alignment threshold.

In some embodiments, the performing the final segmentation further includes: segmenting the input natural speech into the final audio segments of a variable data length based on rules, so that the silence time period between two adjacent final audio segments is no more than a silence threshold, a number of characters of each of the final audio segments is no more than a maximum predetermined number of characters, and a length of each of the final audio segments is no more than a maximum predetermined duration.

In some embodiments, the computer-implemented method further includes inputting, into a validator model, the final audio segments; outputting, by the validator model, a prediction matrix; comparing the prediction matrix to the final transcription portions, to generate a first matching value; and, based on the first matching value for a particular final transcription portion being less than or equal to a connectionist temporal classification (CTC) loss threshold, storing the particular final transcription portion in a model training dataset.

In some embodiments, the computer-implemented method further includes: based on the first matching value for the particular final transcription portion being more than the CTC loss threshold, obtaining, using a curator model configured to convert natural speech into text, a curated transcription portion corresponding to the particular final transcription portion; comparing the curated transcription portion and the prediction matrix, to generate a second matching value; and, based on the second matching value being less than or equal to the CTC loss threshold, storing the curated transcription portion in the model training dataset.

In some embodiments, the model training dataset is to be used as an input for training an automated speech recognition model.

In various embodiments, a computer system is provided that includes one or more processors and one or more computer-readable media storing instructions that, when executed by the one or more processors, cause the one or more processors to perform part or all of the operations and/or methods disclosed herein.

In various embodiments, one or more non-transitory computer-readable media are provided that store instructions that, when executed by one or more processors of a computer system, cause the one or more processors to perform part or all of the operations and/or methods disclosed herein.

The techniques described herein may be implemented in a number of ways and in a number of contexts. Several example implementations and contexts are provided with reference to the following figures, as described below in more detail. However, the following implementations and contexts are but a few of many.

BRIEF DESCRIPTION OF THE DRAWINGS

FIG. 4B is a simplified block diagram of a curation subsystem and a processing performed by the curation subsystem in accordance with various embodiments.

FIG. 5 is a simplified block diagram of a model training system according to various embodiments.

FIG. 7B is a flowchart of a method performed by the segmentation and curation system in accordance with various embodiments.

DETAILED DESCRIPTION

Figure 1:
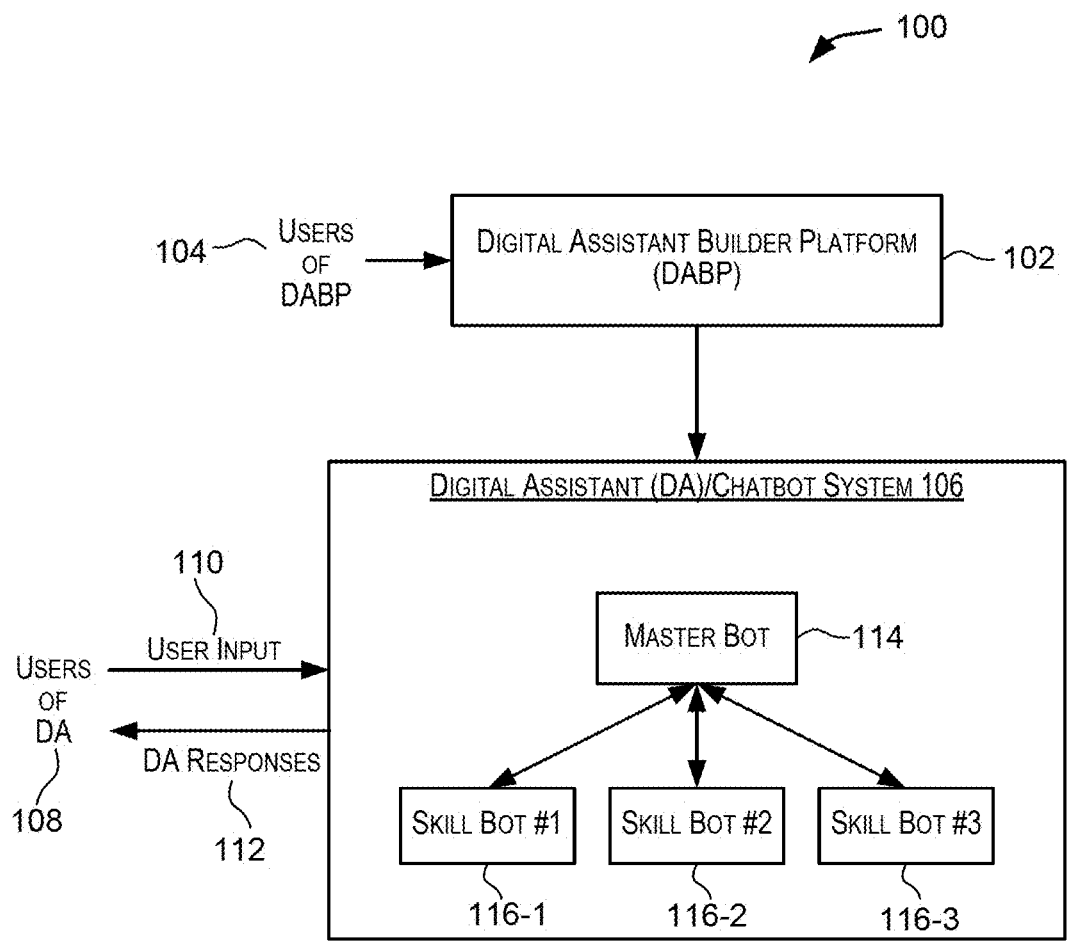
FIG. 1 is a simplified block diagram of a distributed environment incorporating an exemplary embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

I. Introduction

Techniques disclosed herein relate generally to artificial intelligence techniques, and more particularly, to automatically segmenting and transcribing audio data from a large unlabeled audio corpus, to obtain collections of superior quality audio-text utterances usable for training ASR models. Disclosed techniques are for end-to-end automatic re-segmentation, re-transcription, and curation that can create conversional corpora with variable audio segment lengths paired with text segments of superior transcription quality.

To develop an efficient ASR model suitable for conversational AI, it is requisite to use high-quality training data that includes conversational and spontaneous speech from diverse environments and a wide variety of speakers. However, the high-quality corpora presently available includes read speech that lacks spontaneous speech properties, e.g., fast speech, hesitations, etc.

In one approach, the People's Speech dataset was developed from publicly available data source archive.org that provides free public access to collections of digitized materials, including thousands of audio files and corresponding transcriptions, e.g., text. The audio files of archive.org include waveform audio files (WAV) may be long audio files. As used herein, a "long" audio file means an audio file having a length about an hour or more. However, this is not intended to be limiting. In some implementations, a length of an audio file might be shorter than an hour, e.g., 5 minutes or longer. In some implementations, a length of an audio file might be 1 minute or longer. An upper limit on the audio file length is not necessarily limiting and may depend on the application and the availability of the technical means, e.g., 1.5 hours, . . . , 2 hours, . . . , 5 hours, etc.

The People's Speech is a large corpus of conversational and diverse speeches and includes 30,000 hours of speech. However, transcriptions of the People's Speech corpora are often inaccurate. First, the People's Speech corpus contains uniform 15-second segments, where some audio speech is often abruptly truncated at the boundaries of the audio segments, leading to erroneous transcriptions at the points of truncations. Additionally, training the ASR systems using data with fixed audio segment length might have an adverse effect on an ASR system's ability to recognize short or single-word audio, especially when the ASR system is an end-to-end ASR system. Second, the transcriptions provided with the People's Speech corpus are not reliable because many segments of the transcriptions contain foreign (e.g., non-English) speech or music, resulting in incorrect alignments.

In order to overcome the above-noted problems and others, various techniques are described herein for automatically re-segmenting and re-transcribing raw audio data for use in training ASR systems. Disclosed techniques perform end-to-end automatic re-segmentation, re-transcription, and curation that can create conversational corpora with accurately segmented variable audio segments paired with text segments of superior transcription quality for use in training of highly accurate and efficient ASR systems.

In embodiments, a fully automated method includes obtaining, using a first transcription model, an initial transcription for one or more audio files containing the natural speech, where the initial transcription is generated without punctuation marks; restoring punctuation marks; performing a segmentation of the initial transcription into text portions, based on the restored punctuation marks; determining, using a first ML model, segment-level timestamps for the text portions based on the natural speech; performing an audio segmentation on the natural speech, by cutting the natural speech based on the segment-level timestamps, to obtain audio chunks; generating, using a second transcription model, transcription portions for each of the audio chunks, where the transcription portions are thereafter merged to form a re-transcription; determining, using a second ML model, word-level timestamps for the re-transcription, by aligning the natural speech against the re-transcription; calculating silence time periods, each corresponding to a silence between each two adjacent words of the natural speech, based on the word-level timestamps determined for the re-transcription; and performing a final segmentation on the natural speech and on the re-transcription, based at least on the silence time periods, to generate final audio segments and corresponding final transcription portions. An auto-curation then may be performed on the final audio segments and corresponding final transcription portions, to detect outliers and provide curation for at least a substantial portion of the outliers.

Results of the disclosed techniques show substantial improvement in word error rate (WER) compared to the original segments of the People's Speech released by ML Commons, where WER for a transcription can be defined as a number of errors (substitution, insertion and deletion) divided by a number of words in the transcript.

Embodiments are scalable to any corpus or a combination of different corpora containing audio speech. The data collection is end-to-end fully automated, including curation, without any human intervention.

Embodiments may be applicable to the audio corpus in a plurality of different languages.

The ASR model training using datasets generated according to various embodiments can be implemented in chatbots that may perform accurately on sentiment analysis of utterances in one or more languages.

II. Bot and Analytic Systems

A bot (also referred to as a skill, chatbot, chatterbot, or talkbot) is a computer program that can perform conversations with end users. The bot can generally respond to natural-language messages (e.g., questions or comments) through a messaging application that uses natural-language messages. Enterprises may use one or more bot systems to communicate with end users through a messaging application. The messaging application, which may be referred to as a channel, may be an end user preferred messaging application that the end user has already installed and familiar with. Thus, the end user does not need to download and install new applications in order to chat with the bot system. The messaging application may include, for example, over-the-top (OTT) messaging channels (such as Facebook Messenger, Facebook WhatsApp, WeChat, Line, Kik, Telegram, Talk, Skype, Slack, or short message service), virtual private assistants (such as Amazon Dot, Echo, or Show, Google Home, Apple HomePod, etc.), mobile and web app extensions that extend native or hybrid/responsive mobile applications or web applications with chat capabilities, or voice based input (such as devices or applications with interfaces that use Siri, Cortana, Google Voice, or other speech input for interaction).

In some examples, a bot system may be associated with a Uniform Resource Identifier (URI). The URI may identify the bot system using a string of characters. The URI may be used as a webhook for one or more messaging application systems. The URI may include, for example, a Uniform Resource Locator (URL) or a Uniform Resource Name (URN). The bot system may be designed to receive a message (e.g., a hypertext transfer protocol (HTTP) post call message) from a messaging application system. The HTTP post call message may be directed to the URI from the messaging application system. In some embodiments, the message may be different from a HTTP post call message. For example, the bot system may receive a message from a Short Message Service (SMS). While discussion herein may refer to communications that the bot system receives as a message, it should be understood that the message may be an HTTP post call message, a SMS message, or any other type of communication between two systems.

End users may interact with the bot system through a conversational interaction (sometimes referred to as a conversational user interface (UI)), just as interactions between people. In some cases, the interaction may include the end user saying "Hello" to the bot and the bot responding with a "Hi" and asking the end user how it can help. In some cases, the interaction may also be a transactional interaction with, for example, a banking bot, such as transferring money from one account to another; an informational interaction with, for example, a HR bot, such as checking for vacation balance; or an interaction with, for example, a retail bot, such as discussing returning purchased goods or seeking technical support.

In some embodiments, the bot system may intelligently handle end user interactions without interaction with an administrator or developer of the bot system. For example, an end user may send one or more messages to the bot system in order to achieve a desired goal. A message may include certain content, such as text, emojis, audio, image, video, or other method of conveying a message. In some embodiments, the bot system may convert the content into a standardized form (e.g., a representational state transfer (REST) call against enterprise services with the proper parameters) and generate a natural language response. The bot system may also prompt the end user for additional input parameters or request other additional information. In some embodiments, the bot system may also initiate communication with the end user, rather than passively responding to end user utterances. Described herein are various techniques for identifying an explicit invocation of a bot system and determining an input for the bot system being invoked. In certain embodiments, explicit invocation analysis is performed by a master bot based on detecting an invocation name in an utterance. In response to detection of the invocation name, the utterance may be refined for input to a skill bot associated with the invocation name.

A conversation with a bot may follow a specific conversation flow including multiple states. The flow may define what would happen next based on an input. In some embodiments, a state machine that includes user defined states (e.g., end user intents) and actions to take in the states or from state to state may be used to implement the bot system. A conversation may take different paths based on the end user input, which may impact the decision the bot makes for the flow. For example, at each state, based on the end user input or utterances, the bot may determine the end user's intent in order to determine the appropriate next action to take. As used herein and in the context of an utterance, the term "intent" refers to an intent of the user who provided the utterance. For example, the user may intend to engage a bot in conversation for ordering pizza, so that the user's intent could be represented through the utterance "Order pizza." A user intent can be directed to a particular task that the user wishes a chatbot to perform on behalf of the user. Therefore, utterances can be phrased as questions, commands, requests, and the like, that reflect the user's intent. An intent may include a goal that the end user would like to accomplish.

In the context of the configuration of a chatbot, the term "intent" is used herein to refer to configuration information for mapping a user's utterance to a specific task/action or category of task/action that the chatbot can perform. In order to distinguish between the intent of an utterance (i.e., a user intent) and the intent of a chatbot, the latter is sometimes referred to herein as a "bot intent." A bot intent may include a set of one or more utterances associated with the intent. For instance, an intent for ordering pizza can be communicated by various permutations of utterances that express a desire to place an order for pizza. These associated utterances can be used to train an intent classifier of the chatbot to enable the intent classifier to subsequently determine whether an input utterance from a user matches the order pizza intent. A bot intent may be associated with one or more dialog flows for starting a conversation with the user and in a certain state. For example, the first message for the order pizza intent could be the question "What kind of pizza would you like?" In addition to associated utterances, a bot intent may further include named entities that relate to the intent. For example, the order pizza intent could include variables or parameters used to perform the task of ordering pizza, e.g., topping 1, topping 2, pizza type, pizza size, pizza quantity, and the like. The value of an entity is typically obtained through conversing with the user.

FIG. 1 is a simplified block diagram of an environment 100 incorporating a chatbot system according to certain embodiments. Environment 100 includes a digital assistant builder platform (DABP) 102 that enables users of DABP 102 to create and deploy digital assistants or chatbot systems. DABP 102 can be used to create one or more digital assistants (or DAs) or chatbot systems. For example, as shown in FIG. 1, user 104 representing a particular enterprise can use DABP 102 to create and deploy a digital assistant 106 for users of the particular enterprise. For example, DABP 102 can be used by a bank to create one or more digital assistants for use by the bank's customers. The same DABP 102 platform can be used by multiple enterprises to create digital assistants. As another example, an owner of a restaurant (e.g., a pizza shop) may use DABP 102 to create and deploy a digital assistant that enables customers of the restaurant to order food (e.g., order pizza).

For purposes of this disclosure, a "digital assistant" is an entity that helps users of the digital assistant accomplish various tasks through natural language conversations. A digital assistant can be implemented using software only (e.g., the digital assistant is a digital entity implemented using programs, code, or instructions executable by one or more processors), using hardware, or using a combination of hardware and software. A digital assistant can be embodied or implemented in various physical systems or devices, such as in a computer, a mobile phone, a watch, an appliance, a vehicle, and the like. A digital assistant is also sometimes referred to as a chatbot system. Accordingly, for purposes of this disclosure, the terms digital assistant and chatbot system are interchangeable.

A digital assistant, such as digital assistant 106 built using DABP 102, can be used to perform various tasks via natural language-based conversations between the digital assistant and its users 108. As part of a conversation, a user may provide one or more user inputs 110 to digital assistant 106 and get responses 112 back from digital assistant 106. A conversation can include one or more of inputs 110 and responses 112. Via these conversations, a user can request one or more tasks to be performed by the digital assistant and, in response, the digital assistant is configured to perform the user-requested tasks and respond with appropriate responses to the user.

User inputs 110 are generally in a natural language form and are referred to as utterances. A user utterance 110 can be in text form, such as when a user types in a sentence, a question, a text fragment, or even a single word and provides it as input to digital assistant 106. In some embodiments, a user utterance 110 can be in audio input or speech form, such as when a user says or speaks something that is provided as input to digital assistant 106. The utterances are typically in a language spoken by the user 108. For example, the utterances may be in English, or some other language. When an utterance is in speech form, the speech input is converted to text form utterances in that particular language and the text utterances are then processed by digital assistant 106. Various speech-to-text processing techniques may be used to convert a speech or audio input to a text utterance, which is then processed by digital assistant 106. In some embodiments, the speech-to-text conversion may be done by digital assistant 106 itself.

An utterance, which may be a text utterance or a speech utterance, can be a fragment, a sentence, multiple sentences, one or more words, one or more questions, combinations of the aforementioned types, and the like. Digital assistant 106 is configured to apply natural language understanding (NLU) techniques to the utterance to understand the meaning of the user input. As part of the NLU processing for a utterance, digital assistant 106 is configured to perform processing to understand the meaning of the utterance, which involves identifying one or more intents and one or more entities corresponding to the utterance. Upon understanding the meaning of an utterance, digital assistant 106 may perform one or more actions or operations responsive to the understood meaning or intents. For purposes of this disclosure, it is assumed that the utterances are text utterances that have been provided directly by a user 108 of digital assistant 106 or are the results of conversion of input speech utterances to text form. This however is not intended to be limiting or restrictive in any manner.

For example, a user 108 input may request a pizza to be ordered by providing an utterance such as "I want to order a pizza." Upon receiving such an utterance, digital assistant 106 is configured to understand the meaning of the utterance and take appropriate actions. The appropriate actions may involve, for example, responding to the user with questions requesting user input on the type of pizza the user desires to order, the size of the pizza, any toppings for the pizza, and the like. The responses provided by digital assistant 106 may also be in natural language form and typically in the same language as the input utterance. As part of generating these responses, digital assistant 106 may perform natural language generation (NLG). For the user ordering a pizza, via the conversation between the user and digital assistant 106, the digital assistant may guide the user to provide all the requisite information for the pizza order, and then at the end of the conversation cause the pizza to be ordered. Digital assistant 106 may end the conversation by outputting information to the user indicating that the pizza has been ordered.

At a conceptual level, digital assistant 106 performs various processing in response to an utterance received from a user. In some embodiments, this processing involves a series or pipeline of processing steps including, for example, understanding the meaning of the input utterance (sometimes referred to as Natural Language Understanding (NLU), determining an action to be performed in response to the utterance, where appropriate causing the action to be performed, generating a response to be output to the user responsive to the user utterance, outputting the response to the user, and the like. The NLU processing can include parsing the received input utterance to understand the structure and meaning of the utterance, refining and reforming the utterance to develop a better understandable form (e.g., logical form) or structure for the utterance. Generating a response may include using NLG techniques.

The NLU processing performed by a digital assistant, such as digital assistant 106, can include various Natural Language Processing (NLP) related processing such as sentence parsing (e.g., tokenizing, lemmatizing, identifying part-of-speech tags for the sentence, identifying named entities in the sentence, generating dependency trees to represent the sentence structure, splitting a sentence into clauses, analyzing individual clauses, resolving anaphoras, performing chunking, and the like). In certain embodiments, the NLU processing or portions thereof is performed by digital assistant 106 itself. In some other embodiments, digital assistant 106 may use other resources to perform portions of the NLU processing. For example, the syntax and structure of an input utterance sentence may be identified by processing the sentence using a parser, a part-of-speech tagger, and/or a named entity recognizer. In one implementation, for the English language, a parser, a part-of-speech tagger, and a named entity recognizer such as ones provided by the Stanford NLP Group are used for analyzing the sentence structure and syntax. These are provided as part of the Stanford CoreNLP toolkit.

While the various examples provided in this disclosure show utterances in the English language, this is meant only as an example. In certain embodiments, digital assistant 106 is also capable of handling utterances in languages other than English. Digital assistant 106 may provide subsystems (e.g., components implementing NLU functionality) that are configured for performing processing for different languages. These subsystems may be implemented as pluggable units that can be called using service calls from an NLU core server. This makes the NLU processing flexible and extensible for each language, including allowing different orders of processing. A language pack may be provided for individual languages, where a language pack can register a list of subsystems that can be served from the NLU core server.

A digital assistant, such as digital assistant 106 depicted in FIG. 1, can be made available or accessible to its users 108 through a variety of different channels, such as but not limited to, via certain applications, via social media platforms, via various messaging services and applications, and other applications or channels. A single digital assistant can have several channels configured for it so that it can be run on and be accessed by different services simultaneously.

A digital assistant or chatbot system generally contains or is associated with one or more skills. In certain embodiments, these skills are individual chatbots (referred to as skill bots) that are configured to interact with users and fulfill specific types of tasks, such as tracking inventory, submitting timecards, creating expense reports, ordering food, checking a bank account, making reservations, buying a widget, and the like. For example, for the embodiment depicted in FIG. 1, digital assistant or chatbot system 106 includes skills 116-1, 116-2, and so on. For purposes of this disclosure, the terms "skill" and "skills" are used synonymously with the terms "skill bot" and "skill bots", respectively.

Each skill associated with a digital assistant helps a user of the digital assistant complete a task through a conversation with the user, where the conversation can include a combination of text or audio inputs provided by the user and responses provided by the skill bots. These responses may be in the form of text or audio messages to the user and/or using user interface elements (e.g., select lists) that are presented to the user for the user to make selections.

There are various ways in which a skill or skill bot can be associated or added to a digital assistant. In some instances, a skill bot can be developed by an enterprise and then added to a digital assistant using DABP 102. In other instances, a skill bot can be developed and created using DABP 102 and then added to a digital assistant created using DABP 102. In yet other instances, DABP 102 provides an online digital store (referred to as a "skills store") that offers multiple skills directed to a wide range of tasks. The skills offered through the skills store may also expose various cloud services. In order to add a skill to a digital assistant being generated using DABP 102, a user of DABP 102 can access the skills store via DABP 102, select a desired skill, and indicate that the selected skill is to be added to the digital assistant created using DABP 102. A skill from the skills store can be added to a digital assistant as is or in a modified form (for example, a user of DABP 102 may select and clone a particular skill bot provided by the skills store, make customizations or modifications to the selected skill bot, and then add the modified skill bot to a digital assistant created using DABP 102).

Various different architectures may be used to implement a digital assistant or chatbot system. For example, in certain embodiments, the digital assistants created and deployed using DABP 102 may be implemented using a master bot/child(or sub) bot paradigm or architecture. According to this paradigm, a digital assistant is implemented as a master bot that interacts with one or more child bots that are skill bots. For example, in the embodiment depicted in FIG. 1, digital assistant 106 includes a master bot 114 and skill bots 116-1, 116-2, etc. that are child bots of master bot 114. In certain embodiments, digital assistant 106 is itself considered to act as the master bot.

A digital assistant implemented according to the master-child bot architecture enables users of the digital assistant to interact with multiple skills through a unified user interface, namely via the master bot. When a user engages with a digital assistant, the user input is received by the master bot. The master bot then performs processing to determine the meaning of the user input utterance. The master bot then determines whether the task requested by the user in the utterance can be handled by the master bot itself, else the master bot selects an appropriate skill bot for handling the user request and routes the conversation to the selected skill bot. This enables a user to converse with the digital assistant through a common single interface and still provide the capability to use several skill bots configured to perform specific tasks. For example, for a digital assistance developed for an enterprise, the master bot of the digital assistant may interface with skill bots with specific functionalities, such as a customer relationship management (CRM) bot for performing functions related to CRM, an enterprise resource planning (ERP) bot for performing functions related to ERP, a human capital management (HCM) bot for performing functions related to HCM, etc. This way the end user or consumer of the digital assistant need only know how to access the digital assistant through the common master bot interface and behind the scenes multiple skill bots are provided for handling the user request.

In certain embodiments, in a master bot/child bots infrastructure, the master bot is configured to be aware of the available list of skill bots. The master bot may have access to metadata that identifies the various available skill bots, and for each skill bot, the capabilities of the skill bot including the tasks that can be performed by the skill bot. Upon receiving a user request in the form of an utterance, the master bot is configured to, from the multiple available skill bots, identify or predict a specific skill bot that can best serve or handle the user request. The master bot then routes the utterance (or a portion of the utterance) to that specific skill bot for further handling. Control thus flows from the master bot to the skill bots. The master bot can support multiple input and output channels. In certain embodiments, routing may be performed with the aid of processing performed by one or more available skill bots. For example, as discussed below, a skill bot can be trained to infer an intent for an utterance and to determine whether the inferred intent matches an intent with which the skill bot is configured. Thus, the routing performed by the master bot can involve the skill bot communicating to the master bot an indication of whether the skill bot has been configured with an intent suitable for handling the utterance.

While the embodiment in FIG. 1 shows digital assistant 106 including a master bot 114 and skill bots 116-1, 116-2, and 116-3, this is not intended to be limiting. A digital assistant can include various other components (e.g., other systems and subsystems) that provide the functionalities of the digital assistant. These systems and subsystems may be implemented only in software (e.g., code, instructions stored on a computer-readable medium and executable by one or more processors), in hardware only, or in implementations that use a combination of software and hardware.

DABP 102 provides an infrastructure and various services and features that enable a user of DABP 102 to create a digital assistant including one or more skill bots associated with the digital assistant. In some instances, a skill bot can be created by cloning an existing skill bot, for example, cloning a skill bot provided by the skills store. As previously indicated, DABP 102 provides a skills store or skills catalog that offers multiple skill bots for performing various tasks. A user of DABP 102 can clone a skill bot from the skills store. As needed, modifications or customizations may be made to the cloned skill bot. In some other instances, a user of DABP 102 created a skill bot from scratch using tools and services offered by DABP 102. As previously indicated, the skills store or skills catalog provided by DABP 102 may offer multiple skill bots for performing various tasks.

In certain embodiments, at a high level, creating or customizing a skill bot involves the following steps:
  (1) Configuring settings for a new skill bot
  (2) Configuring one or more intents for the skill bot
  (3) Configuring one or more entities for one or more intents
  (4) Training the skill bot
  (5) Creating a dialog flow for the skill bot
  (6) Adding custom components to the skill bot as needed
  (7) Testing and deploying the skill bot
Each of the above steps is briefly described below.

(1) Configuring settings for a new skill bot—Various settings may be configured for the skill bot. For example, a skill bot designer can specify one or more invocation names for the skill bot being created. These invocation names can then be used by users of a digital assistant to explicitly invoke the skill bot. For example, a user can input an invocation name in the user's utterance to explicitly invoke the corresponding skill bot.

(2) Configuring one or more intents and associated example utterances for the skill bot—The skill bot designer specifies one or more intents (also referred to as bot intents) for a skill bot being created. The skill bot is then trained based upon these specified intents. These intents represent categories or classes that the skill bot is trained to infer for input utterances. Upon receiving an utterance, a trained skill bot infers an intent for the utterance, where the inferred intent is selected from the predefined set of intents used to train the skill bot. The skill bot then takes an appropriate action responsive to an utterance based upon the intent inferred for that utterance. In some instances, the intents for a skill bot represent tasks that the skill bot can perform for users of the digital assistant. Each intent is given an intent identifier or intent name. For example, for a skill bot trained for a bank, the intents specified for the skill bot may include "CheckBalance," "TransferMoney," "DepositCheck," and the like.

For each intent defined for a skill bot, the skill bot designer may also provide one or more example utterances that are representative of and illustrate the intent. These example utterances are meant to represent utterances that a user may input to the skill bot for that intent. For example, for the CheckBalance intent, example utterances may include "What's my savings account balance?", "How much is in my checking account?", "How much money do I have in my account," and the like. Accordingly, various permutations of typical user utterances may be specified as example utterances for an intent.

The intents and their associated example utterances are used as training data to train the skill bot. Various different training techniques may be used. As a result of this training, a prediction model is generated that is configured to take an utterance as input and output an intent inferred for the utterance by the prediction model. In some instances, input utterances are provided to an intent analysis engine, which is configured to use the trained model to predict or infer an intent for the input utterance. The skill bot may then take one or more actions based upon the inferred intent.

(3) Configuring entities for one or more intents of the skill bot—In some instances, additional context may be needed to enable the skill bot to properly respond to a user utterance. For example, there may be situations where a user input utterance resolves to the same intent in a skill bot. For instance, in the above example, utterances "What's my savings account balance?" and "How much is in my checking account?" both resolve to the same CheckBalance intent, but these utterances are different requests asking for different things. To clarify such requests, one or more entities are added to an intent. Using the banking skill bot example, an entity called AccountType, which defines values called "checking" and "saving" may enable the skill bot to parse the user request and respond appropriately. In the above example, while the utterances resolve to the same intent, the value associated with the AccountType entity is different for the two utterances. This enables the skill bot to perform possibly different actions for the two utterances in spite of them resolving to the same intent. One or more entities can be specified for certain intents configured for the skill bot. Entities are thus used to add context to the intent itself. Entities help describe an intent more fully and enable the skill bot to complete a user request.

In certain embodiments, there are two types of entities: (a) built-in entities provided by DABP 102, and (2) custom entities that can be specified by a skill bot designer. Built-in entities are generic entities that can be used with a wide variety of bots. Examples of built-in entities include, without limitation, entities related to time, date, addresses, numbers, email addresses, duration, recurring time periods, currencies, phone numbers, URLs, and the like. Custom entities are used for more customized applications. For example, for a banking skill, an AccountType entity may be defined by the skill bot designer that enables various banking transactions by checking the user input for keywords like checking, savings, and credit cards, etc.

(4) Training the skill bot—A skill bot is configured to receive user input in the form of utterances parse or otherwise process the received input, and identify or select an intent that is relevant to the received user input. As indicated above, the skill bot has to be trained for this. In certain embodiments, a skill bot is trained based upon the intents configured for the skill bot and the example utterances associated with the intents (collectively, the training data), so that the skill bot can resolve user input utterances to one of its configured intents. In certain embodiments, the skill bot uses a prediction model that is trained using the training data and allows the skill bot to discern what users say (or in some cases, are trying to say). DABP 102 provides various different training techniques that can be used by a skill bot designer to train a skill bot, including various machine-learning based training techniques, rules-based training techniques, and/or combinations thereof. In certain embodiments, a portion (e.g., 80%) of the training data is used to train a skill bot model and another portion (e.g., the remaining 20%) is used to test or verify the model. Once trained, the trained model (also sometimes referred to as the trained skill bot) can then be used to handle and respond to user utterances. In certain cases, a user's utterance may be a question that requires only a single answer and no further conversation. In order to handle such situations, a Q&A (question-and-answer) intent may be defined for a skill bot. This enables a skill bot to output replies to user requests without having to update the dialog definition. Q&A intents are created in a similar manner as regular intents. The dialog flow for Q&A intents can be different from that for regular intents.

(5) Creating a dialog flow for the skill bot—A dialog flow specified for a skill bot describes how the skill bot reacts as different intents for the skill bot are resolved responsive to received user input. The dialog flow defines operations or actions that a skill bot will take, e.g., how the skill bot responds to user utterances, how the skill bot prompts users for input, how the skill bot returns data. A dialog flow is like a flowchart that is followed by the skill bot. The skill bot designer specifies a dialog flow using a language, such as markdown language. In certain embodiments, a version of YAML called OBotML may be used to specify a dialog flow for a skill bot. The dialog flow definition for a skill bot acts as a model for the conversation itself, one that lets the skill bot designer choreograph the interactions between a skill bot and the users that the skill bot services.

In certain embodiments, the dialog flow definition for a skill bot contains three sections:
(a) a context section
(b) a default transitions section
(c) a states section Context section—The skill bot designer can define variables that are used in a conversation flow in the context section. Other variables that may be named in the context section include, without limitation: variables for error handling, variables for built-in or custom entities, user variables that enable the skill bot to recognize and persist user preferences, and the like.

Default transitions section—Transitions for a skill bot can be defined in the dialog flow states section or in the default transitions section. The transitions defined in the default transition section act as a fallback and get triggered when there are no applicable transitions defined within a state, or the conditions required to trigger a state transition cannot be met. The default transitions section can be used to define routing that allows the skill bot to gracefully handle unexpected user actions.

States section—A dialog flow and its related operations are defined as a sequence of transitory states, which manage the logic within the dialog flow. Each state node within a dialog flow definition names a component that provides the functionality needed at that point in the dialog. States are thus built around the components. A state contains component-specific properties and defines the transitions to other states that get triggered after the component executes.

Special case scenarios may be handled using the states sections. For example, there might be times when you want to provide users the option to temporarily leave a first skill they are engaged with to do something in a second skill within the digital assistant. For example, if a user is engaged in a conversation with a shopping skill (e.g., the user has made some selections for purchase), the user may want to jump to a banking skill (e.g., the user may want to ensure that he/she has enough money for the purchase), and then return to the shopping skill to complete the user's order. To address this, an action in the first skill can be configured to initiate an interaction with the second different skill in the same digital assistant and then return to the original flow.

(6) Adding custom components to the skill bot—As described above, states specified in a dialog flow for a skill bot name components that provide the functionality needed corresponding to the states. Components enable a skill bot to perform functions. In certain embodiments, DABP 102 provides a set of preconfigured components for performing a wide range of functions. A skill bot designer can select one of more of these preconfigured components and associate them with states in the dialog flow for a skill bot. The skill bot designer can also create custom or new components using tools provided by DABP 102 and associate the custom components with one or more states in the dialog flow for a skill bot.

(7) Testing and deploying the skill bot—DABP 102 provides several features that enable the skill bot designer to test a skill bot being developed. The skill bot can then be deployed and included in a digital assistant.

While the description above describes how to create a skill bot, similar techniques may also be used to create a digital assistant (or the master bot). At the master bot or digital assistant level, built-in system intents may be configured for the digital assistant. These built-in system intents are used to identify general tasks that the digital assistant itself (i.e., the master bot) can handle without invoking a skill bot associated with the digital assistant. Examples of system intents defined for a master bot include: (1) Exit: applies when the user signals the desire to exit the current conversation or context in the digital assistant; (2) Help: applies when the user asks for help or orientation; and (3) UnresolvedIntent: applies to user input that doesn't match well with the exit and help intents. The digital assistant also stores information about the one or more skill bots associated with the digital assistant. This information enables the master bot to select a particular skill bot for handling an utterance.

At the master bot or digital assistant level, when a user inputs a phrase or utterance to the digital assistant, the digital assistant is configured to perform processing to determine how to route the utterance and the related conversation. The digital assistant determines this using a routing model, which can be rules-based, AI-based, or a combination thereof. The digital assistant uses the routing model to determine whether the conversation corresponding to the user input utterance is to be routed to a particular skill for handling, is to be handled by the digital assistant or master bot itself per a built-in system intent, or is to be handled as a different state in a current conversation flow.

In certain embodiments, as part of this processing, the digital assistant determines if the user input utterance explicitly identifies a skill bot using its invocation name. If an invocation name is present in the user input, then it is treated as explicit invocation of the skill bot corresponding to the invocation name. In such a scenario, the digital assistant may route the user input to the explicitly invoked skill bot for further handling. If there is no specific or explicit invocation, in certain embodiments, the digital assistant evaluates the received user input utterance and computes confidence scores for the system intents and the skill bots associated with the digital assistant. The score computed for a skill bot or system intent represents how likely the user input is representative of a task that the skill bot is configured to perform or is representative of a system intent. Any system intent or skill bot with an associated computed confidence score exceeding a threshold value (e.g., a Confidence Threshold routing parameter) is selected as a candidate for further evaluation. The digital assistant then selects, from the identified candidates, a particular system intent or a skill bot for further handling of the user input utterance. In certain embodiments, after one or more skill bots are identified as candidates, the intents associated with those candidate skills are evaluated (according to the intent model for each skill) and confidence scores are determined for each intent. In general, any intent that has a confidence score exceeding a threshold value (e.g., 70%) is treated as a candidate intent. If a particular skill bot is selected, then the user utterance is routed to that skill bot for further processing. If a system intent is selected, then one or more actions are performed by the master bot itself according to the selected system intent.

Figure 2:
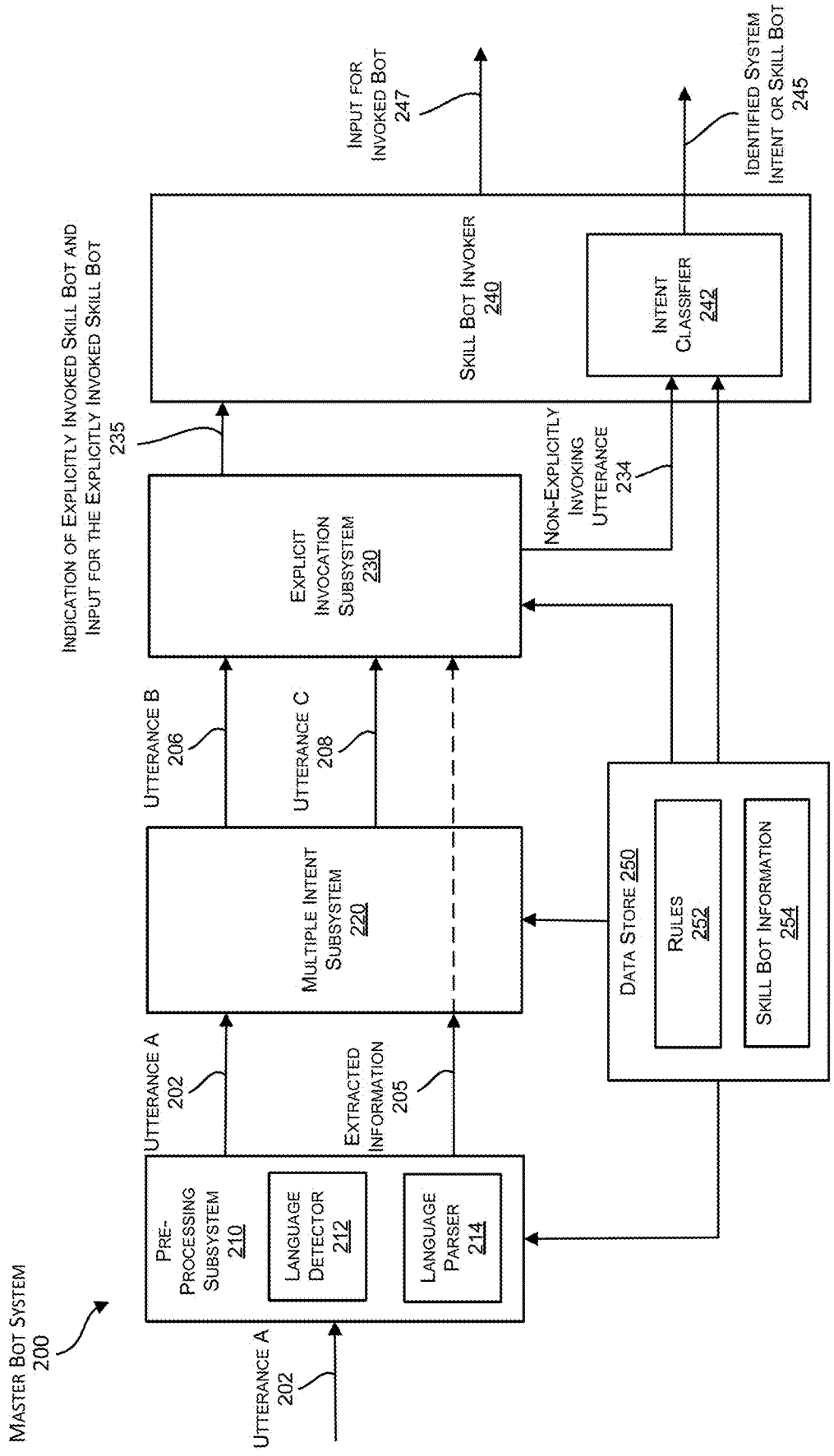
FIG. 2 is a simplified block diagram of a computing system implementing a master bot according to certain embodiments.

FIG. 2 is a simplified block diagram of a master bot (MB) system 200 according to certain embodiments. MB system 200 can be implemented in software only, hardware only, or a combination of hardware and software. MB system 200 includes a pre-processing subsystem 210, a multiple intent subsystem (MIS) 220, an explicit invocation subsystem (EIS) 230, a skill bot invoker 240, and a data store 250. MB system 200 depicted in FIG. 2 is merely an example of an arrangement of components in a master bot. One of ordinary skill in the art would recognize many possible variations, alternatives, and modifications. For example, in some implementations, MB system 200 may have more or fewer systems or components than those shown in FIG. 2, may combine two or more subsystems, or may have a different configuration or arrangement of subsystems.

Pre-processing subsystem 210 receives an utterance "A" 202 from a user and processes the utterance through a language detector 212 and a language parser 214. As indicated above, an utterance can be provided in various ways including audio or text. The utterance 202 can be a sentence fragment, a complete sentence, multiple sentences, and the like. Utterance 202 can include punctuation. For example, if the utterance 202 is provided as audio, the pre-processing subsystem 210 may convert the audio to text using a speech-to-text converter (not shown) that inserts punctuation marks into the resulting text, e.g., commas, semicolons, periods, etc.

Language detector 212 detects the language of the utterance 202 based on the text of the utterance 202. The manner in which the utterance 202 is handled depends on the language since each language has its own grammar and semantics. Differences between languages are taken into consideration when analyzing the syntax and structure of an utterance.

Language parser 214 parses the utterance 202 to extract part of speech (POS) tags for individual linguistic units (e.g., words) in the utterance 202. POS tags include, for example, noun (NN), pronoun (PN), verb (VB), and the like. Language parser 214 may also tokenize the linguistic units of the utterance 202 (e.g., to convert each word into a separate token) and lemmatize words. A lemma is the main form of a set of words as represented in a dictionary (e.g., "run" is the lemma for run, runs, ran, running, etc.). Other types of pre-processing that the language parser 214 can perform include chunking of compound expressions, e.g., combining "credit" and "card" into a single expression "credit_card." Language parser 214 may also identify relationships between the words in the utterance 202. For example, in some embodiments, the language parser 214 generates a dependency tree that indicates which part of the utterance (e.g., a particular noun) is a direct object, which part of the utterance is a preposition, and so on. The results of the processing performed by the language parser 214 form extracted information 205 and are provided as input to MIS 220 together with the utterance 202 itself.

As indicated above, the utterance 202 can include more than one sentence. For purposes of detecting multiple intents and explicit invocation, the utterance 202 can be treated as a single unit even if it includes multiple sentences. However, in certain embodiments, pre-processing can be performed, e.g., by the pre-processing subsystem 210, to identify a single sentence among multiple sentences for multiple intents analysis and explicit invocation analysis. In general, the results produced by MIS 220 and EIS 230 are substantially the same regardless of whether the utterance 202 is processed at the level of an individual sentence or as a single unit including multiple sentences.

Figure 3:
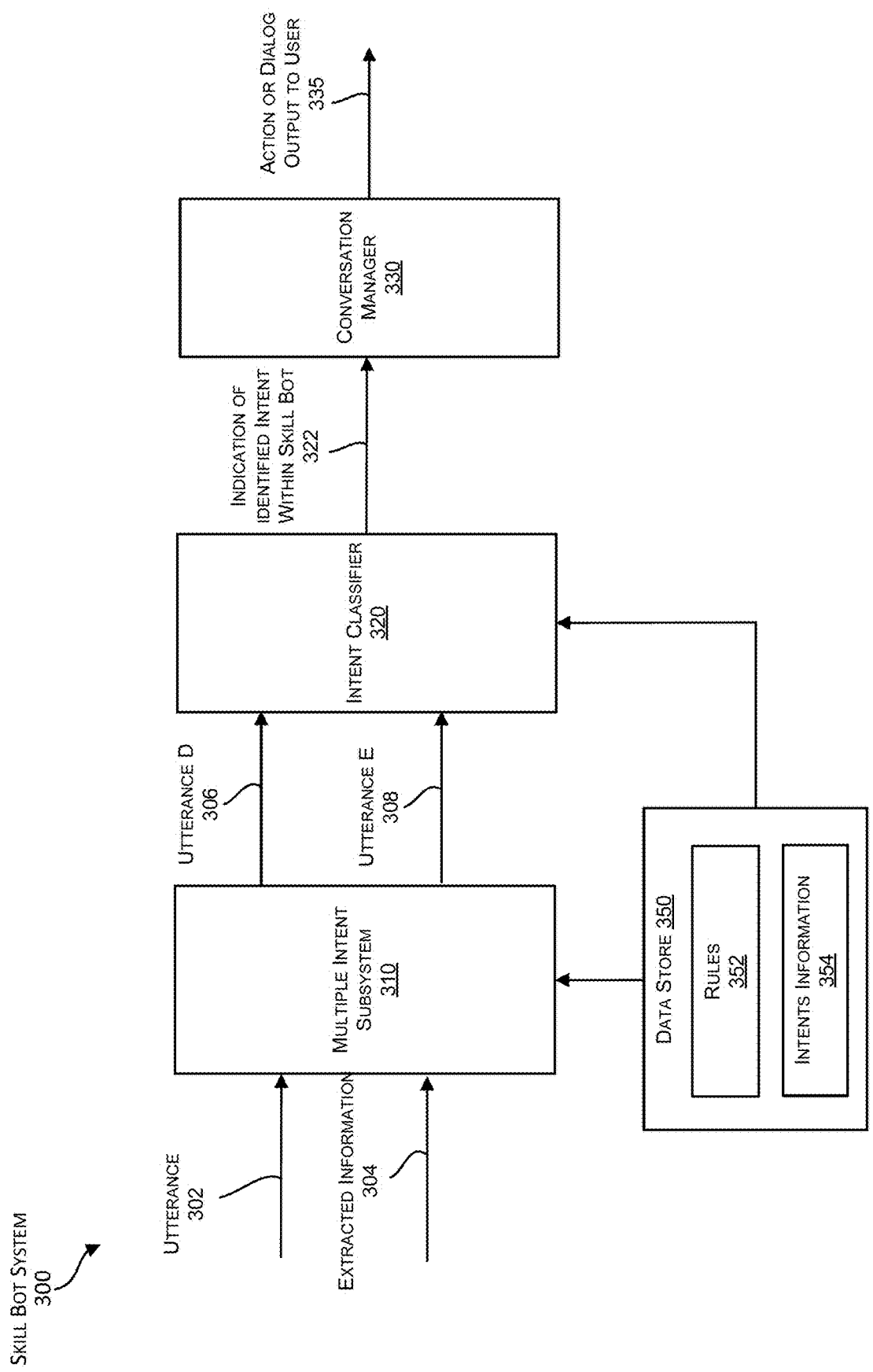
FIG. 3 is a simplified block diagram of a computing system implementing a skill bot according to certain embodiments.

MIS 220 determines whether the utterance 202 represents multiple intents. Although MIS 220 can detect the presence of multiple intents in the utterance 202, the processing performed by MIS 220 does not involve determining whether the intents of the utterance 202 match to any intents that have been configured for a bot. Instead, processing to determine whether an intent of the utterance 202 matches a bot intent can be performed by an intent classifier 242 of the MB system 200 or by an intent classifier of a skill bot (e.g., as shown in the embodiment of FIG. 3). The processing performed by MIS 220 assumes that there exists a bot (e.g., a particular skill bot or the master bot itself) that can handle the utterance 202. Therefore, the processing performed by MIS 220 does not require knowledge of what bots are in the chatbot system (e.g., the identities of skill bots registered with the master bot) or knowledge of what intents have been configured for a particular bot.

To determine that the utterance 202 includes multiple intents, the MIS 220 applies one or more rules from a set of rules 252 in the data store 250. The rules applied to the utterance 202 depend on the language of the utterance 202 and may include sentence patterns that indicate the presence of multiple intents. For example, a sentence pattern may include a coordinating conjunction that joins two parts (e.g., conjuncts) of a sentence, where both parts correspond to a separate intent. If the utterance 202 matches the sentence pattern, it can be inferred that the utterance 202 represents multiple intents. It should be noted that an utterance with multiple intents does not necessarily have different intents (e.g., intents directed to different bots or to different intents within the same bot). Instead, the utterance could have separate instances of the same intent, e.g., "Place a pizza order using payment account X, then place a pizza order using payment account Y."

As part of determining that the utterance 202 represents multiple intents, the MIS 220 also determines what portions of the utterance 202 are associated with each intent. MIS 220 constructs, for each intent represented in an utterance containing multiple intents, a new utterance for separate processing in place of the original utterance, e.g., an utterance "B" 206 and an utterance "C" 208, as depicted in FIG. 2. Thus, the original utterance 202 can be split into two or more separate utterances that are handled one at a time. MIS 220 determines, using the extracted information 205 and/or from analysis of the utterance 202 itself, which of the two or more utterances should be handled first. For example, MIS 220 may determine that the utterance 202 contains a marker word indicating that a particular intent should be handled first. The newly formed utterance corresponding to this particular intent (e.g., one of utterance 206 or utterance 208) will be the first to be sent for further processing by EIS 230. After a conversation triggered by the first utterance has ended (or has been temporarily suspended), the next highest priority utterance (e.g., the other one of utterance 206 or utterance 208) can then be sent to the EIS 230 for processing.

EIS 230 determines whether the utterance that it receives (e.g., utterance 206 or utterance 208) contains an invocation name of a skill bot. In certain embodiments, each skill bot in a chatbot system is assigned a unique invocation name that distinguishes the skill bot from other skill bots in the chatbot system. A list of invocation names can be maintained as part of skill bot information 254 in data store 250. An utterance is deemed to be an explicit invocation when the utterance contains a word match to an invocation name. If a bot is not explicitly invoked, then the utterance received by the EIS 230 is deemed a non-explicitly invoking utterance 234 and is input to an intent classifier (e.g., intent classifier 242) of the master bot to determine which bot to use for handling the utterance. In some instances, the intent classifier 242 will determine that the master bot should handle a non-explicitly invoking utterance. In other instances, the intent classifier 242 will determine a skill bot to route the utterance to for handling.

The explicit invocation functionality provided by the EIS 230 has several advantages. It can reduce the amount of processing that the master bot has to perform. For example, when there is an explicit invocation, the master bot may not have to do any intent classification analysis (e.g., using the intent classifier 242), or may have to do reduced intent classification analysis for selecting a skill bot. Thus, explicit invocation analysis may enable selection of a particular skill bot without resorting to intent classification analysis.

Also, there may be situations where there is an overlap in functionalities between multiple skill bots. This may happen, for example, if the intents handled by the two skill bots overlap or are very close to each other. In such a situation, it may be difficult for the master bot to identify which of the multiple skill bots to select based upon intent classification analysis alone. In such scenarios, the explicit invocation disambiguates the particular skill bot to be used.

In addition to determining that an utterance is an explicit invocation, the EIS 230 is responsible for determining whether any portion of the utterance should be used as input to the skill bot being explicitly invoked. In particular, EIS 230 can determine whether part of the utterance is not associated with the invocation. The EIS 230 can perform this determination through analysis of the utterance and/or analysis of the extracted information 205. EIS 230 can send the part of the utterance not associated with the invocation to the invoked skill bot in lieu of sending the entire utterance that was received by the EIS 230. In some instances, the input to the invoked skill bot is formed simply by removing any portion of the utterance associated with the invocation. For example, "I want to order pizza using Pizza Bot" can be shortened to "I want to order pizza" since "using Pizza Bot" is relevant to the invocation of the pizza bot, but irrelevant to any processing to be performed by the pizza bot. In some instances, EIS 230 may reformat the part to be sent to the invoked bot, e.g., to form a complete sentence. Thus, the EIS 230 determines not only that there is an explicit invocation, but also what to send to the skill bot when there is an explicit invocation. In some instances, there may not be any text to input to the bot being invoked. For example, if the utterance was "Pizza Bot", then the EIS 230 could determine that the pizza bot is being invoked, but there is no text to be processed by the pizza bot. In such scenarios, the EIS 230 may indicate to the skill bot invoker 240 that there is nothing to send.

Skill bot invoker 240 invokes a skill bot in various ways. For instance, skill bot invoker 240 can invoke a bot in response to receiving an indication 235 that a particular skill bot has been selected as a result of an explicit invocation. The indication 235 can be sent by the EIS 230 together with the input for the explicitly invoked skill bot. In this scenario, the skill bot invoker 240 will turn control of the conversation over to the explicitly invoked skill bot. The explicitly invoked skill bot will determine an appropriate response to the input from the EIS 230 by treating the input as a stand-alone utterance. For example, the response could be to perform a specific action or to start a new conversation in a particular state, where the initial state of the new conversation depends on the input sent from the EIS 230.

Another way in which skill bot invoker 240 can invoke a skill bot is through implicit invocation using the intent classifier 242. The intent classifier 242 can be trained, using machine-learning and/or rules-based training techniques, to determine a likelihood that an utterance is representative of a task that a particular skill bot is configured to perform. The intent classifier 242 is trained on different classes, one class for each skill bot. For instance, whenever a new skill bot is registered with the master bot, a list of example utterances associated with the new skill bot can be used to train the intent classifier 242 to determine a likelihood that a particular utterance is representative of a task that the new skill bot can perform. The parameters produced as result of this training (e.g., a set of values for parameters of a machine-learning model) can be stored as part of skill bot information 254.

In certain embodiments, the intent classifier 242 is implemented using a machine-learning model, as described in further detail herein. Training of the machine-learning model may involve inputting at least a subset of utterances from the example utterances associated with various skill bots to generate, as an output of the machine-learning model, inferences as to which bot is the correct bot for handling any particular training utterance. For each training utterance, an indication of the correct bot to use for the training utterance may be provided as ground truth information. The behavior of the machine-learning model can then be adapted (e.g., through backpropagation) to minimize the difference between the generated inferences and the ground truth information.

In certain embodiments, the intent classifier 242 determines, for each skill bot registered with the master bot, a confidence score indicating a likelihood that the skill bot can handle an utterance (e.g., the non-explicitly invoking utterance 234 received from EIS 230). The intent classifier 242 may also determine a confidence score for each system level intent (e.g., help, exit) that has been configured. If a particular confidence score meets one or more conditions, then the skill bot invoker 240 will invoke the bot associated with the particular confidence score. For example, a threshold confidence score value may need to be met. Thus, an output 245 of the intent classifier 242 is either an identification of a system intent or an identification of a particular skill bot. In some embodiments, in addition to meeting a threshold confidence score value, the confidence score must exceed the next highest confidence score by a certain win margin. Imposing such a condition would enable routing to a particular skill bot when the confidence scores of multiple skill bots each exceed the threshold confidence score value.

After identifying a bot based on evaluation of confidence scores, the skill bot invoker 240 hands over processing to the identified bot. In the case of a system intent, the identified bot is the master bot. Otherwise, the identified bot is a skill bot. Further, the skill bot invoker 240 will determine what to provide as input 247 for the identified bot. As indicated above, in the case of an explicit invocation, the input 247 can be based on a part of an utterance that is not associated with the invocation, or the input 247 can be nothing (e.g., an empty string). In the case of an implicit invocation, the input 247 can be the entire utterance.

Data store 250 includes one or more computing devices that store data used by the various subsystems of the master bot system 200. As explained above, the data store 250 includes rules 252 and skill bot information 254. The rules 252 include, for example, rules for determining, by MIS 220, when an utterance represents multiple intents and how to split an utterance that represents multiple intents. The rules 252 further include rules for determining, by EIS 230, which parts of an utterance that explicitly invokes a skill bot to send to the skill bot. The skill bot information 254 includes invocation names of skill bots in the chatbot system, e.g., a list of the invocation names of all skill bots registered with a particular master bot. The skill bot information 254 can also include information used by intent classifier 242 to determine a confidence score for each skill bot in the chatbot system, e.g., parameters of a machine-learning model.

FIG. 3 is a simplified block diagram of a skill bot system 300 according to certain embodiments. Skill bot system 300 is a computing system that can be implemented in software only, hardware only, or a combination of hardware and software. In certain embodiments such as the embodiment depicted in FIG. 1, skill bot system 300 can be used to implement one or more skill bots within a digital assistant.

Skill bot system 300 includes an MIS 310, an intent classifier 320, and a conversation manager 330. The MIS 310 is analogous to the MIS 220 in FIG. 2 and provides similar functionality, including being operable to determine, using rules 352 in a data store 350: (1) whether an utterance represents multiple intents and, if so, (2) how to split the utterance into a separate utterance for each intent of the multiple intents. In certain embodiments, the rules applied by MIS 310 for detecting multiple intents and for splitting an utterance are the same as those applied by MIS 220. The MIS 310 receives an utterance 302 and extracted information 304. The extracted information 304 is analogous to the extracted information 205 in FIG. 1 and can be generated using the language parser 214 or a language parser local to the skill bot system 300.

Intent classifier 320 can be trained in a similar manner to the intent classifier 242 discussed above in connection with the embodiment of FIG. 2 and as described in further detail herein. For instance, in certain embodiments, the intent classifier 320 is implemented using a machine-learning model. The machine-learning model of the intent classifier 320 is trained for a particular skill bot, using at least a subset of example utterances associated with that particular skill bot as training utterances. The ground truth for each training utterance would be the particular bot intent associated with the training utterance.

The utterance 302 can be received directly from the user or supplied through a master bot. When the utterance 302 is supplied through a master bot, e.g., as a result of processing through MIS 220 and EIS 230 in the embodiment depicted in FIG. 2, the MIS 310 can be bypassed so as to avoid repeating processing already performed by MIS 220. However, if the utterance 302 is received directly from the user, e.g., during a conversation that occurs after routing to a skill bot, then MIS 310 can process the utterance 302 to determine whether the utterance 302 represents multiple intents. If so, then MIS 310 applies one or more rules to split the utterance 302 into a separate utterance for each intent, e.g., an utterance "D" 306 and an utterance "E" 308. If utterance 302 does not represent multiple intents, then MIS 310 forwards the utterance 302 to intent classifier 320 for intent classification and without splitting the utterance 302.

Intent classifier 320 is configured to match a received utterance (e.g., utterance 306 or 308) to an intent associated with skill bot system 300. As explained above, a skill bot can be configured with one or more intents, each intent including at least one example utterance that is associated with the intent and used for training a classifier. In the embodiment of FIG. 2, the intent classifier 242 of the master bot system 200 is trained to determine confidence scores for individual skill bots and confidence scores for system intents. Similarly, intent classifier 320 can be trained to determine a confidence score for each intent associated with the skill bot system 300. Whereas the classification performed by intent classifier 242 is at the bot level, the classification performed by intent classifier 320 is at the intent level and therefore finer grained. The intent classifier 320 has access to intents information 354. The intents information 354 includes, for each intent associated with the skill bot system 300, a list of utterances that are representative of and illustrate the meaning of the intent and are typically associated with a task performable by that intent. The intents information 354 can further include parameters produced as a result of training on this list of utterances.

Conversation manager 330 receives, as an output of intent classifier 320, an indication 322 of a particular intent, identified by the intent classifier 320, as best matching the utterance that was input to the intent classifier 320. In some instances, the intent classifier 320 is unable to determine any match. For example, the confidence scores computed by the intent classifier 320 could fall below a threshold confidence score value if the utterance is directed to a system intent or an intent of a different skill bot. When this occurs, the skill bot system 300 may refer the utterance to the master bot for handling, e.g., to route to a different skill bot. However, if the intent classifier 320 is successful in identifying an intent within the skill bot, then the conversation manager 330 will initiate a conversation with the user.

The conversation initiated by the conversation manager 330 is a conversation specific to the intent identified by the intent classifier 320. For instance, the conversation manager 330 may be implemented using a state machine configured to execute a dialog flow for the identified intent. The state machine can include a default starting state (e.g., for when the intent is invoked without any additional input) and one or more additional states, where each state has associated with it actions to be performed by the skill bot (e.g., executing a purchase transaction) and/or dialog (e.g., questions, responses) to be presented to the user. Thus, the conversation manager 330 can determine an action/dialog 335 upon receiving the indication 322 identifying the intent, and can determine additional actions or dialog in response to subsequent utterances received during the conversation.

Data store 350 includes one or more computing devices that store data used by the various subsystems of the skill bot system 300. As depicted in FIG. 3, the data store 350 includes the rules 352 and the intents information 354. In certain embodiments, data store 350 can be integrated into a data store of a master bot or digital assistant, e.g., the data store 250 in FIG. 2.

III. Segmentation and Curation System

Figure 4A:
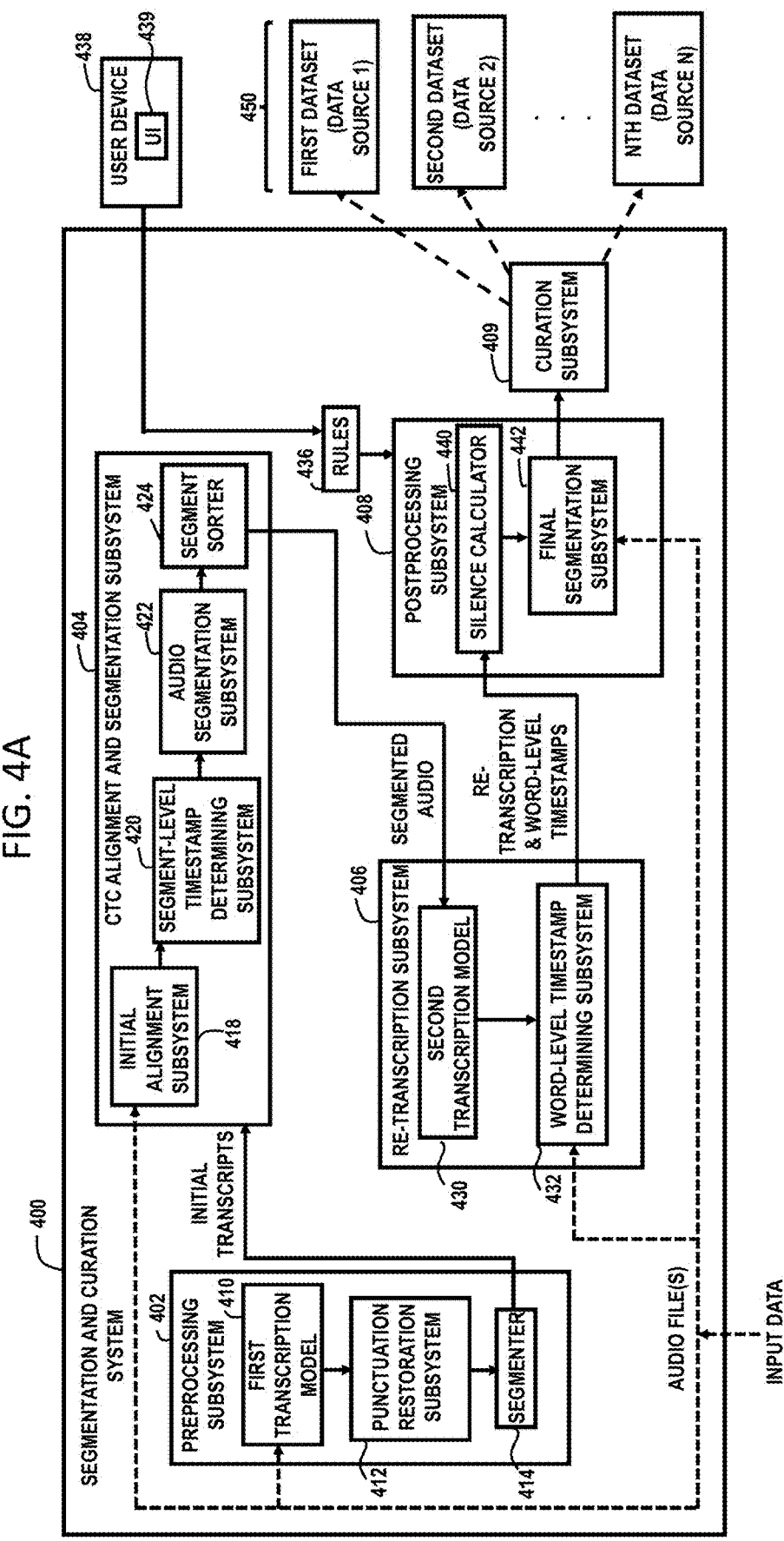
FIG. 4A is a simplified block diagram of a segmentation and curation system according to various embodiments.

FIG. 4A is a simplified block diagram of a segmentation and curation system 400 according to various embodiments. The segmentation and curation system 400 may be implemented using one or more computer systems, each computer system having one or more processors. The segmentation and curation system 400 may include multiple components and subsystems communicatively coupled to each other via one or more communication mechanisms. For example, in the embodiment depicted in FIG. 4A, the segmentation and curation system 400 includes a preprocessing subsystem 402, a connectionist temporal classification (CTC) alignment and segmentation subsystem 404, a re-transcription subsystem 406, a postprocessing subsystem 408, and a curation subsystem 409. These subsystems may be implemented as one or more computer systems. The systems, subsystems, and other components depicted in FIG. 4A may be implemented in software (e.g., code, instructions, program) executed by one or more processing units (e.g., processors, cores) of the respective systems, using hardware, or combinations thereof. The software may be stored on a non-transitory storage medium (e.g., on a memory device). The segmentation and curation system 400 depicted in FIG. 4A is merely an example and is not intended to unduly limit the scope of embodiments. Many variations, alternatives, and modifications are possible. For example, in some implementations, the segmentation and curation system 400 may have more or fewer subsystems or components than those shown in FIG. 4A, may combine two or more subsystems, or may have a different configuration or arrangement of subsystems. The segmentation and curation system 400 and subsystems depicted in FIG. 4A may be implemented using one or more computer systems, such as the computer system depicted in FIG. 12.

The segmentation and curation system 400 is configured to perform multi-stage processing on input data obtained from one or more data sources that each includes a large unlabeled audio data corpus, and output one or more datasets that could be used for training one or more models. The input data may be in a plurality of topics, domains, formats, etc.—In some implementations, the segmentation and curation system 400 accepts the long form audio as an input and produces segmented audios along with corresponding transcriptions. The curated and segmented audio data can be combined with other source(s) of annotated data (e.g., speech audio file along with human curated transcription) to train ML models for ASR.

Examples of the data sources include archive.org, Earnings-21, PriMock 57, Common-voice, LibriSpeech, etc. Also, any combination of the data sources can be used.

The archive.org provides free public access to collections of digitized materials, including thousands of audio files and corresponding transcriptions, e.g., text.

Earnings-21 is a 39-hour corpus of earnings calls containing entity-dense speech from nine different financial sectors.

PriMock 57 is a collection of audio files of primary care mock consultations.

The Common Voice dataset includes over 10,000 hours of a crowd-source audio and corresponding text. Many of the recorded hours include demographic metadata like age, sex, and accent.

LibriSpeech corpus is a collection of approximately 1,000 hours of read speech and not conversional dataset. However, any read dataset can be suitably mixed with a conversional dataset to provide diversity, accent, topics variety, etc.

The segmentation and curation system 400 performs processing on the input audio data, e.g., unlabeled long audio files, and outputs segmented and labeled audio segments obtained based on the input audio data. The audio data is split into audio segments of variable length by stages, based on punctuation marks and/or silences between adjacent words, and each audio segment is associated with a corresponding transcription portion, e.g., labels. The segmented and labeled audio segments, e.g., audio-text pairs, can be included in one or more datasets that may be used to train different natural speech recognition models, e.g., ASR models. As an example, the plurality of datasets may be generated based on a specific topic, e.g., a health topic or a finance topic, and may be used for building a specific pretrained ASR model for a health industry customer or a finance industry customer of the cloud computer network.

A. Initial Transcription and Text Segmentation

With continuing reference to FIG. 4A, the preprocessing subsystem 402 can perform a first data processing stage on the received input data that contains audio files. The received input data is audio data from a large corpus, for example, a long audio file as described above. As an example, the disclosed techniques are described herein with reference to the archive.org as a data source. Although the archive.org has audio files and corresponding transcriptions, e.g., text, the transcriptions of archive.org might not be accurate. Further, a length of audio segments in the archive.org is on average is about 1 hour that is too long to be used in efficient training of the ASR models.

In an embodiment, the preprocessing subsystem 402 performs pre-processing operation on the input audio files, to obtain initial transcription without punctuation marks, restore punctuation marks, and split the initial transcription into sentences or text portions, based on the restored punctuation marks.

In certain implementations, the preprocessing subsystem 402 may include a first transcription model 410 that is a machine learning model pretrained to, based on an input audio, provide, as an output, a prediction of text, e.g., initial or raw transcription.

As used herein, a "machine learning model," "ML model," or a "model" can refer to a software module configured to be run on one or more processors to provide a classification or numerical value of a property of one or more samples. An example type of model is supervised learning that can be used with embodiments of the present disclosure. Example supervised learning models may include different approaches and algorithms including analytical learning, artificial neural network, backpropagation, boosting (meta-algorithm), Bayesian statistics, case-based reasoning, decision tree learning, inductive logic programming, Gaussian process regression, genetic programming, group method of data handling, kernel estimators, learning automata, learning classifier systems, minimum message length (decision trees, decision graphs, etc.), multilinear subspace learning, naive Bayes classifier, maximum entropy classifier, conditional random field, nearest neighbor algorithm, probably approximately correct learning (PAC) learning, ripple down rules, a knowledge acquisition methodology, symbolic machine learning algorithms, subsymbolic machine learning algorithms, minimum complexity machines (MCM), random forests, ensembles of classifiers, ordinal classification, statistical relational learning, or Proaftn, a multicriteria classification algorithm.

Supervised learning models can be trained in various ways using various cost/loss functions that define the error from the known label (e.g., least squares and absolute difference from known classification) and various optimization techniques, e.g., using backpropagation, steepest descent, conjugate gradient, and Newton and quasi-Newton techniques.

In some embodiments, the ML models could include, but not limited to, a residual neural network (Resnet), variants of Deep Neural Networks ("DNN") (e.g., a multi-label n-binary DNN classifier or multi-class DNN classifier for single intent classification), a convolutional neural network (CNN), linear regression, logistic regression, deep recurrent neural network (e.g., fully-connected recurrent neural network (RNN), Gated Recurrent Unit (GRU), long short-term memory, (LSTM)), transformer-based methods (e.g., XLNet, BERT, XLM, RoBERTa), Bayes' classifier, Linear Classifier, hidden Markov model (HMM), linear discriminant analysis (LDA), k-means clustering, density-based spatial clustering of applications with noise (DBSCAN), Bagging Models such as Random Forest Model, e.g., random forest algorithm, adaptive boosting (AdaBoost), eXtreme Gradient Boosting (XGBoost), support vector machine (SVM), Shallow Neural Networks, or a composite model including one or more models mentioned above.

In an embodiment, the first transcription model 410 may be a model suitable for processing long audio files, e.g., a neural modules (NeMo) model from NVIDIA®. NeMo supports a large collection of models such as Jasper, QuartzNet, Citrinet and Conformer-CTC in order to perform automatic speech recognition. However, this is not intended to be limiting and any model suitable for providing transcription of the long audio file(s) may be used, as for example, a GRU-based neural network model from Oracle.

The first transcription model 410 may receive, as an input data, audio files from a selected data source, e.g., archive.org. As mentioned above, the audio files may include long waveform audio files (WAV) having an average length of an hour. However, this is not intended to be limiting. In some implementations, the audio files of a shorter duration can be implemented.

The first transcription model 410 may process the audio files and output initial transcriptions corresponding to the audio files.

The preprocessing subsystem 402 may further include a punctuation restoration subsystem 412. The initial transcriptions, which are output by the first transcription model 410, might not have punctuation marks. The punctuation restoration subsystem 412 is configured to receive the initial transcriptions from the first transcription model 410 and perform processing on the initial transcriptions to restore punctuation, so that the initial transcriptions generated by the first transcription model 410 is normalized. The punctuation restoration subsystem 412 can use a pretrained punctuation restoration model, e.g., an ML model that is pretrained to predict the punctuation marks in a given text. In embodiments, the punctuation restoration subsystem 412 can use the pretrained ML model to restore the following punctuation marks: period, comma, apostrophe, quotation, question, exclamation, brackets, braces, parenthesis, dash, hyphen, and/or semicolon. An example of the punctuation restoration model may be found at https://github.com/oliverguhr/deepmultilingualpunctuation.

In some implementations, the preprocessing subsystem 402 further includes a segmenter 414. The segmenter 414 receives the initial transcriptions from the punctuation restoration subsystem 412 and divides each of the initial transcriptions into sentences or text portions based on the punctuation marks. For example, if a paragraph has 10 lines, the segmenter 414 may divide the paragraph into 8-10 text portions based on the punctuation.

As a result of the processing performed at the first processing stage, the preprocessing subsystem 402 may output the text portions, e.g., initial transcripts.

B. CTC Alignment and Audio Segmentation

With continuing reference to FIG. 4A, the CTC alignment and segmentation subsystem 404 receives the text portions, e.g., initial transcripts, from the preprocessing subsystem 402 and performs processing corresponding to a second processing stage, to extract audio-text alignments. For example, the CTC alignment and segmentation subsystem 404 aligns the text portions against the input audio data and segments the input audio data into shorter fragments based on segment-level timestamps. In this stage, a light and memory efficient model can be used to perform operation(s) on long audio file(s).

In an embodiment, the CTC alignment and segmentation subsystem 404 uses CTC segmentation algorithm to extract appropriate audio-text alignments in the presence of additional unknown speech sections at the beginning or the end of the audio recording. The CTC segmentation algorithm uses a CTC-based end-to-end neural network that was trained on pre-aligned data, to extract utterance segments with exact time-wise alignments.

As depicted in FIG. 4A, the CTC alignment and segmentation subsystem 404 includes an initial alignment subsystem 418, a segment-level timestamp determining subsystem 420, an audio segmentation subsystem 422, and a segment sorter 424. However, this is not intended to be limiting. For example, in some implementations, the CTC alignment and segmentation subsystem 404 may have more or fewer subsystems or components than those shown in FIG. 4A, may combine two or more subsystems, or may have a different configuration or arrangement of subsystems. For example, the functionalities of some or all of the initial alignment subsystem 418, the segment-level timestamp determining subsystem 420, the audio segmentation subsystem 422, and the segment sorter 424 may be implemented in one or more ML models. An example, the segment-level timestamp determining subsystem 420 and the audio segmentation subsystem 422 may be implemented as a NeMo Citrinet model from NVIDIA®.

In an embodiment, the initial alignment subsystem 418 receives the text portions from the preprocessing subsystem 402 and the audio files from the data source, e.g., the input audio data. The initial alignment subsystem 418 is configured to align the text portions, which are output by the segmenter 414, against the input audio data of the audio file(s), e.g., against the natural speech of one or more audio files.

The segment-level timestamp determining subsystem 420 receives, as an input, the text portions aligned against the audio data of the audio file and determines, from the audio file, segment start and segment end timestamps associated with each of the text portions. The segment-level timestamp determining subsystem 420 also produces the alignment confidence score. In some implementations, the segment-level timestamp determining subsystem 420 is configured to calculate the alignment confidence score using the input audio data and the text portions received from the segmenter 414. For example, the segment-level timestamp determining subsystem 420 calculates the alignment confidence score for each text portion and corresponding portion of the audio on per character basis, where the alignment confidence score is thereafter compared to the alignment threshold (described below), to pass the segments of the audio with good alignment confidence score for further processing. The segment-level timestamp determining subsystem 420 may then provide, as an output, a list of the text portions with the segment-level timestamps indicating a starting time point and an ending time point of each text portion, and the alignment confidence score corresponding to each text portion and its corresponding audio portion.

The audio segmentation subsystem 422 uses the segment-level timestamps determined by the segment-level timestamp determining subsystem 420 to align the input audio data in correspondence to the text portions output from the segmenter 414. The audio segmentation subsystem 422 then divides the input audio data into audio segments based on the alignment, and cuts off the audio, e.g., silences, from the beginnings and endings of the audio segments based on the segment-level timestamps, to generate audio chunks of variable length. For example, the lengths of the audio chunks may be from a few seconds to one minute, where each audio chunk is associated with corresponding text portion and alignment confidence score.

As used herein, a silence or a silence time period refers to a portion or a time period of the audio recording where no audible sound is detected.

The segment sorter 424 is configured to receive the audio chunks, the text portions, and the alignment confidence score associated with the text portions and/or the audio chunks. The segment sorter 424 is configured to discard the utterances (e.g., audio chunks) where the alignment confidence score indicates that the deviations between the audio speech and the corresponding text are greater than an alignment threshold, e.g., when one or more words are missing. As a non-limiting example, the alignment threshold may be set to −10. The segment sorter 424 then outputs the audio chunks whose alignment confidence score is greater than the alignment threshold.

As a result of the second stage processing performed by the CTC alignment and segmentation subsystem 404, the audio is segmented into smaller chunks of variable length. The audio chunks are passed to the re-transcription subsystem 406.

C. Re-Transcription and Word-Level Timestamps

The re-transcription subsystem 406 receives, as an input from the CTC alignment and segmentation subsystem 404, the audio chunks whose confidence score is greater than the alignment threshold and performs data processing corresponding to a third processing stage. For example, the re-transcription subsystem 406 obtains a high-quality re-transcription using the audio chunks and determines word-level timestamps for each word of the re-transcription based on the input audio data, e.g., the audio files. As a result of the processing performed by the re-transcription subsystem 406 at the third processing stage, the re-transcription subsystem 406 can output the re-transcription of a high quality, where each word of the re-transcription is associated with the word-level timestamps. The transcription model used in this stage can be heavier than the first transcription model 410 used in the first processing stage, as operations are performed on substantially shorter audio chunks.

In some embodiments, the re-transcription subsystem 406 can include a second transcription model 430, to produce better transcriptions than the initial transcription performed by the first transcription model 410. In an example, the second transcription model 430 may be a NeMo Conformer-CTC model from NVIDIA®. This model transcribes speech in lowercase English alphabet including spaces and apostrophes, and is trained on several thousand hours of English speech data. It is a non-autoregressive "large" variant of Conformer for ASR that uses CTC loss/decoding and has around 120 million parameters, thus providing a highly accurate transcriptions for shorter audio segments. The example of the Conformer can be found at https://huggingface.co/nvidia/stt_en_conformer_ctc_large.

The second transcription model 430 receives, as an input, the audio chunks output by the CTC alignment and segmentation subsystem 404. The length of the audio chunks may be from a few milliseconds to 1 minute. The second transcription model 430 may process the audio chunks and output refined transcriptions in correspondence to each of the audio chunks. The refined transcriptions are merged to form a re-transcription that is much more accurate than the initial transcription performed by the first transcription model 410. The high accuracy of the re-transcription is due at least to the fact that the audio chunks have smaller sizes as compared to the initial long audio file(s) and, thus, the heavy model may be used, such as notably-accurate Conformer-CTC that exhibits a better performance on short audios.

In some embodiments, the re-transcription subsystem 406 can further include a word-level timestamp determining subsystem 432 to obtain the word-level-timestamps. The word-level timestamp determining subsystem 432 is configured to receive, as an input, the re-transcription and the audio file(s), e.g., the input audio data, and align each word in the re-transcription against the audio file(s).

The word-level timestamp determining subsystem 432 can then determine the word-level timestamps for each word in the re-transcription using forced alignment using an ML model. As an example, the ML model used by the word-level timestamp determining subsystem 432 may be a deep neural network (DNN) model such as Kaldi-based model for forced alignment. Kaldi is trained on LibriSpeech dataset and includes a state-of-the-art ASR toolkit, containing almost any algorithm currently used in ASR systems. An example of the Kaldi-based model for forced alignment can be found at https://eleanorchodroff.com/tutorial/kaldi/forced-alignment.html.

As a result of the processing at the third processing stage, the re-transcription subsystem 406 outputs the re-transcription performed on the audio chunks, which are output from the CTC alignment and segmentation subsystem 404, and the corresponding word-level timestamps. For example, the re-transcription subsystem 406 outputs a list of words, where each word is associated with a starting timestamp and/or an ending timestamp.

D. Generation of Final Audio Segments and Final Transcription Portions

The postprocessing subsystem 408 receives the re-transcription with the word-level timestamps and the audio files, and performs processing corresponding to a fourth processing stage according to rules 436, to output refined final audio segments and final transcription portions corresponding to refined final audio segments by controllably segmenting the audio files of the input audio data based on the rules 436.

In an example depicted in FIG. 4A, the selection of the rules 436 is received from a user device 438. This affords the user more control over the processing performed at the fourth processing stage. The user's inputs may be received through a user interface (UI) 439, e.g., a graphical UI, a button, a keyboard input, etc.

The rules 436 at the fourth processing stage may include:
The final audio segments are to be created based on the word-level timestamps, where the minimum pause between the audio segments is 200 ms.
The final audio segments are to conform to a maximum number of characters per segment (e.g., 200) and the maximum allowed duration (e.g., 15 seconds).
If the silence between two consecutive audio segments is greater than a silence threshold (e.g., 1000 ms), adjust the audio segment start and end boundaries to not allow greater than 800 ms of silence at the start and/or end.
In certain implementations, the postprocessing subsystem 408 may include a silence calculator 440 and a final segmentation subsystem 442. The silence calculator 440 may receive the re-transcription and word-level timestamps from the re-transcription subsystem 406, e.g., the list of words, where each word is associated with the starting timestamp and/or the ending timestamp. The silence calculator 440 is configured to calculate a silence time period between each two consecutive words of the audio files based on the word-level timestamps and the words of the re-transcription.

The final segmentation subsystem 442 receives the re-transcription and the calculated silence time periods. The final segmentation subsystem 442 can, using the rules 436, determine how to generate the final segments from the audio files based on the calculated silence time periods. For example, the final segmentation subsystem 442 can generate the final audio segments so that there is a minimum silence (e.g., 200 ms) between the end of the last word of the preceding audio segment and the start of the first word of the following audio segment. The final segmentation subsystem 442 can also generate the final audio segments so that each final audio segment has no more than a maximum number of characters per segment (e.g., 200 characters) and that a length of each final audio segment conforms to the maximum allowed duration (e.g., no more than 15 seconds). Further, if the silence between two consecutive words is greater than a silence threshold (e.g., 800 ms), the final segmentation subsystem 442 may adjust the audio segment start and/or audio segment end to not allow more than 800 ms of silence between two consecutive words. In this case, the final segmentation subsystem 442 can insert some of the unutilized silence (e.g., some of 800 ms), to create a silence portion at the end of the preceding audio segment and/or the start of the following audio segment.

As a result of the processing performed at the fourth processing stage, the postprocessing subsystem 408 can output the final audio segments and their corresponding final transcription portions. For example, the postprocessing subsystem 408 can output a collection of the final audio segments that are cut based on the silence between the audio words and/or audio segments, where each final audio segment has a length from about 2 seconds to 15 seconds and is associated with a corresponding portion of the re-transcription.

E. Automatic Curation

In some implementations, the segmentation and curation system 400 may include the curation subsystem 409. The curation subsystem 409 is configured to receive the final audio segments and final transcription portions from the postprocessing subsystem 408 and perform processing corresponding to a fifth processing stage. The curation subsystem 409 processes the final audio segments and final transcription portions to detect erroneous transcription portions and provide at least a partial curation of erroneous final transcript portions. The curation subsystem 409 and its functionalities are described below in detail.

The described-above CTC forced alignment, which is performed by the CTC alignment and segmentation subsystem 404, can generate precise alignments between provided transcriptions and audio snippets. But spontaneous speech, which can include "slips of the tongue" and stutters, can complicate a transcription and alignment process. Any ASR systems used for re-transcription can be error-prone, and depending on a quality of training data, or normalization applied on the training data, ASR systems may make recurring errors that will then be learned by a final model. As a result, downstream errors can occur when a transcription differs from what is actually said, making data noisy and unsuitable for acoustic training. Detecting outliers can help improve data quality.

The curation subsystem 409 can use CTC alignment loss to identify possible outliers and curate, based on a CTC loss threshold, at least some of the possible outliers using a curator model. The CTC loss calculates loss between a continuous (unsegmented) time series and a target sequence. CTC loss sums over the probability of possible alignments of input to target, producing a loss value which is differentiable with respect to each input node.

FIG. 4B illustrates the curation subsystem 409 and the processing performed by the curation subsystem 409, according to embodiments.

Referring to FIG. 4B, the curation subsystem 409 receives, as an input, the final audio segments and corresponding final transcriptions from the postprocessing subsystem 408.

The final audio segments are processed by a validator model 482, to calculate CTC prediction matrix. The validator model may be wav2vec2 model. The examples of wav2vec2 model are described in publications by A. Baevski et al., entitled "wav2vec 2.0: A framework for self-supervised learning of speech representations," and by C. Yi et. al, entitled "Applying wav2vec2.0 to speech recognition in various low-resource languages," which are incorporated by reference herein in their entireties.

In the CTC prediction matrix, the columns correspond to timesteps, where each row corresponds to a letter in the alphabet. Since each column sums to 1 and all entries in the prediction matrix are greater than zero, the CTC prediction matrix has a categorical distribution over alphabet for each timestep, e.g., a letter prediction. The validator model 482 generates a probability distribution across all potential label sequences, given the input speech. This distribution is calculated for each time step in the input sequence. The CTC loss objective is designed to enhance the likelihood of the correct label sequence, in relation to the input sequence. This principal is applied to the final transcription portions. Any final transcription portions with high loss values may be considered outliers. These outliers can exhibit substantial deviation from the predictions of the validator model 482. The CTC loss is described in publication by A. Graves et. al, entitled "Connectionist temporal classification: labelling unsegmented sequence data with recurrent neural networks," which is incorporated by reference herein in its entirety.

The prediction matrix, which is output by the validator model 482, and the final transcription portions are input to a CTC loss calculation subsystem 484. The CTC loss calculation subsystem 484 is configured to calculate a matching score, e.g., a CTC loss, with respect to each final transcription portion. Final transcription portions with high loss values can be considered outliers.

The curation subsystem 409 can then perform an operation 486 to compare the CTC loss to the loss threshold. If the CTC loss is less than or equal to the loss threshold (NO in operation 486), a particular final transcription portion is accepted to be included in the final dataset.

If the CTC loss is greater than the loss threshold (YES in operation 486), it means that either a particular final transcription portion is of a poor quality or the validator model 482 did not produce an accurate result. In this case, the curation subsystem 409 invokes a curator model 488. In an embodiment, the curator model 488 may be NeMo RNN-T model from NVIDIA®. The curator model 488 can generate high quality curated transcription in the case that the final transcription portion and the output of the validator model 482 do not agree. The example of RNN-T model can be found at https://huggingface.co/nvidia/stt_en_conformer_transducer_xlarge.

The curated transcription is input to a final CTC loss calculation subsystem 490 and a final CTC loss is calculated in respect to the output of the validator model 482. However, this is not intended to be limiting. In some implementations, the final CTC loss calculation subsystem 490 may be omitted and the CTC loss calculation subsystem 484 may be used to calculate the final CTC loss.

The curation subsystem 409 can then perform an operation 492 to compare the final CTC loss to the loss threshold. If the final CTC loss is less than or equal to the loss threshold, the curated transcription is included in the dataset (e.g., instead of that particular transcription portion).

If the final CTC loss is still greater than the loss threshold, the record is discarded. Such scenario is particularly rare in the described embodiments. In this case, it could be assumed that the final audio segment contains noise and/or erroneous information and this final audio segment and its transcription can be discarded.

In an experiment, 200,000 newly created transcription portions were analyzed. The CTC loss values of the analyzed transcription portions are summarized in Table 1. The level of disagreement between the reference transcription and validation transcription can be high when the CTC loss is high, and the CTC loss can exceed 1000. The CTC loss can be high for a difficult audio segment that the validator model cannot predict well or for an erroneous final transcription. In a case of an erroneous final transcription, the error can be curated using the curator model 488, as described above, which can curate based on a loss threshold, such as a CTC loss value of 50.

In the example, 70% of the outlier records (e.g., outliers of final transcription portions), of which the CTC loss exceeded the loss threshold, were curated using the above-described strategy and 30% were discarded.

TABLE 1

| CTC loss calculated by the validator model | | | | | | |
|---|---|---|---|---|---|---|
| Mean | Std | Min | 25% | 50% | 75% | max |
| 26.22209 | 34.37976 | 0.00018 | 4.35161 | 13.81459 | 34.54270 | 1075.92834 |

As a result of the processing performed by the curation subsystem 409, the segmentation and curation system 400 outputs high quality result data. For example, the result data is output as one or more datasets 450. As exemplary shown in FIG. 4A, the datasets 450 may be arranged by the data source processed by the segmentation and curation system 400, where the data source is used according to a request of a user, for example.

FIG. 5 is a simplified block diagram of a model training system 500 according to various embodiments. In an example, a customer user may provide a request to train a speech recognition model according to a first topic, e.g., medical. Based on the request of the customer user, the model training system 500 receives, as an input, a model to be trained, and a first dataset 552 generated by the segmentation and curation system 400 that contains high quality audio recordings and corresponding transcriptions that were obtained by the segmentation and curation system 400 from a first collection of audio recordings in a medical domain, according to embodiments. The model training system 500 trains the model using the received dataset, and generates the trained model based on the audio utterances from the first collection of audio recordings that were processed according to the disclosed techniques. For example, the generated trained model is a speech recognition model that can be used in a first chatbot service in the medical domain.

In another example, a customer user may provide a request to train a speech recognition model according to a second topic, e.g., financial. Based on the request of the customer user, the model training system 500 receives, as an input, a model to be trained, and a second dataset 554 generated by the segmentation and curation system 400 that contains high quality audio recordings and corresponding transcriptions that were obtained by the segmentation and curation system 400 from a second collection of audio recordings in a financial domain, according to embodiments. The model training system 500 trains the model using the received dataset, and generates the trained model based on the audio utterances from the second collection of audio recordings that were processed according to the disclosed techniques. For example, the generated trained model is a speech recognition model that can be used in a second chatbot service in the financial domain.

However, the described above is not intended to limiting. For example, a user can train a model using a mixed pool of training data generated by combining two or more datasets 450 to produce the model trained on a plurality of datasets each generated from data source 1, data source 2, etc. As another example, a model using a first dataset 552 may be trained, then this trained model may be trained using a second dataset 554, etc. As a result, a model may be produced trained on a plurality of datasets, e.g., any combination of the datasets each generated from data source 1, data source 2, etc.

Figure 13A:
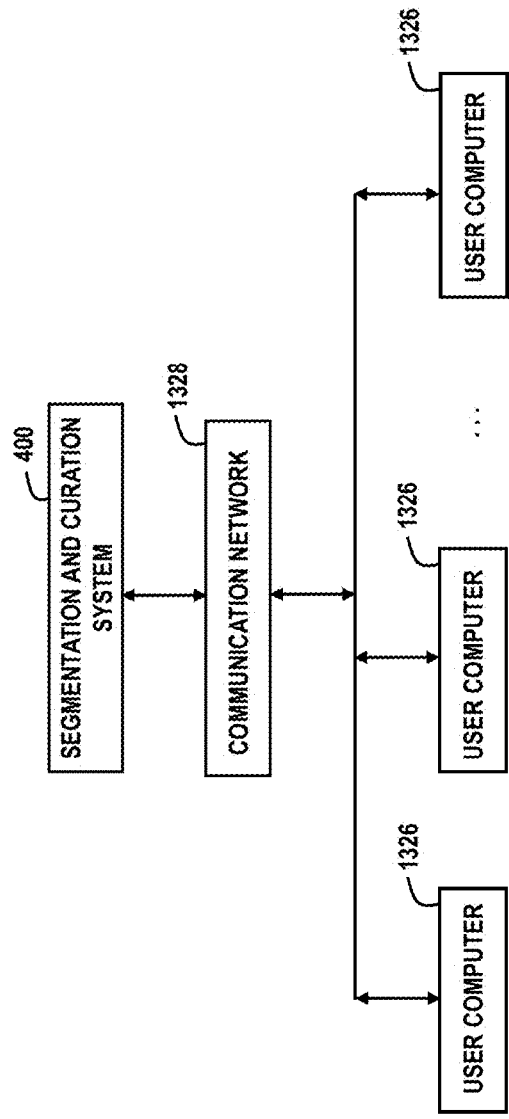
FIG. 13A is a simplified block diagram of a segmentation and curation system in a distributed computing environment according to various embodiments.

As shown in FIG. 13A, the segmentation and curation system 400 can be provided as a part of a distributed computing environment, where the segmentation and curation system 400 is connected to one or more user computers 1326 via a communication network 1328.

Figure 13B:
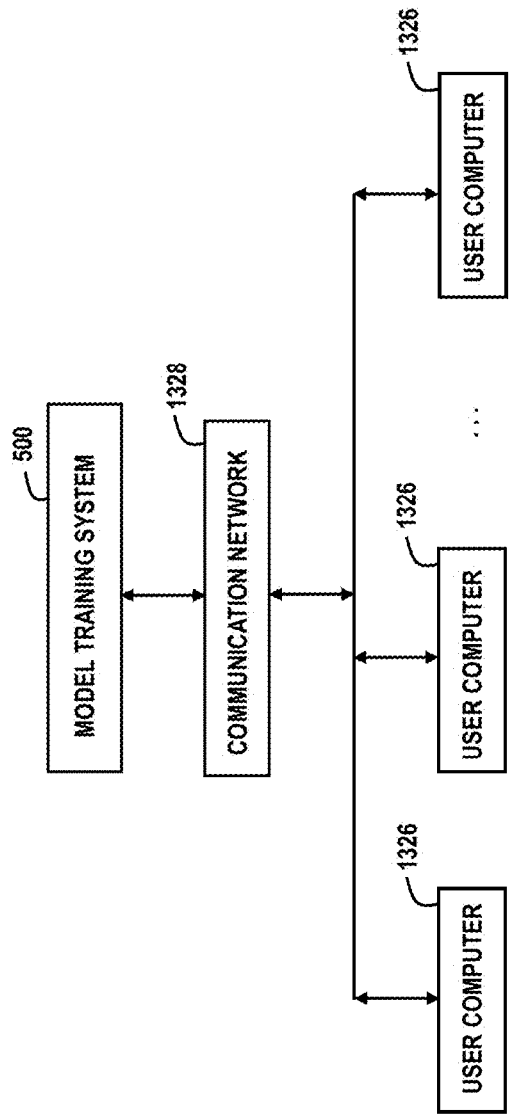
FIG. 13B is a simplified block diagram of a model training system in a distributed computing environment according to various embodiments.

As shown in FIG. 13B, the model training system 500 can be provided as a part of a distributed computing environment, where the model training system 500 is connected to one or more user computers 1326 via a communication network 1328.

Figure 12:
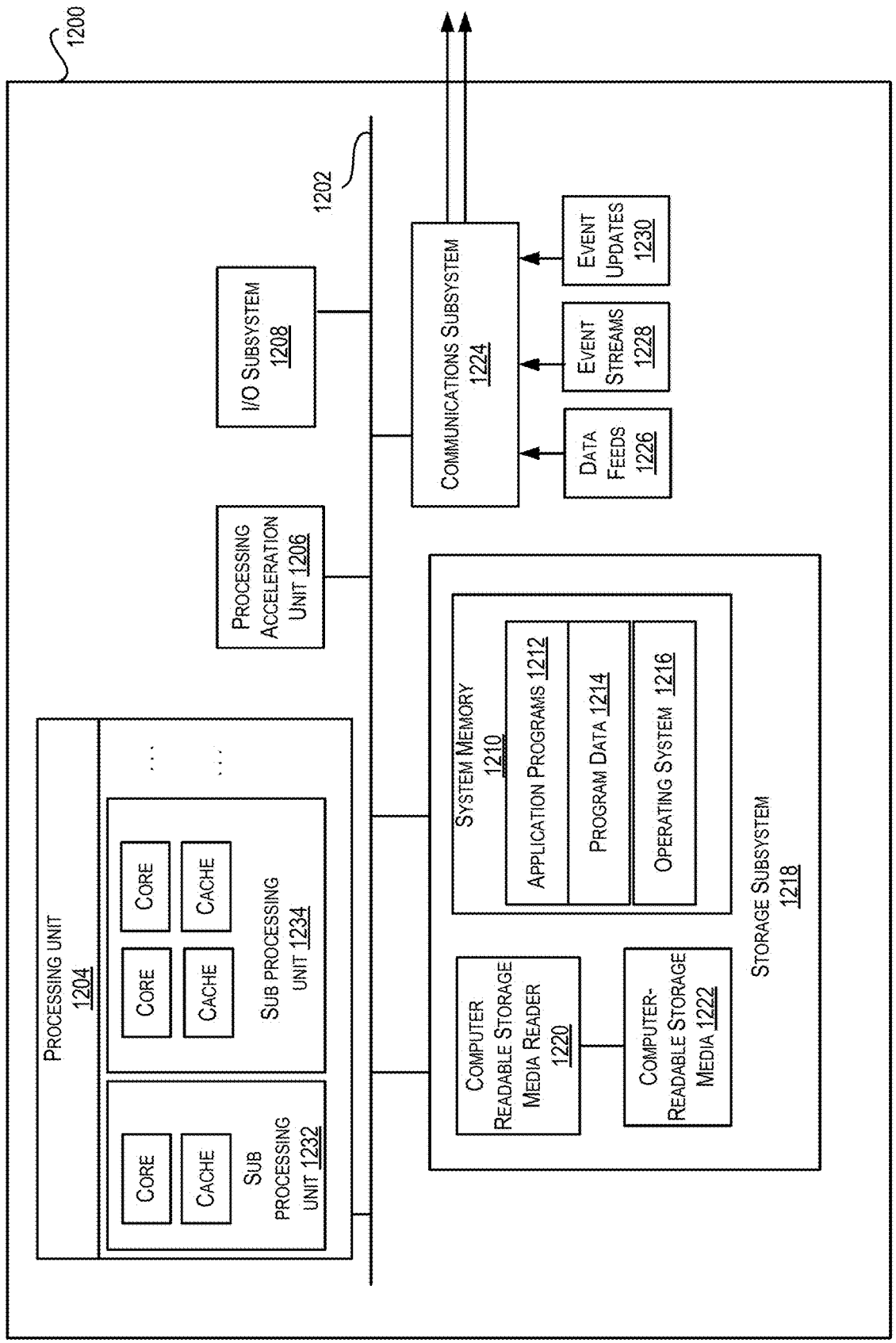
FIG. 12 is a block diagram illustrating an example computer system, according to at least one embodiment.

An example of a distributed computing environment is depicted in FIG. 12 and described in detail below.

Figure 14:
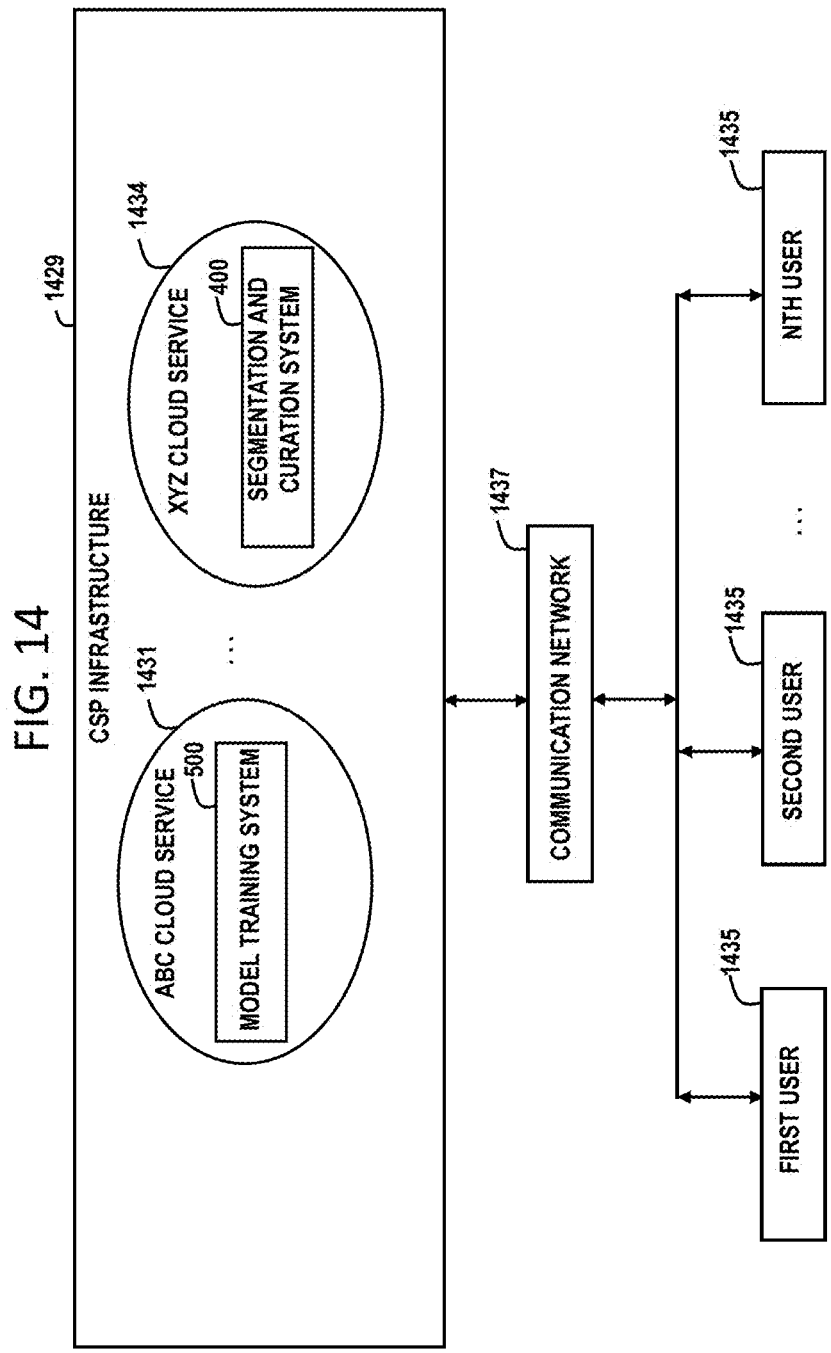
FIG. 14 is a simplified block diagram of a segmentation and curation system and a model training system in a cloud service provider (CSP) infrastructure according to various embodiments.

As shown in FIG. 14, the segmentation and curation system 400 and the model training system 500 may be a part of a CSP infrastructure 1429 provided by a CSP for providing one or more cloud services. For example, the one or more cloud services may include ABC cloud service 1431 to XYZ cloud service 1434 connected to computers of one or more users 1435 via a communication network 1437. For example, the model training system 500 may be a part of the ABC cloud service 1431, and the segmentation and curation system 400 may be a part of the XYZ cloud service 1434.

An example of a cloud infrastructure architecture provided by the CSP is depicted in FIGS. 8-11 and described in detail below.

V. Method(s)

Figure 7A:
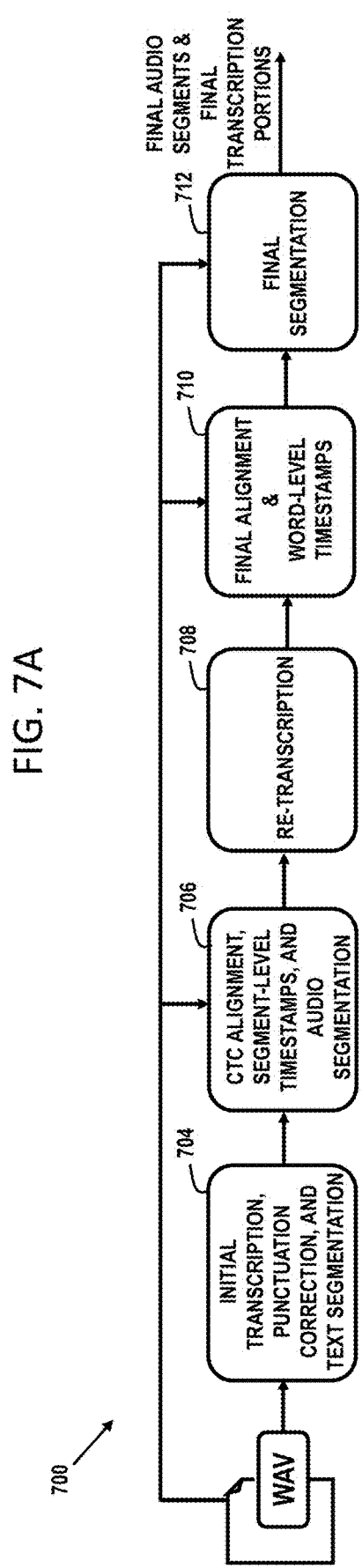
FIG. 7A is a simplified block diagram of a processing performed by the segmentation and curation system in accordance with various embodiments.

FIG. 7A is a simplified block diagram of a processing 700 performed by the segmentation and curation system 400 in accordance with various embodiments. The processing 700 may be performed by some or all of the preprocessing subsystem 402, the CTC alignment and segmentation subsystem 404, the re-transcription subsystem 406, and the postprocessing subsystem 408.

The processing 700 depicted in FIG. 7A may be implemented in software (e.g., code, instructions, program) executed by one or more processing units (e.g., processors, cores) of the respective subsystems, using hardware, or combinations thereof. The software may be stored on a non-transitory storage medium (e.g., on a memory device). The method presented in FIG. 7A and described below is intended to be illustrative and non-limiting. Although FIG. 7A depicts the various processing operations occurring in a particular sequence or order, this is not intended to be limiting. In certain alternative embodiments, the processing 700 may be performed in some different order or some operations may be performed at least partially in parallel.

Referring to FIG. 7A, at operation 704, the preprocessing subsystem 402 can perform the first data processing stage on the received input data that contains long WAV audio file, to obtain initial transcription and split the raw transcription into several text portions. As described above, the preprocessing subsystem 402 may use the first transcription model 410 that receives, as an input data, audio files and outputs initial transcriptions corresponding to the audio files. The preprocessing subsystem 402 performs further processing on the initial transcriptions to restore punctuation marks. Then, the preprocessing subsystem 402 may divide each of the initial transcriptions into sentences or text portions based on the punctuation marks.

At operation 706, the CTC alignment and segmentation subsystem 404 can perform processing corresponding to the second processing stage. In an embodiment, the CTC alignment and segmentation subsystem 404 uses CTC segmentation algorithm to extract appropriate audio-text alignments in the presence of additional unknown speech sections at the beginning or the end of the audio recording. As described above, the CTC alignment and segmentation subsystem 404 receives the text portions from the preprocessing subsystem 402 and the audio files from the data source, and aligns the text portions against the audio data of the audio files. The CTC alignment and segmentation subsystem 404 then can determine segment start and segment end timestamps associated with each of the text portions, and create a list of the text portions with the segment-level timestamps. The CTC alignment and segmentation subsystem 404 may segment the input audio data by aligning the audio files and the text portions, and cutting off the audio, e.g., silences, from the beginnings and endings of the audio segments corresponding to the text portions based on the segment-level timestamps, to generate audio chunks of variable length. The CTC alignment and segmentation subsystem 404 may calculate an alignment confidence score and discard the audio chunks whose alignment confidence score is less than or equal to the alignment threshold.

At operations 708 and 710, the re-transcription subsystem 406 performs processing corresponding to the third processing stage. As described above, the re-transcription subsystem 406 can include a second transcription model 430, to perform re-transcription of the audio chunks output by the CTC alignment and segmentation subsystem 404, and output refined transcriptions in correspondence to each of the audio chunks. The refined transcriptions are merged together to form a re-transcription. The re-transcription subsystem 406 can align each word in the re-transcription against the audio data of the audio files and generate a list of words, where each word is associated with a starting timestamp and an ending timestamp.

At operation 712, the postprocessing subsystem 408 performs processing corresponding to the fourth processing stage, to output refined final audio segments and final transcription portions corresponding to refined final audio segments by segmenting the audio data and utilizing available silences at boundaries. The postprocessing subsystem 408 may receive the re-transcription and word-level timestamps, and measure, e.g., calculate, the silence time period between each two consecutive words of the audio files based on the word-level timestamps. As described above, the postprocessing subsystem 408 can, using the rules 436, generate the final segments from the audio files based on the measured silence periods. The postprocessing subsystem 408 can output the final audio segments and their corresponding final transcription portions, e.g., based on the word-level timestamps.

FIG. 7B depicts processing according to various embodiments. For example, the processing 750 depicted in FIG. 7B may be performed by some or all of the preprocessing subsystem 402, the CTC alignment and segmentation subsystem 404, the re-transcription subsystem 406, and the postprocessing subsystem 408.

The processing 750 depicted in FIG. 7B may be implemented in software (e.g., code, instructions, program) executed by one or more processing units (e.g., processors, cores) of the respective subsystems, using hardware, or combinations thereof. The software may be stored on a non-transitory storage medium (e.g., on a memory device). The method presented in FIG. 7B and described below is intended to be illustrative and non-limiting. Although FIG. 7B depicts the various processing operations occurring in a particular sequence or order, this is not intended to be limiting. In certain alternative embodiments, the processing 750 may be performed in some different order or some operations may be performed at least partially in parallel.

With continuing reference to FIG. 7B, at operation 752, the preprocessing subsystem 402 can obtain, using a first transcription model configured to convert natural speech into text, an initial transcription for one or more longer audio files containing an input natural speech.

In some embodiments, the initial transcription may be generated without the punctuation marks. The preprocessing subsystem 402 can restore the punctuation marks in the initial transcription by using an ML model.

At operation 754, the preprocessing subsystem 402 can perform a segmentation of the initial transcription into text portions, based on the punctuation marks in the initial transcription.

At operation 756, the CTC alignment and segmentation subsystem 404 can determine, using an ML, model, segment-level timestamps for the text portions based on the input natural speech, e.g., using speech-text alignment for the input audio file, where the segment-level timestamps designate a starting time point of a first word and an ending time point of a last word for each of the text portions.

At operation 758, the CTC alignment and segmentation subsystem 404 can perform an audio segmentation on the input natural speech, by cutting the input natural speech based on the segment-level timestamps, to obtain audio chunks.

In some embodiments, determining the segment-level timestamps includes: aligning the text portions against the input natural speech using the segment-level timestamps; and calculating an alignment confidence score between the text portions and audio portions of the input natural speech that correspond to the text portions, where each of the audio chunks is included in a corresponding audio portion of the input natural speech and has an associated alignment confidence score of the corresponding audio portion. The audio chunks having the alignment confidence score less than or equal to the alignment threshold can be discarded.

At operation 760, the re-transcription subsystem 406 generates transcription portions for each of the audio chunks generated in operation 758. The re-transcription subsystem 406 can generate much more accurate transcriptions on shorter audio chunks than the transcription(s) obtained in operation 752, using a second transcription model configured to convert natural speech into text and suitable for performing operations on shorter audio fragments.

At operation 761, the transcription portions, which are generated on each of the audio chunks in operation 758, are merged, to form a re-transcription.

In some embodiments, the re-transcription is generated based on the audio chunks having the alignment confidence score greater than an alignment threshold.

At operation 762, the re-transcription subsystem 406 can determine, using an ML model, word-level timestamps for the re-transcription, by aligning the input natural speech against the re-transcription, the word-level timestamps designating a starting time point and an ending time point of each word of the re-transcription.

At operation 764, the postprocessing subsystem 408 can calculate a silence time period between each two adjacent words of the input natural speech, based on the word-level timestamps.

At operation 766, the postprocessing subsystem 408 can perform a final segmentation on the input natural speech and the re-transcription, based at least on the silence time periods, to generate final audio segments and corresponding final transcription portions.

In some embodiments, performing the final segmentation includes: segmenting the input natural speech into the final audio segments of a variable data length based on rules, so that the silence time period between two adjacent final audio segments is no more than a silence threshold, a number of characters of each of the final audio segments is no more than a maximum predetermined number of characters, and a length of each of the final audio segments is no more than a maximum predetermined duration.

At operation 768, the postprocessing subsystem 408 can output the final audio segments and the corresponding final transcription portions. For example, the final audio segments and the corresponding final transcription portions can be dumped to a storage device and/or transmitted to an external computing device.

In some embodiments, a method further includes: inputting, into a validator model, the final audio segments; outputting, by the validator model, a prediction matrix; and comparing the prediction matrix to the final transcription portions, to generate a first matching value.

Based on the first matching value for a particular final transcription portion being less than or equal to a CTC loss threshold, storing the particular final transcription portion in a model training dataset.

Based on the first matching value for the particular final transcription portion being more than the CTC loss threshold, obtaining, using a curator model configured to convert natural speech into text, a curated transcription portion corresponding to the particular final transcription portion; comparing the curated transcription portion to the prediction matrix, to generate a second matching value; and based on the second matching value being less than or equal to the CTC loss threshold, storing the curated transcription portion in place of the particular final transcription portion in the model training dataset; else discarding the record.

The model training dataset can be used as an input for training an automated speech recognition model.

In embodiments described above, the ML models, which are used in the operations of the preprocessing subsystem 402, the CTC alignment and segmentation subsystem 404, the re-transcription subsystem 406, the postprocessing subsystem 408, and the curation subsystem 409, are of different types. However, this is not intended to be limiting. In certain implementations, at least some of the ML models, which are used in the comparable operations (e.g., transcription) of the preprocessing subsystem 402, the CTC alignment and segmentation subsystem 404, the re-transcription subsystem 406, the postprocessing subsystem 408, and/or the curation subsystem 409, can be the same.

VI. EXAMPLES

Six ASR models were trained using various combinations of data, as shown in Table 2 below. Data originated from three different versions of People's Speech data, each sourced from the same original audio. These three versions are referred to as:

v1: A subset of the original People's Speech data, utilized in Data1 and Data1'.

v2: The re-segmented and re-transcribed data from archive.org, according to embodiments, used in both Data2 and Data2'. The same audio source from archive.org was used for v1 in the People's Speech.

v3: An automatically curated version of v2, according to embodiments, used in Data3 and Data3'.

Table 2 illustrates that approximately 543 hours of training data was extracted from the archive.org data by using 973 records. By applying automatic curation, five hours of training data were discarded from the re-transcribed training pool (Data2). To make the training set more diverse, additional data called Common Voice was included in the training pool. Including data from another source permitted an observation of an impact of newly segmented and transcribed data when combined with data from other sources or domains.

TABLE 2

Data composition used in acoustic modeling

| Training set | Archive.org Re-segmented (hr) | Archive.org People's Speech (hr) | Common Voice (hr) | Total (hr) |
|---|---|---|---|---|
| Data 1 | — | 538.4 (v1) | — | 538.4 |
| Data 2 | 543.0 (v2) | — | — | 543.0 |
| Data 3 | 538.9 (v3) | — | — | 538.9 |
| Data 1' | — | 538.4 (v1) | 623.7 | 1162.1 |
| Data 2' | 543.0 (v2) | — | 623.7 | 1166.7 |
| Data 3' | 538.9 (v3) | — | 623.7 | 1162.6 |

Several publicly available datasets were included in the example studies, including version 9 of Common Voice, financial domain data Earnings-21, medical data PriMock 57, and LibriSpeech, to evaluate ASR models.

In the example studies, a wav2vec2 model was used to transform raw audios into higher-level contextual features or embeddings via a set of convolutional layers that capture local features. A proportion of these local features was masked and sent to a contextual transformer network for predicting masked features using contextual information. The model was trained with a contrastive objective, which can measure the model's ability to differentiate between a true masked input segment and a set of distractors. Self-attention layers in a transformer can help encode information from context surrounding a given masked segment.

The publicly available pretrained wav2vec25 was used. The wav2vec25 was trained on multiple data sources, including Libri-Light, Common Voice, Switchboard, and Fisher. This model, which includes 53 languages and 56,000 hours of speech data, was fine-tuned on the data described in Table 2 by adding three randomly initialized linear layers to the pretrained model and then training with character-level CTC loss. A learning rate (LR) of 1e-5 was used for the wav2vec2 model and a linear regression of one for the linear layers. A Speechbrain toolkit was used to train the models for 16 epochs with a batch size of 32, and the standard 27 English characters were employed, including blank. A machine that is equipped with eight A100 GPUs took an average of 3.5 days to complete each model. After fine-tuning the model, decoding occurred on different test sets to calculate a corresponding WER.

Six different ASR models were trained, each with a size of 315 million parameters. The first three models, namely M1 (using data1), M2 (using data2), and M3 (using data3), were trained without including Common Voice in the training data. The other three models, M1' (using data1'), M2' (using data2'), and M3' (using data3'), were trained with Common Voice included in the training pool. The models M1 and M1' can be considered as baseline because the People's Speech data used for training these models comes from the original distribution.

ASR performance was evaluated measuring WER on each of the test sets shown in Table 2.

Figure 6:
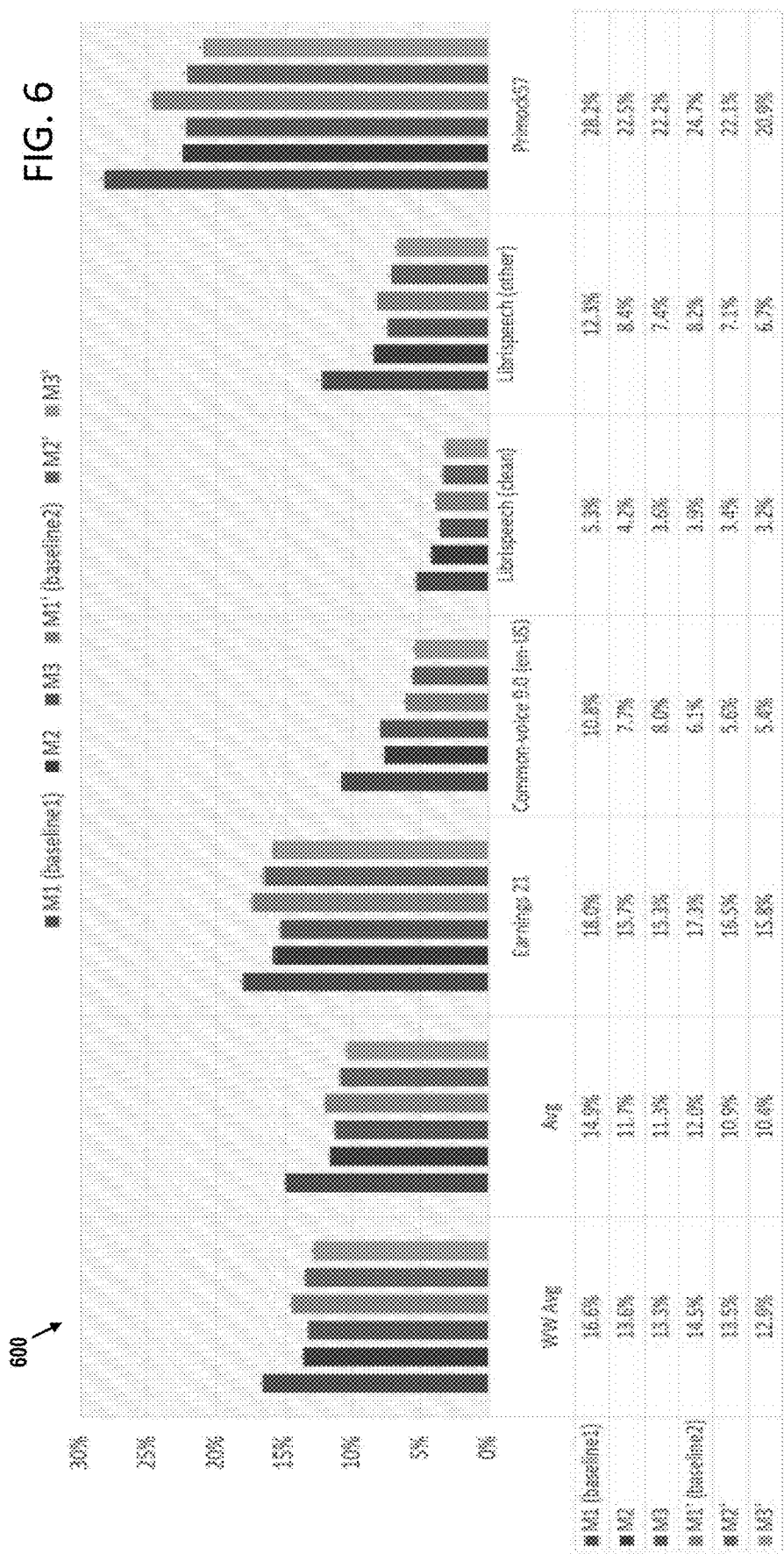
FIG. 6 is a graph showing a performance on different test sets by ASR models according to certain embodiments.

The results with the different models are shown in FIG. 6. The average of WER might not always be a reliable measure of performance as WER may be biased due to the size of each test set. Thus, word weighted average WER (WW Avg) (1st column) and average WER (Avg) (2nd column) are also shown.

When comparing M1 and M2 (first and second bars on the left in each section of the graph 600 of FIG. 6), improvements can be seen across all test sets, including conversational datasets such as Earnings and PriMock 57. Specifically, M2 demonstrates a relative improvement of 12.8% and 20.8% for Earnings and PriMock 57, respectively, compared to M1. Overall, M2 shows a 17% relative improvement in WW Avg in comparison to M1, indicating a positive impact of re-segmented achive.org and new transcriptions on the acoustic model.

A significant improvement with the medical test set can highlight a potential use of good conversational speech. Effective segmentation allows the model to better learn using different segment lengths compared to an original uniform People's Speech segments. Similar trends can be observed when comparing the performance of models M1' and M2' (fourth and fifth bars from the left in each section of the graph 600 of FIG. 6), with improvements observed in read and conversation speech data, including PriMock 57 data. Specifically, M2' shows a relative improvement of 5% and 10.5% for Earnings and PriMock 57, respectively, compared to M1'. Overall, a relative improvement of 6.9% in WW Avg is achieved with M2' over M1'.

The automatic outlier detection and curation process appears to reduce the word error rate (WER) even further. When comparing models M2 and M3 (second and third bars from the left in each section of the graph 600 of FIG. 6), the outlier detection and curation process appears to substantially minimize WER across the test sets, except for Common voice. For the conversational test sets, Earnings-21 and PriMock 57, there is a relative improvement of 2.5% and 1.2% with M3 compared to M2, and an overall improvement in the word-weighted average (WW Avg) is 2.4% relative. Similarly, model M3' (sixth bar from the left in each section of the graph 600 of FIG. 6), also follows this trend and offers an overall relative improvement of 4.5% in WW Avg compared to M2' (fifth bar from the left in each section of the graph 600 of FIG. 6), and this improvement can be observed across all the test sets, including PriMock 57 and Earnings. When comparing M3 and M3' with their respective baselines, M1 and M1', the overall relative WW Avg improvements are significant at 19.7% (3.2% absolute) and 11.1% (1.6% absolute), respectively. These results highlight the benefits of leveraging a good resource of conversational speech corpus, with effective automatic re-segmentation and curation for acoustic model training.

Example Cloud Implementation

As noted above, infrastructure as a service (IaaS) is one particular type of cloud computing. IaaS can be configured to provide virtualized computing resources over a public network (e.g., the Internet). In an IaaS model, a cloud computing provider can host the infrastructure components (e.g., servers, storage devices, network nodes (e.g., hardware), deployment software, platform virtualization (e.g., a hypervisor layer), or the like). In some cases, an IaaS provider may also supply a variety of services to accompany those infrastructure components (example services include billing software, monitoring software, logging software, load balancing software, clustering software, etc.). Thus, as these services may be policy-driven, IaaS users may be able to implement policies to drive load balancing to maintain application availability and performance.

In some instances, IaaS customers may access resources and services through a wide area network (WAN), such as the Internet, and can use the cloud provider's services to install the remaining elements of an application stack. For example, the user can log in to the IaaS platform to create virtual machines (Vims), install operating systems (OSs) on each virtual machine, deploy middleware such as databases, create storage buckets for workloads and backups, and even install enterprise software into that virtual machine. Customers can then use the provider's services to perform various functions, including balancing network traffic, troubleshooting application issues, monitoring performance, managing disaster recovery, etc.

In most cases, a cloud computing model will require the participation of a cloud provider. The cloud provider may, but need not be, a third-party service that specializes in providing (e.g., offering, renting, selling) IaaS. An entity might also opt to deploy a private cloud, becoming its own provider of infrastructure services.

In some examples, IaaS deployment is the process of putting a new application, or a new version of an application, onto a prepared application server or the like. It may also include the process of preparing the server (e.g., installing libraries, daemons, etc.). This is often managed by the cloud provider, below the hypervisor layer (e.g., the servers, storage, network hardware, and virtualization). Thus, the customer may be responsible for handling OS, middleware, and/or application deployment (e.g., on self-service virtual machines (e.g., that can be spun up on demand) or the like.

In some examples, IaaS provisioning may refer to acquiring computers or virtual hosts for use, and even installing needed libraries or services on them. In most cases, deployment does not include provisioning, and the provisioning may need to be performed first.

In some cases, there are two different challenges for IaaS provisioning. First, there is the initial challenge of provisioning the initial set of infrastructure before anything is running. Second, there is the challenge of evolving the existing infrastructure (e.g., adding new services, changing services, removing services, etc.) once everything has been provisioned. In some cases, these two challenges may be addressed by enabling the configuration of the infrastructure to be defined declaratively. In other words, the infrastructure (e.g., what components are needed and how they interact) can be defined by one or more configuration files. Thus, the overall topology of the infrastructure (e.g., what resources depend on which, and how they each work together) can be described declaratively. In some instances, once the topology is defined, a workflow can be generated that creates and/or manages the different components described in the configuration files.

In some examples, an infrastructure may have many interconnected elements. For example, there may be one or more virtual private clouds (VPCs) (e.g., a potentially on-demand pool of configurable and/or shared computing resources), also known as a core network. In some examples, there may also be one or more inbound/outbound traffic group rules provisioned to define how the inbound and/or outbound traffic of the network will be set up and one or more virtual machines (VMs). Other infrastructure elements may also be provisioned, such as a load balancer, a database, or the like. As more and more infrastructure elements are desired and/or added, the infrastructure may incrementally evolve.

In some instances, continuous deployment techniques may be employed to enable deployment of infrastructure code across various virtual computing environments. Additionally, the described techniques can enable infrastructure management within these environments. In some examples, service teams can write code that is desired to be deployed to one or more, but often many, different production environments (e.g., across various different geographic locations, sometimes spanning the entire world). However, in some examples, the infrastructure on which the code will be deployed must first be set up. In some instances, the provisioning can be done manually, a provisioning tool may be utilized to provision the resources, and/or deployment tools may be utilized to deploy the code once the infrastructure is provisioned.

Figure 8:
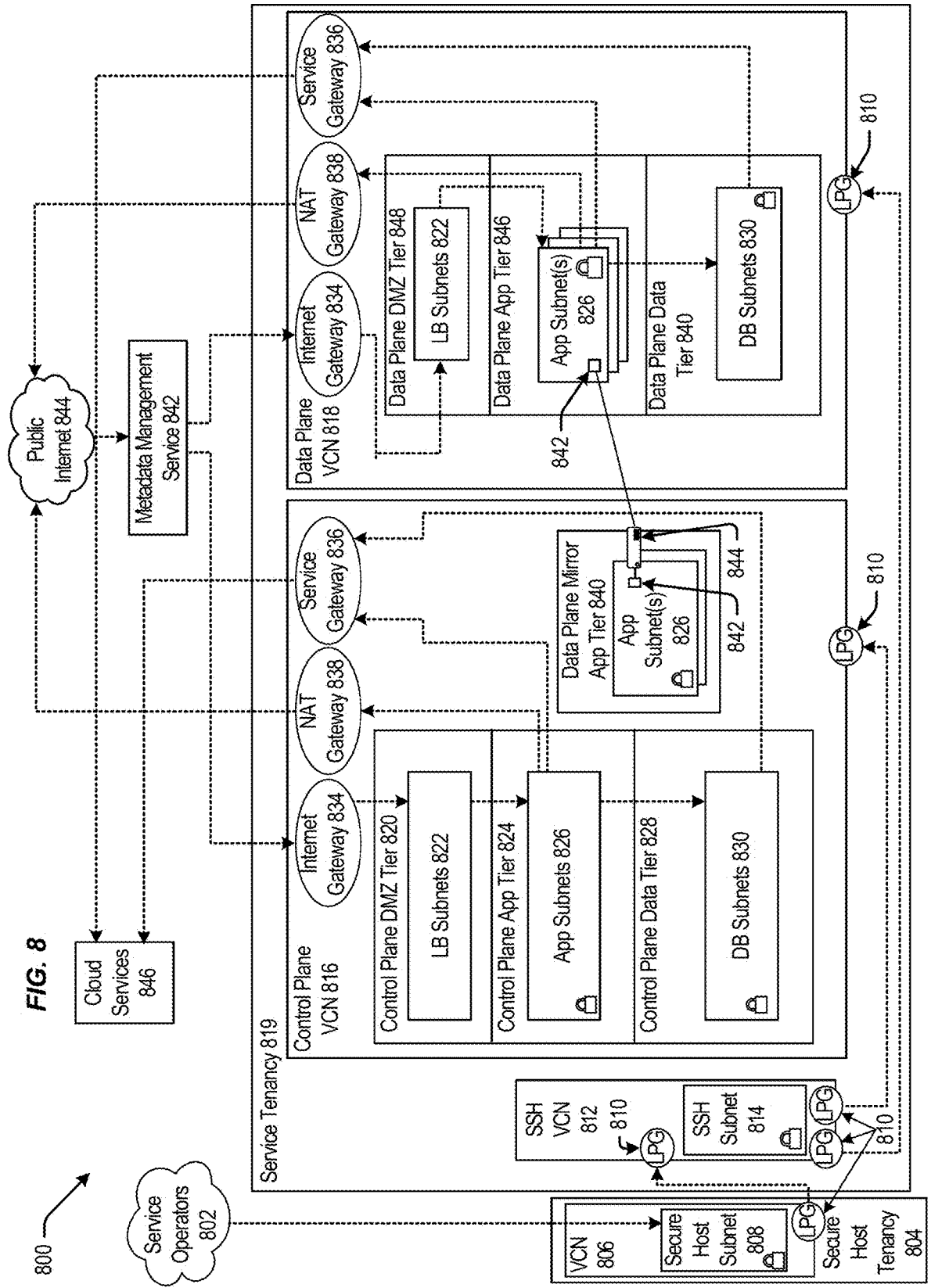
FIG. 8 is a block diagram illustrating one pattern for implementing a cloud infrastructure as a service system, according to at least one embodiment.

FIG. 8 is a block diagram 800 illustrating an example pattern of an IaaS architecture, according to at least one embodiment. Service operators 802 can be communicatively coupled to a secure host tenancy 804 that can include a virtual cloud network (VCN) 806 and a secure host subnet 808. In some examples, the service operators 802 may be using one or more client computing devices, which may be portable handheld devices (e.g., an iPhone®, cellular telephone, an iPad®, computing Tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 8, Palm OS, and the like, and being Internet, e-mail, short message service (SMS), Blackberry®, or other communication protocol enabled. Alternatively, the client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices may be any other electronic device, such as a thin-client computer, an Internet-enabled gaming system (e.g., a Microsoft Xbox gaming console with or without a Kinect® gesture input device), and/or a personal messaging device, capable of communicating over a network that can access the VCN 806 and/or the Internet.

The VCN 806 can include a local peering gateway (LPG) 810 that can be communicatively coupled to a secure shell (SSH) VCN 812 via an LPG 810 contained in the SSH VCN 812. The SSH VCN 812 can include an SSH subnet 814, and the SSH VCN 812 can be communicatively coupled to a control plane VCN 816 via the LPG 810 contained in the control plane VCN 816. Also, the SSH VCN 812 can be communicatively coupled to a data plane VCN 818 via an LPG 810. The control plane VCN 816 and the data plane VCN 818 can be contained in a service tenancy 819 that can be owned and/or operated by the IaaS provider.

The control plane VCN 816 can include a control plane demilitarized zone (DMZ) tier 820 that acts as a perimeter network (e.g., portions of a corporate network between the corporate intranet and external networks). The DMZ-based servers may have restricted responsibilities and help keep breaches contained. Additionally, the DMZ tier 820 can include one or more load balancer (LB) subnet(s) 822, a control plane app tier 824 that can include app subnet(s) 826, a control plane data tier 828 that can include database (DB) subnet(s) 830 (e.g., frontend DB subnet(s) and/or backend DB subnet(s)). The LB subnet(s) 822 contained in the control plane DMZ tier 820 can be communicatively coupled to the app subnet(s) 826 contained in the control plane app tier 824 and an Internet gateway 834 that can be contained in the control plane VCN 816, and the app subnet(s) 826 can be communicatively coupled to the DB subnet(s) 830 contained in the control plane data tier 828 and a service gateway 836 and a network address translation (NAT) gateway 838. The control plane VCN 816 can include the service gateway 836 and the NAT gateway 838.

The control plane VCN 816 can include a data plane mirror app tier 840 that can include app subnet(s) 826. The app subnet(s) 826 contained in the data plane mirror app tier 840 can include a virtual network interface controller (VNIC) 842 that can execute a compute instance 844. The compute instance 844 can communicatively couple the app subnet(s) 826 of the data plane mirror app tier 840 to app subnet(s) 826 that can be contained in a data plane app tier 846.

The data plane VCN 818 can include the data plane app tier 846, a data plane DMZ tier 848, and a data plane data tier 850. The data plane DMZ tier 848 can include LB subnet(s) 822 that can be communicatively coupled to the app subnet(s) 826 of the data plane app tier 846 and the Internet gateway 834 of the data plane VCN 818. The app subnet(s) 826 can be communicatively coupled to the service gateway 836 of the data plane VCN 818 and the NAT gateway 838 of the data plane VCN 818. The data plane data tier 850 can also include the DB subnet(s) 830 that can be communicatively coupled to the app subnet(s) 826 of the data plane app tier 846.

The Internet gateway 834 of the control plane VCN 816 and of the data plane VCN 818 can be communicatively coupled to a metadata management service 852 that can be communicatively coupled to public Internet 854. Public Internet 854 can be communicatively coupled to the NAT gateway 838 of the control plane VCN 816 and of the data plane VCN 818. The service gateway 836 of the control plane VCN 816 and of the data plane VCN 818 can be communicatively couple to cloud services 856.

In some examples, the service gateway 836 of the control plane VCN 816 or of the data plane VCN 818 can make application programming interface (API) calls to cloud services 856 without going through public Internet 854. The API calls to cloud services 856 from the service gateway 836 can be one-way: the service gateway 836 can make API calls to cloud services 856, and cloud services 856 can send requested data to the service gateway 836. But, cloud services 856 may not initiate API calls to the service gateway 836.

In some examples, the secure host tenancy 804 can be directly connected to the service tenancy 819, which may be otherwise isolated. The secure host subnet 808 can communicate with the SSH subnet 814 through an LPG 810 that may enable two-way communication over an otherwise isolated system. Connecting the secure host subnet 808 to the SSH subnet 814 may give the secure host subnet 808 access to other entities within the service tenancy 819.

The control plane VCN 816 may allow users of the service tenancy 819 to set up or otherwise provision desired resources. Desired resources provisioned in the control plane VCN 816 may be deployed or otherwise used in the data plane VCN 818. In some examples, the control plane VCN 816 can be isolated from the data plane VCN 818, and the data plane mirror app tier 840 of the control plane VCN 816 can communicate with the data plane app tier 846 of the data plane VCN 818 via VNICs 842 that can be contained in the data plane mirror app tier 840 and the data plane app tier 846.

In some examples, users of the system, or customers, can make requests, for example create, read, update, or delete (CRUD) operations, through public Internet 854 that can communicate the requests to the metadata management service 852. The metadata management service 852 can communicate the request to the control plane VCN 816 through the Internet gateway 834. The request can be received by the LB subnet(s) 822 contained in the control plane DMZ tier 820. The LB subnet(s) 822 may determine that the request is valid, and in response to this determination, the LB subnet(s) 822 can transmit the request to app subnet(s) 826 contained in the control plane app tier 824. If the request is validated and requires a call to public Internet 854, the call to public Internet 854 may be transmitted to the NAT gateway 838 that can make the call to public Internet 854. Metadata that may be desired to be stored by the request can be stored in the DB subnet(s) 830.

In some examples, the data plane mirror app tier 840 can facilitate direct communication between the control plane VCN 816 and the data plane VCN 818. For example, changes, updates, or other suitable modifications to configuration may be desired to be applied to the resources contained in the data plane VCN 818. Via a VNIC 842, the control plane VCN 816 can directly communicate with, and can thereby execute the changes, updates, or other suitable modifications to configuration to, resources contained in the data plane VCN 818.

In some embodiments, the control plane VCN 816 and the data plane VCN 818 can be contained in the service tenancy 819. In this case, the user, or the customer, of the system may not own or operate either the control plane VCN 816 or the data plane VCN 818. Instead, the IaaS provider may own or operate the control plane VCN 816 and the data plane VCN 818, both of which may be contained in the service tenancy 819. This embodiment can enable isolation of networks that may prevent users or customers from interacting with other users', or other customers', resources. Also, this embodiment may allow users or customers of the system to store databases privately without needing to rely on public Internet 854, which may not have a desired level of threat prevention, for storage.

In other embodiments, the LB subnet(s) 822 contained in the control plane VCN 816 can be configured to receive a signal from the service gateway 836. In this embodiment, the control plane VCN 816 and the data plane VCN 818 may be configured to be called by a customer of the IaaS provider without calling public Internet 854. Customers of the IaaS provider may desire this embodiment since database(s) that the customers use may be controlled by the IaaS provider and may be stored on the service tenancy 819, which may be isolated from public Internet 854.

Figure 9:
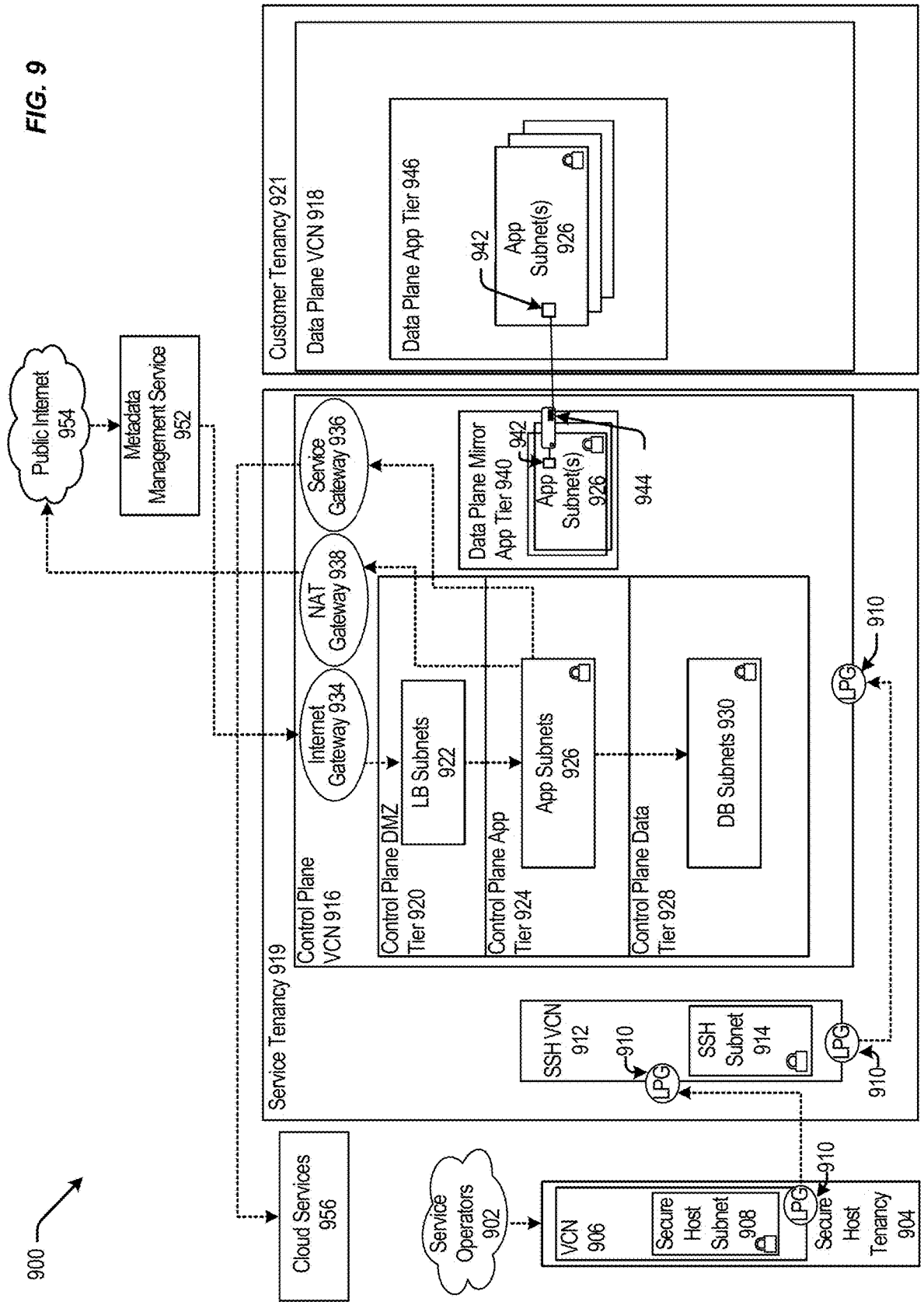
FIG. 9 is a block diagram illustrating another pattern for implementing a cloud infrastructure as a service system, according to at least one embodiment.

FIG. 9 is a block diagram 900 illustrating another example pattern of an IaaS architecture, according to at least one embodiment. Service operators 902 (e.g., service operators 802 of FIG. 8) can be communicatively coupled to a secure host tenancy 904 (e.g., the secure host tenancy 804 of FIG. 8) that can include a virtual cloud network (VCN) 906 (e.g., the VCN 806 of FIG. 8) and a secure host subnet 908 (e.g., the secure host subnet 808 of FIG. 8). The VCN 906 can include a local peering gateway (LPG) 910 (e.g., the LPG 810 of FIG. 8) that can be communicatively coupled to a secure shell (SSH) VCN 912 (e.g., the SSH VCN 812 of FIG. 8) via an LPG 810 contained in the SSH VCN 912. The SSH VCN 912 can include an SSH subnet 914 (e.g., the SSH subnet 814 of FIG. 8), and the SSH VCN 912 can be communicatively coupled to a control plane VCN 916 (e.g., the control plane VCN 816 of FIG. 8) via an LPG 910 contained in the control plane VCN 916. The control plane VCN 916 can be contained in a service tenancy 919 (e.g., the service tenancy 819 of FIG. 8), and the data plane VCN 918 (e.g., the data plane VCN 818 of FIG. 8) can be contained in a customer tenancy 921 that may be owned or operated by users, or customers, of the system.

The control plane VCN 916 can include a control plane DMZ tier 920 (e.g., the control plane DMZ tier 820 of FIG. 8) that can include LB subnet(s) 922 (e.g., LB subnet(s) 822 of FIG. 8), a control plane app tier 924 (e.g., the control plane app tier 824 of FIG. 8) that can include app subnet(s) 926 (e.g., app subnet(s) 826 of FIG. 8), a control plane data tier 928 (e.g., the control plane data tier 828 of FIG. 8) that can include database (DB) subnet(s) 930 (e.g., similar to DB subnet(s) 830 of FIG. 8). The LB subnet(s) 922 contained in the control plane DMZ tier 920 can be communicatively coupled to the app subnet(s) 926 contained in the control plane app tier 924 and an Internet gateway 934 (e.g., the Internet gateway 834 of FIG. 8) that can be contained in the control plane VCN 916, and the app subnet(s) 926 can be communicatively coupled to the DB subnet(s) 930 contained in the control plane data tier 928 and a service gateway 936 (e.g., the service gateway 836 of FIG. 8) and a network address translation (NAT) gateway 938 (e.g., the NAT gateway 838 of FIG. 8). The control plane VCN 916 can include the service gateway 936 and the NAT gateway 938.

The control plane VCN 916 can include a data plane mirror app tier 940 (e.g., the data plane mirror app tier 840 of FIG. 8) that can include app subnet(s) 926. The app subnet(s) 926 contained in the data plane mirror app tier 940 can include a virtual network interface controller (VNIC) 942 (e.g., the VNIC of 842) that can execute a compute instance 944 (e.g., similar to the compute instance 844 of FIG. 8). The compute instance 944 can facilitate communication between the app subnet(s) 926 of the data plane mirror app tier 940 and the app subnet(s) 926 that can be contained in a data plane app tier 946 (e.g., the data plane app tier 846 of FIG. 8) via the VNIC 942 contained in the data plane mirror app tier 940 and the VNIC 942 contained in the data plane app tier 946.

The Internet gateway 934 contained in the control plane VCN 916 can be communicatively coupled to a metadata management service 952 (e.g., the metadata management service 852 of FIG. 8) that can be communicatively coupled to public Internet 954 (e.g., public Internet 854 of FIG. 8). Public Internet 954 can be communicatively coupled to the NAT gateway 938 contained in the control plane VCN 916. The service gateway 936 contained in the control plane VCN 916 can be communicatively couple to cloud services 956 (e.g., cloud services 856 of FIG. 8).

In some examples, the data plane VCN 918 can be contained in the customer tenancy 921. In this case, the IaaS provider may provide the control plane VCN 916 for each customer, and the IaaS provider may, for each customer, set up a unique compute instance 944 that is contained in the service tenancy 919. Each compute instance 944 may allow communication between the control plane VCN 916, contained in the service tenancy 919, and the data plane VCN 918 that is contained in the customer tenancy 921. The compute instance 944 may allow-resources, that are provisioned in the control plane VCN 916 that is contained in the service tenancy 919, to be deployed or otherwise used in the data plane VCN 918 that is contained in the customer tenancy 921.

In other examples, the customer of the IaaS provider may have databases that live in the customer tenancy 921. In this example, the control plane VCN 916 can include the data plane mirror app tier 940 that can include app subnet(s) 926. The data plane mirror app tier 940 can reside in the data plane VCN 918, but the data plane mirror app tier 940 may not live in the data plane VCN 918. That is, the data plane mirror app tier 940 may have access to the customer tenancy 921, but the data plane mirror app tier 940 may not exist in the data plane VCN 918 or be owned or operated by the customer of the IaaS provider. The data plane mirror app tier 940 may be configured to make calls to the data plane VCN 918 but may not be configured to make calls to any entity contained in the control plane VCN 916. The customer may desire to deploy or otherwise use resources in the data plane VCN 918 that are provisioned in the control plane VCN 916, and the data plane mirror app tier 940 can facilitate the desired deployment, or other usage of resources, of the customer.

In some embodiments, the customer of the IaaS provider can apply filters to the data plane VCN 918. In this embodiment, the customer can determine what the data plane VCN 918 can access, and the customer may restrict access to public Internet 954 from the data plane VCN 918. The IaaS provider may not be able to apply filters or otherwise control access of the data plane VCN 918 to any outside networks or databases. Applying filters and controls by the customer onto the data plane VCN 918, contained in the customer tenancy 921, can help isolate the data plane VCN 918 from other customers and from public Internet 954.

In some embodiments, cloud services 956 can be called by the service gateway 936 to access services that may not exist on public Internet 954, on the control plane VCN 916, or on the data plane VCN 918. The connection between cloud services 956 and the control plane VCN 916 or the data plane VCN 918 may not be live or continuous. Cloud services 956 may exist on a different network owned or operated by the IaaS provider. Cloud services 956 may be configured to receive calls from the service gateway 936 and may be configured to not receive calls from public Internet 954. Some cloud services 956 may be isolated from other cloud services 956, and the control plane VCN 916 may be isolated from cloud services 956 that may not be in the same region as the control plane VCN 916. For example, the control plane VCN 916 may be located in "Region 1," and cloud service "Deployment 8," may be located in Region 1 and in "Region 2." If a call to Deployment 8 is made by the service gateway 936 contained in the control plane VCN 916 located in Region 1, the call may be transmitted to Deployment 8 in Region 1. In this example, the control plane VCN 916, or Deployment 8 in Region 1, may not be communicatively coupled to, or otherwise in communication with, Deployment 8 in Region 2.

Figure 10:
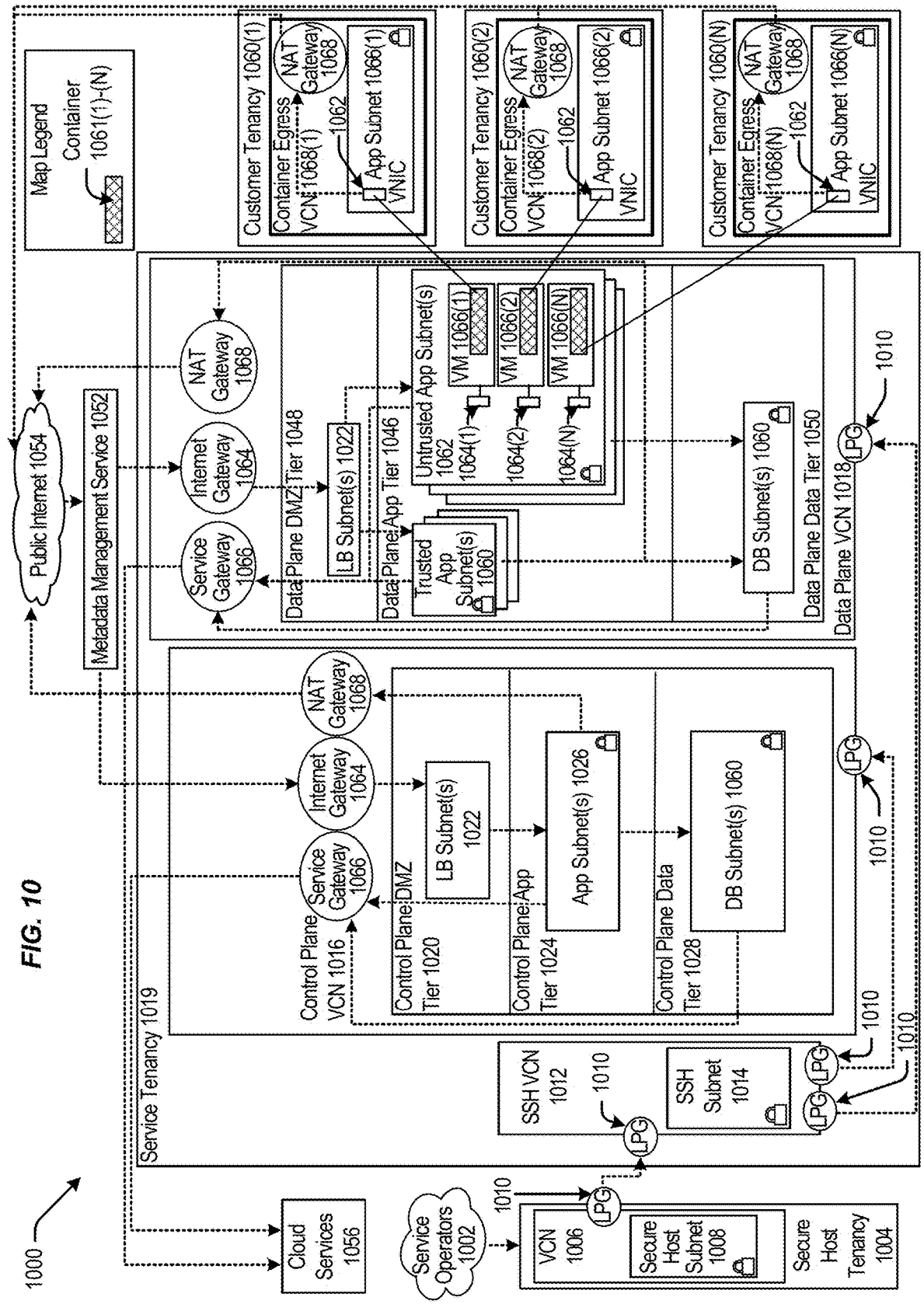
FIG. 10 is a block diagram illustrating another pattern for implementing a cloud infrastructure as a service system, according to at least one embodiment.

FIG. 10 is a block diagram 1000 illustrating another example pattern of an IaaS architecture, according to at least one embodiment. Service operators 1002 (e.g., service operators 802 of FIG. 8) can be communicatively coupled to a secure host tenancy 1004 (e.g., the secure host tenancy 804 of FIG. 8) that can include a virtual cloud network (VCN) 1006 (e.g., the VCN 806 of FIG. 8) and a secure host subnet 1008 (e.g., the secure host subnet 808 of FIG. 8). The VCN 1006 can include an LPG 1010 (e.g., the LPG 810 of FIG. 8) that can be communicatively coupled to an SSH VCN 1012 (e.g., the SSH VCN 812 of FIG. 8) via an LPG 1010 contained in the SSH VCN 1012. The SSH VCN 1012 can include an SSH subnet 1014 (e.g., the SSH subnet 814 of FIG. 8), and the SSH VCN 1012 can be communicatively coupled to a control plane VCN 1016 (e.g., the control plane VCN 816 of FIG. 8) via an LPG 1010 contained in the control plane VCN 1016 and to a data plane VCN 1018 (e.g., the data plane 818 of FIG. 8) via an LPG 1010 contained in the data plane VCN 1018. The control plane VCN 1016 and the data plane VCN 1018 can be contained in a service tenancy 1019 (e.g., the service tenancy 819 of FIG. 8).

The control plane VCN 1016 can include a control plane DMZ tier 1020 (e.g., the control plane DMZ tier 820 of FIG. 8) that can include load balancer (LB) subnet(s) 1022 (e.g., LB subnet(s) 822 of FIG. 8), a control plane app tier 1024 (e.g., the control plane app tier 824 of FIG. 8) that can include app subnet(s) 1026 (e.g., similar to app subnet(s) 826 of FIG. 8), a control plane data tier 1028 (e.g., the control plane data tier 828 of FIG. 8) that can include DB subnet(s) 1030. The LB subnet(s) 1022 contained in the control plane DMZ tier 1020 can be communicatively coupled to the app subnet(s) 1026 contained in the control plane app tier 1024 and to an Internet gateway 1034 (e.g., the Internet gateway 834 of FIG. 8) that can be contained in the control plane VCN 1016, and the app subnet(s) 1026 can be communicatively coupled to the DB subnet(s) 1030 contained in the control plane data tier 1028 and to a service gateway 1036 (e.g., the service gateway of FIG. 8) and a network address translation (NAT) gateway 1038 (e.g., the NAT gateway 838 of FIG. 8). The control plane VCN 1016 can include the service gateway 1036 and the NAT gateway 1038.

The data plane VCN 1018 can include a data plane app tier 1046 (e.g., the data plane app tier 846 of FIG. 8), a data plane DMZ tier 1048 (e.g., the data plane DMZ tier 848 of FIG. 8), and a data plane data tier 1050 (e.g., the data plane data tier 850 of FIG. 8). The data plane DMZ tier 1048 can include LB subnet(s) 1022 that can be communicatively coupled to trusted app subnet(s) 1060 and untrusted app subnet(s) 1062 of the data plane app tier 1046 and the Internet gateway 1034 contained in the data plane VCN 1018. The trusted app subnet(s) 1060 can be communicatively coupled to the service gateway 1036 contained in the data plane VCN 1018, the NAT gateway 1038 contained in the data plane VCN 1018, and DB subnet(s) 1030 contained in the data plane data tier 1050. The untrusted app subnet(s) 1062 can be communicatively coupled to the service gateway 1036 contained in the data plane VCN 1018 and DB subnet(s) 1030 contained in the data plane data tier 1050. The data plane data tier 1050 can include DB subnet(s) 1030 that can be communicatively coupled to the service gateway 1036 contained in the data plane VCN 1018.

The untrusted app subnet(s) 1062 can include one or more primary VNICs 1064(1)-(N) that can be communicatively coupled to tenant virtual machines (VMs) 1066(1)-(N). Each tenant virtual machine 1066(1)-(N) can be communicatively coupled to a respective app subnet 1067(1)-(N) that can be contained in respective container egress VCNs 1068(1)-(N) that can be contained in respective customer tenancies 1070(1)-(N). Respective secondary VNICs 1072(1)-(N) can facilitate communication between the untrusted app subnet(s) 1062 contained in the data plane VCN 1018 and the app subnet contained in the container egress VCNs 1068(1)-(N). Each container egress VCNs 1068(1)-(N) can include a NAT gateway 1038 that can be communicatively coupled to public Internet 1054 (e.g., public Internet 854 of FIG. 8).

The Internet gateway 1034 contained in the control plane VCN 1016 and contained in the data plane VCN 1018 can be communicatively coupled to a metadata management service 1052 (e.g., the metadata management service 852 of FIG. 8) that can be communicatively coupled to public Internet 1054. Public Internet 1054 can be communicatively coupled to the NAT gateway 1038 contained in the control plane VCN 1016 and contained in the data plane VCN 1018. The service gateway 1036 contained in the control plane VCN 1016 and contained in the data plane VCN 1018 can be communicatively couple to cloud services 1056.

In some embodiments, the data plane VCN 1018 can be integrated with customer tenancies 1070. This integration can be useful or desirable for customers of the IaaS provider in some cases such as a case that may desire support when executing code. The customer may provide code to run that may be destructive, may communicate with other customer resources, or may otherwise cause undesirable effects. In response to this, the IaaS provider may determine whether to run code given to the IaaS provider by the customer.

In some examples, the customer of the IaaS provider may grant temporary network access to the IaaS provider and request a function to be attached to the data plane app tier 1046. Code to run the function may be executed in the virtual machines 1066(1)-(N), and the code may not be configured to run anywhere else on the data plane VCN 1018. Each virtual machine 1066(1)-(N) may be connected to one customer tenancy 1070. Respective containers 1071(1)-(N) contained in the virtual machines 1066(1)-(N) may be configured to run the code. In this case, there can be a dual isolation (e.g., the containers 1071(1)-(N) running code, where the containers 1071(1)-(N) may be contained in at least the virtual machine 1066(1)-(N) that are contained in the untrusted app subnet(s) 1062), which may help prevent incorrect or otherwise undesirable code from damaging the network of the IaaS provider or from damaging a network of a different customer. The containers 1071(1)-(N) may be communicatively coupled to the customer tenancy 1070 and may be configured to transmit or receive data from the customer tenancy 1070. The containers 1071(1)-(N) may not be configured to transmit or receive data from any other entity in the data plane VCN 1018. Upon completion of running the code, the IaaS provider may kill or otherwise dispose of the containers 1071(1)-(N).

In some embodiments, the trusted app subnet(s) 1060 may run code that may be owned or operated by the IaaS provider. In this embodiment, the trusted app subnet(s) 1060 may be communicatively coupled to the DB subnet(s) 1030 and be configured to execute CRUD operations in the DB subnet(s) 1030. The untrusted app subnet(s) 1062 may be communicatively coupled to the DB subnet(s) 1030, but in this embodiment, the untrusted app subnet(s) may be configured to execute read operations in the DB subnet(s) 1030. The containers 1071(1)-(N) that can be contained in the virtual machine 1066(1)-(N) of each customer and that may run code from the customer may not be communicatively coupled with the DB subnet(s) 1030.

In other embodiments, the control plane VCN 1016 and the data plane VCN 1018 may not be directly communicatively coupled. In this embodiment, there may be no direct communication between the control plane VCN 1016 and the data plane VCN 1018. However, communication can occur indirectly through at least one method. An LPG 1010 may be established by the IaaS provider that can facilitate communication between the control plane VCN 1016 and the data plane VCN 1018. In another example, the control plane VCN 1016 or the data plane VCN 1018 can make a call to cloud services 1056 via the service gateway 1036. For example, a call to cloud services 1056 from the control plane VCN 1016 can include a request for a service that can communicate with the data plane VCN 1018.

Figure 11:
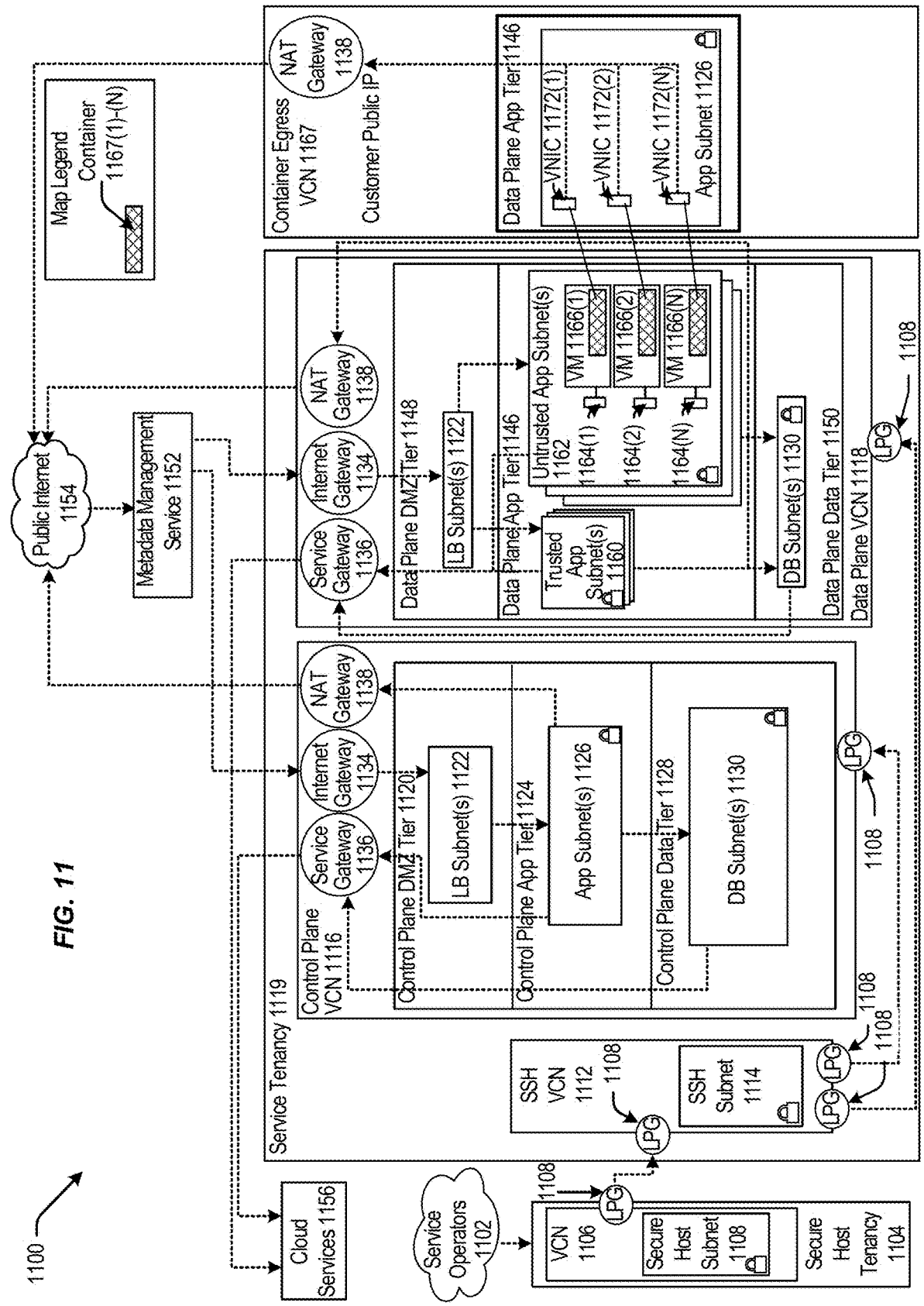
FIG. 11 is a block diagram illustrating another pattern for implementing a cloud infrastructure as a service system, according to at least one embodiment.

FIG. 11 is a block diagram 1100 illustrating another example pattern of an IaaS architecture, according to at least one embodiment. Service operators 1102 (e.g., service operators 802 of FIG. 8) can be communicatively coupled to a secure host tenancy 1104 (e.g., the secure host tenancy 804 of FIG. 8) that can include a virtual cloud network (VCN) 1106 (e.g., the VCN 806 of FIG. 8) and a secure host subnet 1108 (e.g., the secure host subnet 808 of FIG. 8). The VCN 1106 can include an LPG 1110 (e.g., the LPG 810 of FIG. 8) that can be communicatively coupled to an SSH VCN 1112 (e.g., the SSH VCN 812 of FIG. 8) via an LPG 1110 contained in the SSH VCN 1112. The SSH VCN 1112 can include an SSH subnet 1114 (e.g., the SSH subnet 814 of FIG. 8), and the SSH VCN 1112 can be communicatively coupled to a control plane VCN 1116 (e.g., the control plane VCN 816 of FIG. 8) via an LPG 1110 contained in the control plane VCN 1116 and to a data plane VCN 1118 (e.g., the data plane 818 of FIG. 8) via an LPG 1110 contained in the data plane VCN 1118. The control plane VCN 1116 and the data plane VCN 1118 can be contained in a service tenancy 1119 (e.g., the service tenancy 819 of FIG. 8).

The control plane VCN 1116 can include a control plane DMZ tier 1120 (e.g., the control plane DMZ tier 820 of FIG. 8) that can include LB subnet(s) 1122 (e.g., LB subnet(s) 822 of FIG. 8), a control plane app tier 1124 (e.g., the control plane app tier 824 of FIG. 8) that can include app subnet(s) 1126 (e.g., app subnet(s) 826 of FIG. 8), a control plane data tier 1128 (e.g., the control plane data tier 828 of FIG. 8) that can include DB subnet(s) 1130 (e.g., DB subnet(s) 1030 of FIG. 10). The LB subnet(s) 1122 contained in the control plane DMZ tier 1120 can be communicatively coupled to the app subnet(s) 1126 contained in the control plane app tier 1124 and to an Internet gateway 1134 (e.g., the Internet gateway 834 of FIG. 8) that can be contained in the control plane VCN 1116, and the app subnet(s) 1126 can be communicatively coupled to the DB subnet(s) 1130 contained in the control plane data tier 1128 and to a service gateway 1136 (e.g., the service gateway of FIG. 8) and a network address translation (NAT) gateway 1138 (e.g., the NAT gateway 838 of FIG. 8). The control plane VCN 1116 can include the service gateway 1136 and the NAT gateway 1138.

The data plane VCN 1118 can include a data plane app tier 1146 (e.g., the data plane app tier 846 of FIG. 8), a data plane DMZ tier 1148 (e.g., the data plane DMZ tier 848 of FIG. 8), and a data plane data tier 1150 (e.g., the data plane data tier 850 of FIG. 8). The data plane DMZ tier 1148 can include LB subnet(s) 1122 that can be communicatively coupled to trusted app subnet(s) 1160 (e.g., trusted app subnet(s) 1060 of FIG. 10) and untrusted app subnet(s) 1162 (e.g., untrusted app subnet(s) 1062 of FIG. 10) of the data plane app tier 1146 and the Internet gateway 1134 contained in the data plane VCN 1118. The trusted app subnet(s) 1160 can be communicatively coupled to the service gateway 1136 contained in the data plane VCN 1118, the NAT gateway 1138 contained in the data plane VCN 1118, and DB subnet(s) 1130 contained in the data plane data tier 1150. The untrusted app subnet(s) 1162 can be communicatively coupled to the service gateway 1136 contained in the data plane VCN 1118 and DB subnet(s) 1130 contained in the data plane data tier 1150. The data plane data tier 1150 can include DB subnet(s) 1130 that can be communicatively coupled to the service gateway 1136 contained in the data plane VCN 1118.

The untrusted app subnet(s) 1162 can include primary VNICs 1164(1)-(N) that can be communicatively coupled to tenant virtual machines (VMs) 1166(1)-(N) residing within the untrusted app subnet(s) 1162. Each tenant virtual machine 1166(1)-(N) can run code in a respective container 1167(1)-(N), and be communicatively coupled to an app subnet 1126 that can be contained in a data plane app tier 1146 that can be contained in a container egress VCN 1168. Respective secondary VNICs 1172(1)-(N) can facilitate communication between the untrusted app subnet(s) 1162 contained in the data plane VCN 1118 and the app subnet contained in the container egress VCN 1168. The container egress VCN can include a NAT gateway 1138 that can be communicatively coupled to public Internet 1154 (e.g., public Internet 854 of FIG. 8).

The Internet gateway 1134 contained in the control plane VCN 1116 and contained in the data plane VCN 1118 can be communicatively coupled to a metadata management service 1152 (e.g., the metadata management service 852 of FIG. 8) that can be communicatively coupled to public Internet 1154. Public Internet 1154 can be communicatively coupled to the NAT gateway 1138 contained in the control plane VCN 1116 and contained in the data plane VCN 1118. The service gateway 1136 contained in the control plane VCN 1116 and contained in the data plane VCN 1118 can be communicatively couple to cloud services 1156.

In some examples, the pattern illustrated by the architecture of block diagram 1100 of FIG. 11 may be considered an exception to the pattern illustrated by the architecture of block diagram 1000 of FIG. 10 and may be desirable for a customer of the IaaS provider if the IaaS provider cannot directly communicate with the customer (e.g., a disconnected region). The respective containers 1167(1)-(N) that are contained in the virtual machines 1166(1)-(N) for each customer can be accessed in real-time by the customer. The containers 1167(1)-(N) may be configured to make calls to respective secondary VNICs 1172(1)-(N) contained in app subnet(s) 1126 of the data plane app tier 1146 that can be contained in the container egress VCN 1168. The secondary VNICs 1172(1)-(N) can transmit the calls to the NAT gateway 1138 that may transmit the calls to public Internet 1154. In this example, the containers 1167(1)-(N) that can be accessed in real-time by the customer can be isolated from the control plane VCN 1116 and can be isolated from other entities contained in the data plane VCN 1118. The containers 1167(1)-(N) may also be isolated from resources from other customers.

In other examples, the customer can use the containers 1167(1)-(N) to call cloud services 1156. In this example, the customer may run code in the containers 1167(1)-(N) that requests a service from cloud services 1156. The containers 1167(1)-(N) can transmit this request to the secondary VNICs 1172(1)-(N) that can transmit the request to the NAT gateway that can transmit the request to public Internet 1154. Public Internet 1154 can transmit the request to LB subnet(s) 1122 contained in the control plane VCN 1116 via the Internet gateway 1134. In response to determining the request is valid, the LB subnet(s) can transmit the request to app subnet(s) 1126 that can transmit the request to cloud services 1156 via the service gateway 1136.

It should be appreciated that IaaS architectures 800, 900, 1000, 1100 depicted in the figures may have other components than those depicted. Further, the embodiments shown in the figures are only some examples of a cloud infrastructure system that may incorporate an embodiment of the disclosure. In some other embodiments, the IaaS systems may have more or fewer components than shown in the figures, may combine two or more components, or may have a different configuration or arrangement of components.

In certain embodiments, the IaaS systems described herein may include a suite of applications, middleware, and database service offerings that are delivered to a customer in a self-service, subscription-based, elastically scalable, reliable, highly available, and secure manner. An example of such an IaaS system is the Oracle Cloud Infrastructure (OCI) provided by the present assignee.

Example Computer System

FIG. 12 illustrates an example computer system 1200, in which various embodiments may be implemented. The computer system 1200 may be used to implement any of the computer systems described above. As shown in the figure, computer system 1200 includes a processing unit 1204 that communicates with a number of peripheral subsystems via a bus subsystem 1202. These peripheral subsystems may include a processing acceleration unit 1206, an I/O subsystem 1208, a storage subsystem 1218 and a communications subsystem 1224. Storage subsystem 1218 includes tangible computer-readable storage media 1222 and a system memory 1210.

Bus subsystem 1202 provides a mechanism for letting the various components and subsystems of computer system 1200 communicate with each other as intended. Although bus subsystem 1202 is shown schematically as a single bus, alternative embodiments of the bus subsystem may utilize multiple buses. Bus subsystem 1202 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 1204, which can be implemented as one or more integrated circuits (e.g., a conventional microprocessor or microcontroller), controls the operation of computer system 1200. One or more processors may be included in processing unit 1204. These processors may include single core or multicore processors. In certain embodiments, processing unit 1204 may be implemented as one or more independent processing units 1232 and/or 1234 with single or multicore processors included in each processing unit. In other embodiments, processing unit 1204 may also be implemented as a quad-core processing unit formed by integrating two dual-core processors into a single chip.

In various embodiments, processing unit 1204 can execute a variety of programs in response to program code and can maintain multiple concurrently executing programs or processes. At any given time, some or all of the program code to be executed can be resident in processor(s) 1204 and/or in storage subsystem 1218. Through suitable programming, processor(s) 1204 can provide various functionalities described above. Computer system 1200 may additionally include a processing acceleration unit 1206, which can include a digital signal processor (DSP), a special-purpose processor, and/or the like.

I/O subsystem 1208 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic Tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 1200 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 1200 may include a storage subsystem 1218 that includes software elements, shown as being currently located within a system memory 1210. System memory 1210 may store program instructions that are loadable and executable on processing unit 1204, as well as data generated during the execution of these programs.

Depending on the configuration and type of computer system 1200, system memory 1210 may be volatile (such as random access memory (RAM)) and/or non-volatile (such as read-only memory (ROM), flash memory, etc.) The RAM typically contains data and/or program services that are immediately accessible to and/or presently being operated and executed by processing unit 1204. In some implementations, system memory 1210 may include multiple different types of memory, such as static random access memory (SRAM) or dynamic random access memory (DRAM). In some implementations, a basic input/output system (BIOS), containing the basic routines that help to transfer information between elements within computer system 1200, such as during start-up, may typically be stored in the ROM. By way of example, and not limitation, system memory 1210 also illustrates application programs 1212, which may include client applications, Web browsers, mid-tier applications, relational database management systems (RDBMS), etc., program data 1214, and an operating system 1216. By way of example, operating system 1216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, and Palm® OS operating systems.

Storage subsystem 1218 may also provide a tangible computer-readable storage medium for storing the basic programming and data constructs that provide the functionality of some embodiments. Software (programs, code services, instructions) that when executed by a processor provide the functionality described above may be stored in storage subsystem 1218. These software services or instructions may be executed by processing unit 1204. Storage subsystem 1218 may also provide a repository for storing data used in accordance with the present disclosure.

Storage subsystem 1218 may also include a computer-readable storage media reader 1220 that can further be connected to computer-readable storage media 1222. Together and, optionally, in combination with system memory 1210, computer-readable storage media 1222 may comprehensively represent remote, local, fixed, and/or removable storage devices plus storage media for temporarily and/or more permanently containing, storing, transmitting, and retrieving computer-readable information.

Computer-readable storage media 1222 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computer system 1200.

By way of example, computer-readable storage media 1222 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 1222 may include, but is not limited to, Zip® drives, flash memory cards, universal serial bus (USB) flash drives, secure digital (SD) cards, DVD disks, digital video tape, and the like. Computer-readable storage media 1222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program services, and other data for computer system 1200.

Communications subsystem 1224 provides an interface to other computer systems and networks. Communications subsystem 1224 serves as an interface for receiving data from and transmitting data to other systems from computer system 1200. For example, communications subsystem 1224 may enable computer system 1200 to connect to one or more devices via the Internet. In some embodiments, communications subsystem 1224 can include radio frequency (RF) transceiver components for accessing wireless voice and/or data networks (e.g., using cellular telephone technology, advanced data network technology, such as 3G, 4G, 5G or EDGE (enhanced data rates for global evolution), WiFi (IEEE 802.11 family standards, or other mobile communication technologies, or any combination thereof)), global positioning system (GPS) receiver components, and/or other components. In some embodiments, communications subsystem 1224 can provide wired network connectivity (e.g., Ethernet) in addition to or instead of a wireless interface.

In some embodiments, communications subsystem 1224 may also receive input communication in the form of structured and/or unstructured data feeds 1226, event streams 1228, event updates 1230, and the like on behalf of one or more users who may use computer system 1200.

By way of example, communications subsystem 1224 may be configured to receive data feeds 1226 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 1224 may also be configured to receive data in the form of continuous data streams, which may include event streams 1228 of real-time events and/or event updates 1230, that may be continuous or unbounded in nature with no explicit end. Examples of applications that generate continuous data may include, for example, sensor data applications, financial tickers, network performance measuring tools (e.g., network monitoring and traffic management applications), clickstream analysis tools, automobile traffic monitoring, and the like.

Communications subsystem 1224 may also be configured to output the structured and/or unstructured data feeds 1226, event streams 1228, event updates 1230, and the like to one or more databases that may be in communication with one or more streaming data source computers coupled to computer system 1200.

Computer system 1200 can be one of various types, including a handheld portable device (e.g., an iPhone® cellular phone, an iPad® computing Tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 1200 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

Although specific embodiments have been described, various modifications, alterations, alternative constructions, and equivalents are also encompassed within the scope of the disclosure. Embodiments are not restricted to operation within certain specific data processing environments, but are free to operate within a plurality of data processing environments. Additionally, although embodiments have been described using a particular series of transcriptions and steps, it should be apparent to those skilled in the art that the scope of the present disclosure is not limited to the described series of transcriptions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or services are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "including," "having," "including," and "containing" are to be construed as open-ended terms (i.e., meaning "including, but not limited to,") unless otherwise noted. The term "connected" is to be construed as a partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

As used herein, when an action is "based on" something, this means the action is based at least in part on at least a part of the something. As used herein, the terms "substantially," "approximately" and "about" are defined as being largely but not necessarily wholly what is specified (and include wholly what is specified) as understood by one of ordinary skill in the art. In any disclosed embodiment, the term "substantially," "approximately," or "about" may be substituted with "within [a percentage] of" what is specified, where the percentage may be from 0 to 10 percent, as a non-limiting example.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. A computer-implemented method comprising:
   obtaining, using a first transcription model configured to convert natural speech of longer audio files into text, an initial transcription for at least one input audio file containing an input natural speech;
   performing a segmentation of the initial transcription into text portions, based on punctuation marks in the initial transcription;
   determining, using a first machine learning (ML) model, segment-level timestamps for the text portions based on the input natural speech, the segment-level timestamps designate a starting time point of a first word and an ending time point of a last word for each of the text portions;
   performing an audio segmentation on the input natural speech, by cutting the input natural speech based on the segment-level timestamps, to obtain audio chunks;
   generating, using a second transcription model configured to convert natural speech of shorter audio files into text, transcription portions for each of the audio chunks;
   merging the transcription portions to form a re-transcription;
   determining, using a second ML model, word-level timestamps for the re-transcription, by aligning the input natural speech against the re-transcription, the word-level timestamps designating a starting time point and an ending time point of each word of the re-transcription;
   calculating silence time periods, each of the silence time periods corresponding to a silence between each two adjacent words of the input natural speech, based on the word-level timestamps determined for the re-transcription;
   performing a final segmentation on the input natural speech and the re-transcription, based at least on the silence time periods, to generate final audio segments and corresponding final transcription portions; and
   outputting the final audio segments and the corresponding final transcription portions.

2. The computer-implemented method of claim 1, wherein the obtaining the initial transcription further comprises:
   obtaining the initial transcription without the punctuation marks; and
   restoring the punctuation marks in the initial transcription by using a third ML model configured to predict the punctuation marks in a given text.

3. The computer-implemented method of claim 1, wherein the determining the segment-level timestamps further comprises:
   aligning the text portions against the input natural speech using the segment-level timestamps; and
   calculating an alignment confidence score between the text portions and audio portions of the input natural speech that correspond to the text portions,
   wherein each of the audio chunks is included in a corresponding audio portion of the input natural speech and has an associated alignment confidence score of the corresponding audio portion, and
   wherein the re-transcription is generated based on the audio chunks having the associated alignment confidence score greater than an alignment threshold.

4. The computer-implemented method of claim 1, wherein the performing the final segmentation further comprises:
   segmenting the input natural speech into the final audio segments of a variable data length based on rules, so that the silence time period between two adjacent final audio segments is no more than a silence threshold, a number of characters of each of the final audio segments is no more than a maximum predetermined number of characters, and a length of each of the final audio segments is no more than a maximum predetermined duration.

5. The computer-implemented method of claim 1, further comprising:
   inputting, into a validator model, the final audio segments;
   outputting, by the validator model, a prediction matrix;
   comparing the prediction matrix to the final transcription portions, to generate a first matching value; and
   based on the first matching value for a particular final transcription portion being less than or equal to a connectionist temporal classification (CTC) loss threshold, storing the particular final transcription portion in a model training dataset.

6. The computer-implemented method of claim 5, further comprising:
   based on the first matching value for the particular final transcription portion being more than the CTC loss threshold, obtaining, using a curator model configured to convert natural speech into text, a curated transcription portion corresponding to the particular final transcription portion;
   comparing the curated transcription portion and the prediction matrix, to generate a second matching value; and
   based on the second matching value being less than or equal to the CTC loss threshold, storing the curated transcription portion in the model training dataset.

7. The computer-implemented method of claim 6, wherein the model training dataset is to be used as an input for training an automated speech recognition model.

8. A computer system comprising:
one or more processors; and
one or more computer-readable media storing instructions that, when executed by the one or more processors, cause the computer system to perform operations including:
   obtaining, using a first transcription model configured to convert natural speech of longer audio files into text, an initial transcription for at least one input audio file containing an input natural speech;
   performing a segmentation of the initial transcription into text portions, based on punctuation marks in the initial transcription;
   determining, using a first machine learning (ML) model, segment-level timestamps for the text portions based on the input natural speech, the segment-level timestamps designate a starting time point of a first word and an ending time point of a last word for each of the text portions;
   performing an audio segmentation on the input natural speech, by cutting the input natural speech based on the segment-level timestamps, to obtain audio chunks;
   generating, using a second transcription model configured to convert natural speech of shorter audio files into text, transcription portions for each of the audio chunks;
   merging the transcription portions to form a re-transcription;
   determining, using a second ML model, word-level timestamps for the re-transcription, by aligning the input natural speech against the re-transcription, the word-level timestamps designating a starting time point and an ending time point of each word of the re-transcription;
   calculating silence time periods, each of the silence time periods corresponding to a silence between each two adjacent words of the input natural speech, based on the word-level timestamps determined for the re-transcription;
   performing a final segmentation on the input natural speech and the re-transcription, based at least on the silence time periods, to generate final audio segments and corresponding final transcription portions; and
   outputting the final audio segments and the corresponding final transcription portions.

9. The computer system of claim 8, wherein the obtaining the initial transcription further includes:
   obtaining the initial transcription without the punctuation marks; and
   restoring the punctuation marks in the initial transcription by using a third ML model configured to predict the punctuation marks in a given text.

10. The computer system of claim 8, wherein the determining the segment-level timestamps further includes:
   aligning the text portions against the input natural speech using the segment-level timestamps; and
   calculating an alignment confidence score between the text portions and audio portions of the input natural speech that correspond to the text portions,
   wherein each of the audio chunks is included in a corresponding audio portion of the input natural speech and has an associated alignment confidence score of the corresponding audio portion, and
   wherein the re-transcription is generated based on the audio chunks having the associated alignment confidence score greater than an alignment threshold.

11. The computer system of claim 8, wherein the performing the final segmentation further includes:
   segmenting the input natural speech into the final audio segments of a variable data length based on rules, so that the silence time period between two adjacent final audio segments is no more than a silence threshold, a number of characters of each of the final audio segments is no more than a maximum predetermined number of characters, and a length of each of the final audio segments is no more than a maximum predetermined duration.

12. The computer system of claim 8, wherein the operations further include:
   inputting, into a validator model, the final audio segments;
   outputting, by the validator model, a prediction matrix;
   comparing the prediction matrix and the final transcription portions, to generate a first matching value; and
   based on the first matching value for a particular final transcription portion being less than or equal to a connectionist temporal classification (CTC) loss threshold, storing the particular final transcription portion in a model training dataset.

13. The computer system of claim 12, wherein the operations further include:
   based on the first matching value for the particular final transcription portion being more than the CTC loss threshold, obtaining, using a curator model configured to convert natural speech into text, a curated transcription portion corresponding to the particular final transcription portion;
   comparing the curated transcription portion and the prediction matrix, to generate a second matching value; and
   based on the second matching value being less than or equal to the CTC loss threshold, storing the curated transcription portion in the model training dataset.

14. The computer system of claim 13, wherein the model training dataset is to be used as an input for training an automated speech recognition model.

15. One or more non-transitory computer-readable media storing instructions that, when executed by one or more processors, cause the one or more processors to perform operations including:
   obtaining, using a first transcription model configured to convert natural speech of longer audio files into text, an initial transcription for at least one input audio file containing an input natural speech;
   performing a segmentation of the initial transcription into text portions, based on punctuation marks in the initial transcription;
   determining, using a first machine learning (ML) model, segment-level timestamps for the text portions based on the input natural speech, the segment-level timestamps designate a starting time point of a first word and an ending time point of a last word for each of the text portions;
   performing an audio segmentation on the input natural speech, by cutting the input natural speech based on the segment-level timestamps, to obtain audio chunks;
   generating, using a second transcription model configured to convert natural speech of shorter audio files into text, transcription portions for each of the audio chunks;
   merging the transcription portions to form a re-transcription;

determining, using a second ML model, word-level timestamps for the re-transcription, by aligning the input natural speech against the re-transcription, the word-level timestamps designating a starting time point and an ending time point of each word of the re-transcription;

calculating silence time periods, each of the silence time periods corresponding to a silence between each two adjacent words of the input natural speech, based on the word-level timestamps determined for the re-transcription;

performing a final segmentation on the input natural speech and the re-transcription, based at least on the silence time periods, to generate final audio segments and corresponding final transcription portions; and outputting the final audio segments and the corresponding final transcription portions.

16. The one or more non-transitory computer-readable media of claim 15, wherein the obtaining the initial transcription further includes:

obtaining the initial transcription without the punctuation marks; and restoring the punctuation marks in the initial transcription by using a third ML model configured to predict the punctuation marks in a given text.

17. The one or more non-transitory computer-readable media of claim 15, wherein the determining the segment-level timestamps further includes:

aligning the text portions against the input natural speech using the segment-level timestamps; and calculating an alignment confidence score between the text portions and audio portions of the input natural speech that correspond to the text portions, wherein each of the audio chunks is included in a corresponding audio portion of the input natural speech and has an associated alignment confidence score of the corresponding audio portion, and wherein the re-transcription is generated based on the audio chunks having the associated alignment confidence score greater than an alignment threshold.

18. The one or more non-transitory computer-readable media of claim 15, wherein the performing the final segmentation further includes:

segmenting the input natural speech into the final audio segments of a variable data length based on rules, so that the silence time period between two adjacent final audio segments is no more than a silence threshold, a number of characters of each of the final audio segments is no more than a maximum predetermined number of characters, and a length of each of the final audio segments is no more than a maximum predetermined duration.

19. The one or more non-transitory computer-readable media of claim 15, wherein the operations further include:

inputting, into a validator model, the final audio segments;

outputting, by the validator model, a prediction matrix;

comparing the prediction matrix and the final transcription portions, to generate a first matching value; and based on the first matching value for a particular final transcription portion being less than or equal to a connectionist temporal classification (CTC) loss threshold, storing the particular final transcription portion in a model training dataset.

20. The one or more non-transitory computer-readable media of claim 19, wherein the operations further include:

based on the first matching value for the particular final transcription portion being more than the CTC loss threshold, obtaining, using a curator model configured to convert natural speech into text, a curated transcription portion corresponding to the particular final transcription portion;

comparing the curated transcription portion and the prediction matrix, to generate a second matching value; and based on the second matching value being less than or equal to the CTC loss threshold, storing the curated transcription portion in the model training dataset.

* * * * *